(12) United States Patent
Baraniuk et al.

(10) Patent No.: US 8,717,466 B2
(45) Date of Patent: May 6, 2014

(54) DUAL-PORT MEASUREMENTS OF LIGHT REFLECTED FROM MICROMIRROR ARRAY

(71) Applicant: InView Technology Corporation, Austin, TX (US)

(72) Inventors: Richard G. Baraniuk, Houston, TX (US); Kevin F. Kelly, Houston, TX (US); Robert F. Bridge, Austin, TX (US); Sujoy Chatterjee, Austin, TX (US); Lenore McMackin, Austin, TX (US)

(73) Assignee: InView Technology Corporation, Austin, TX (US)

( * ) Notice: Subject to any disclaimer, the term of this patent is extended or adjusted under 35 U.S.C. 154(b) by 0 days.

(21) Appl. No.: 14/017,834

(22) Filed: Sep. 4, 2013

(65) Prior Publication Data
US 2014/0009638 A1    Jan. 9, 2014

Related U.S. Application Data

(63) Continuation of application No. 13/193,553, filed on Jul. 28, 2011, now Pat. No. 8,570,405.

(60) Provisional application No. 61/372,826, filed on Aug. 11, 2010.

(51) Int. Cl.
*H04N 9/097*     (2006.01)
*H04N 5/225*     (2006.01)

(52) U.S. Cl.
USPC .......................................... 348/262; 348/344

(58) Field of Classification Search
USPC .................. 348/262, 264, 335, 340, 343, 344
See application file for complete search history.

(56) References Cited

U.S. PATENT DOCUMENTS 5,212,555 A * 5/1993 Stoltz ............................ 348/203
7,158,180 B2 * 1/2007 Neidrich ....................... 348/340

(Continued)

OTHER PUBLICATIONS

Takhar et al.; "A New Compressive Imaging Camera Architecture using Optical-Domain Compression;" Society of Photo-Optical Instrumentation Engineers, Proc. Computational Imaging IV, Jan. 2006, retrieved <http://dsp.rice.edu/sites/dsp.rice.edu/files/cs/cscam-SPIEJan06.pdf> on Dec. 17, 2012; pp. 1-10.
Babacan et al.; "Compressive Sensing of Light Fields;" 16th IEEE International Conference on Image Processing (ICIP), Nov. 7, 2009; pp. 2337-2340.
Robucci et al.; "Compressive Sensing on a CMOS Separable-Transform Image Sensor," Proceedings of the IEEE, vol. 98, No. 6, Jun. 1, 2010; pp. 1-11.
Gehm, Michael E.; Stenner, Michael D.; "Compressive measurement for target tracking in persistent, pervasive surveillance applications;" MITRE, Dec. 31, 2009; pp. 1-8.

(Continued)

*Primary Examiner* — John Villecco
(74) *Attorney, Agent, or Firm* — Meyertons Hood Kivlin Kowert & Goetzel, P.C.; Jeffrey C. Hood; Mark K. Brightwell

(57) ABSTRACT

An imaging system and method that captures compressive sensing (CS) measurements of a received light stream, and also obtains samples of background light level (BGLL). The BGLL samples may be used to compensate the CS measurements for variations in the BGLL. The system includes: a light modulator to spatially modulate the received light stream with spatial patterns, and a lens to concentrate the modulated light stream onto a light detector. The samples of BGLL may be obtained in various ways: (a) injecting calibration patterns among the spatial patterns; (b) measuring complementary light reflected by digital micromirrors onto a secondary output path; (c) separating and measuring a portion of light from the optical input path; (d) low-pass filtering the CS measurements; and (e) employing a light power meter with its own separate input path. Also, the CS measurements may be high-pass filtered to attenuate background light variation.

18 Claims, 27 Drawing Sheets

(56) References Cited

U.S. PATENT DOCUMENTS

| | | | |
|---|---|---|---|
| 7,532,772 | B2 | 5/2009 | Brady |
| 7,782,389 | B2 * | 8/2010 | Neidrich ........................ 348/340 |
| 8,199,244 | B2 | 6/2012 | Baraniuk et al. |
| 8,218,907 | B2 | 7/2012 | Chen et al. |
| 8,229,709 | B2 | 7/2012 | Boufounos |
| 8,253,844 | B2 * | 8/2012 | Neidrich ........................ 348/340 |
| 2006/0038705 | A1 | 2/2006 | Brady et al. |
| 2006/0239336 | A1 | 10/2006 | Baraniuk et al. |
| 2011/0211077 | A1 * | 9/2011 | Nayar et al. ............... 348/207.1 |
| 2011/0241917 | A1 | 10/2011 | Baraniuk et al. |
| 2011/0270590 | A1 | 11/2011 | Aparin et al. |
| 2012/0038786 | A1 | 2/2012 | Kelly et al. |
| 2012/0038790 | A1 | 2/2012 | Kelly et al. |
| 2012/0038817 | A1 | 2/2012 | McMackin et al. |
| 2012/0162457 | A1 | 6/2012 | Veeraraghavan et al. |
| 2012/0241597 | A1 | 9/2012 | Bridge et al. |
| 2012/0294543 | A1 | 11/2012 | Sen et al. |
| 2013/0002715 | A1 | 1/2013 | Tidman et al. |
| 2013/0002858 | A1 | 1/2013 | Bridge et al. |
| 2013/0128042 | A1 | 5/2013 | Bridge et al. |

OTHER PUBLICATIONS

Ashok, Amit; Neifeld, Mark A.; "Compressive light-field imaging;" SPIE, Apr. 6, 2010, Imaging and Non-Imaging Algorithms, retrieved from <http://proceedings.spiedigitallibrary.org/proceeding.aspx?articleid=1269092> on Mar. 18, 2013; pp. 1-4.

Muise, Robert; Mahalanobis, Abhijit; "Compressive and Adaptive Imaging for Target Exploitation;" Proc. of SPIE vol. 7442, Dec. 31, 2009; pp. 1-16.

Fergus et al.; "Random Lens Imaging;" Computer Science and Artificial Intelligence Laboratory Technical Report, MIT-CSAIL-TR-2006-058, Sep. 2, 2006, retrieved <http://people.csail.mit.edu/billf/papers/MIT-CSAIL-TR-2006-058.pdf> on Dec. 17, 2012; pp. 1-11.

Warnell et al.; "Adaptive Rate compressive sensing for background subtraction"; Mar. 2012; 2012 IEEE International Conference on Acoustics, Speech and Signal Processing (ICASSP); pp. 1477-1480.

Jing et al.; "Compressive Imaging: An Application for Surveillance Systems"; May 2012; Optoelectronics (SOPO); pp. 1-4.

* cited by examiner

| modulate a light stream with a series of spatial patterns in order to produce a modulated light stream, where the series of spatial patterns includes measurement patterns and calibration patterns  710 |

| generate a sequence of samples representing intensity of the modulated light stream as a function of time  720 |

| separate the sequence of samples into a first subsequence of samples that correspond to the measurement patterns and a second subsequence of samples that correspond to the calibration patterns, where the second subsequence of samples represents variation in background light level  730 |

| control a plurality of mirrors, where the mirrors are configured to reflect corresponding portions of a received beam of light, where each of the mirrors is configured to controllably switch between two orientation states, where the action of controlling the mirrors includes driving the mirrors through a series of spatial patterns, where each of the spatial patterns specifies an orientation state for each of the mirrors, where the series of spatial patterns includes measurement patterns and calibration patterns  760 |

| receive a sequence of samples from a light sensing device, where the sequence of samples represents cumulative intensity of light portions reflected by mirrors in a first of the two orientation states as a function of time  770 |

| separate the sequence of samples into a first subsequence of samples corresponding to the measurement patterns and a second subsequence of samples corresponding to the calibration patterns, where the second subsequence of samples represents variation of background light level in the environment  780 |

1200 control a plurality of mirrors, where the mirrors are configured to reflect corresponding portions of a received beam of light, where each of the mirrors is configured to controllably switch between two orientation states, where the operation of controlling the mirrors includes driving the mirrors through a series of spatial patterns, where each of the spatial patterns specifies an orientation state for each of the mirrors    1210 receive a first sequence $\{I_1(k)\}$ of samples from a first light sensing device, where the first sequence of samples represents cumulative intensity of light portions reflected by mirrors in a first of the two orientation states as a function of time  1220 receive a second sequence $\{I_2(k)\}$ of samples from a second light sensing device, where the second sequence of samples represents cumulative intensity of light portions reflected by mirrors in a second of the two orientation states as a function of time    1230 combine the first sequence and the second sequence of samples to obtain a third sequence $\{I_{BGL}(k)\}$ of samples, where the third sequence of samples represents variation of the background light level    1240

```
modulate a received light stream with a series of spatial patterns in order to
produce a modulated light stream      1910
```
↓
```
generate a first sequence of samples representing intensity of the modulated
light stream as a function of time    1915
```
↓
```
apply a low-pass filter to the first sequence of samples to obtain a filtered
sequence of samples, wherein the filtered sequence of samples represents
variation in background light level    1925
```

```
control a plurality of mirrors, where the mirrors are configured to reflect
corresponding portions of a received beam of light, where each of the mirrors is
configured to controllably switch between two orientation states, where the
action of controlling the mirrors includes driving the mirrors through a series of
spatial patterns, where each of the spatial patterns specifies an orientation state
for each of the mirrors      1960
```
↓
```
receive a sequence of samples {I_{MLS}(k)} from a light sensing device, where the
sequence of samples {I_{MLS}(k)} represents cumulative intensity of light portions
reflected by mirrors in a first of the two orientation states as a function of time
1965
```
↓
```
filter the sequence of samples {I_{MLS}(k)} with a low-pass filter to obtain a filtered
sequence of samples {I_{BGL}(k)}, where the filtered sequence of samples
represents variation in background light level    1970
```

> modulate a light stream with a series of spatial patterns in order to produce a modulated light stream    1974

> generate a first signal representing intensity of the modulated light stream as a function of time    1975

> apply a high-pass filter to the first signal to obtain a filtered signal    1976

> perform envelope detection on the filtered signal to obtain a detected signal, where the detected signal represents variation in background light level    1977

> modulate a light stream with a series of spatial patterns in order to produce a modulated light stream    1982

> generate a first sequence of samples representing intensity of the modulated light stream as a function of time    1983

> apply a high-pass filter to the first sequence of samples to obtain a filtered sequence of samples    1984

> perform envelope detection on the filtered sequence of samples to obtain a detected sequence of samples, where the detected sequence of samples represents variation in background light level    1985

Fig. 19D

DUAL-PORT MEASUREMENTS OF LIGHT REFLECTED FROM MICROMIRROR ARRAY

PRIORITY CLAIM DATA

This application is a continuation of U.S. patent application Ser. No. 13/193,553, filed Jul. 28, 2011, entitled "Determining Light Level Variation in Compressive Imaging by Injecting Calibration Patterns into Pattern Sequence", invented by Baraniuk, Kelly, Bridge, Chatterjee and McMackin, which claims the benefit of priority to U.S. Provisional Application No. 61/372,826, filed Aug. 11, 2010, entitled "Compressive Sensing Systems and Methods", invented by Baraniuk, Woods, Kelly, Bridge, Chatterjee and McMackin. U.S. patent application Ser. No. 13/193,553 and U.S. Provisional Application No. 61/372,826 are hereby incorporated by reference in their entireties as though fully and completely set forth herein.

FIELD OF THE INVENTION

The present invention relates to the field of compressive imaging, and more particularly, to a compressive imaging system that measures light using both ports of a dual-port spatial light modulator such as a dual-port digital micromirror device (DMD).

DESCRIPTION OF THE RELATED ART

According to Nyquist theory, a signal x(t) whose signal energy is supported on the frequency interval [−B,B] may be reconstructed from samples {x(nT)} of the signal x(t), provided the rate $f_S=1/T_S$ at which the samples are captured is sufficiently high, i.e., provided that $f_S$ is greater than 2B. Similarly, for a signal whose signal energy is supported on the frequency interval [A,B], the signal may be reconstructed from samples captured with sample rate greater than B−A. A fundamental problem with any attempt to capture a signal x(t) according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx, mΔy)} captured along a rectangular grid, the horizontal and vertical densities 1/Δx and 1/Δy should be respectively greater than $2B_x$ and $2B_y$, where $B_x$ and $B_y$ are the highest x and y spatial frequencies occurring in the image I(x,y). The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts are the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i)} in the N-dimensional space, where M is larger than K but still much smaller than N. Each projection gives a corresponding real number s(i), e.g., according to the expression $$s(i)=<v,R(i)>,$$

where the notation <v,R(i)> represents the inner product (or dot product) of the vector v and the vector R(i). Thus, the series of M projections gives a vector U including M real numbers. Compressive sensing theory further prescribes methods for reconstructing (or estimating) the vector v of N samples from the vector U of M real numbers. For example, according to one method, one should determine the vector x that has the smallest length (in the sense of the $L_1$ norm) subject to the condition that ΦTx=U, where Φ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number N of measurements recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. patent application Ser. No. 11/379,688 (published as 2006/0239336 and invented by Baraniuk et al.) and illustrated in FIG. 1, an imaging device (e.g., camera) may be configured to take advantage of the compressive sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from the micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements $\{s(i)\}$ that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the discussion of this paragraph that the DMD comprises a rectangular array, the DMD implements a spatial modulation of the incident light field so that the light field leaving the DMD in the direction of the lens 50 might be modeled by $$\{I(n\Delta x, m\Delta y, t) * M(n,m,t)\}$$

where m and n are integer indices, where $I(n\Delta x, m\Delta y, t)$ represents the portion of the light field that is incident upon that $(n,m)^{th}$ mirror of the DMD at time t. The function $M(n,m,t)$ represents the orientation of the $(n,m)^{th}$ mirror of the DMD at time t. At sampling times, the function $M(n,m,t)$ equals one or zero, depending on the state of the digital control signal that controls the $(n,m)^{th}$ mirror. The condition $M(n,m,t)=1$ corresponds to the orientation state that reflects onto the path that leads to the lens 50. The condition $M(n,m,t)=0$ corresponds to the orientation state that reflects away from the lens 50.

The lens 50 concentrates the spatially-modulated light field $$\{I(n\Delta x, m\Delta y, t) * M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

One fundamental challenge with the imaging device of FIG. 1 is that the background light level (i.e., ambient illumination level) may vary during the time interval over which the series of measurements $\{s(i)\}$ is being captured. If one attempts to reconstruct the image based on the measurements $\{s(i)\}$ under the assumption that the background light level was constant, then the reconstruction may give less than satisfactory results.

SUMMARY

Embodiments of a system may be configured to operate on a received light stream in order to capture compressive imaging measurements that are useable to construct an image or video sequence. (The imaging measurements are referred to as being "compressive" because the number of such measurements are much smaller than the number of pixels in the image or video sequence that can be constructed from the imaging measurements.) The system also provides measurements of background light level as function of time. The background light level measurements may be used to compensate the compressive imaging measurements for variations in the background light level, e.g., in order to approximate the imaging measurements that would have been obtained if the background light level had remained constant during the measurement process.

The system may include a light modulation unit and a light sensing device. The light modulation unit is configured to modulate the received light stream with a series of spatial patterns in order to produce a modulated light stream. The light modulation unit includes a plurality of light modulating elements configured to modulate corresponding portions of the received light stream. Each of the spatial patterns specifies an amount of modulation (e.g., a scalar multiplier) for each of the light modulating elements.

The light modulating elements may be mirrors (e.g., an array of micromirrors). Each of the mirrors may be configured to controllably switch between two orientation states. Furthermore, each of the mirrors may be configured to (a) reflect a corresponding portion of the received light stream onto a sensing path when the mirror is in a first of the two orientation states and (b) reflect the corresponding portion of the received light stream away from the sensing path when the mirror is in a second of the two orientation states. Alternatively, the light modulating elements may be elements whose transmittances are independently controllable (as in an LCD shutter array). Various embodiments of the light modulating elements are contemplated.

The light sensing device may be configured to receive the modulated light stream and to capture (or generate) a sequence of samples representing intensity of the modulated light stream as a function of time. These samples are the compressive imaging measurements. The action of modulating the received light stream with the spatial patterns may be coordinated (synchronized) with the action of sampling the intensity of the modulated light stream. Alternatively, the two processes (modulation and sampling) may operate asynchronously.

In one embodiment of the system, calibration patterns are included in the series of spatial patterns in addition to measurement patterns. The calibration patterns are designed so that the corresponding samples from the light sensing device represent samples of background light level. For example, the calibration patterns may be patterns that instruct all the light modulating elements to take their maximum transfer state (e.g., instruct all mirrors to take the orientation state that reflects onto the sensing path, or, instruct all LCD shutters to take their maximum transparency state.) A wide variety of possibilities are available for the structure of the calibration patterns.

The system may include a processing unit to separate the sequence of samples captured by the light sensing device into a first subsequence of samples that correspond to the measurement patterns and a second subsequence of samples that correspond to the calibration patterns. The first subsequence of samples represent the compressive imaging measurements. The second subsequence of samples represents variation in the background light level. The second subsequence may be used to compensate the compressive imaging measurements (the first subsequence of samples) for the variation in the background light level.

As described above, the light sensing device may be configured to receive the modulated light stream and to capture a sequence of samples representing intensity of the modulated light stream. In the case where the light modulation unit is realized by the set of mirrors, the modulated light stream at any given time is made up of the light portions that are reflected onto the sensing path by mirrors in the first orientation state. In this case, the samples captured by the light sensing device represent a cumulative intensity of the light portions reflected onto the sensing path as a function of time.

In one embodiment, the system may include the above-described set of mirrors and light sensing device, and also include a second light sensing device. The second light sensing device is configured to receive the light portions that are reflected by mirrors in the second orientation state and to generate a second sequence of samples representing a cumulative intensity of those light portions as a function of time. At any given sampling time, each mirror may be thought of as being either in the first orientation state or the second orientation state. Thus, sample sequences captured by the two light sensing devices may be combined to infer the power (or intensity) of the light stream incident upon the mirrors as a function of time. That combined sequence represents variation in background light level (ambient illumination level). In this embodiment, the spatial patterns supplied to the mirrors need not include the calibration patterns of the embodiment described above.

In yet another embodiment, the system includes an optical subsystem (e.g., a beam splitter, a prism, etc.), a light modulation unit, a first light sensing device and a second light sensing device. The optical subsystem is configured to receive light from the environment and to separate the received light into a first beam and a second beam.

The light modulation unit is configured to modulate the first beam with a series of spatial patterns to obtain a modulated beam. The first light sensing device is configured to receive the modulated beam and to generate a first sequence of samples representing intensity of the modulated beam as a function of time. The first sample sequence corresponds to the compressive imaging measurements. The second light sensing device is configured to generate a second sequence of samples that represents intensity of the second beam as a function of time. The second sample sequence corresponds to variation in the background light level.

In yet another embodiment, the background light level signal is derived by low-pass filtering the compressive imaging measurements from the first light sensing device. Thus, the second light sensing device of the two-separate-beams system described immediately above may be omitted in this embodiment.

In yet another embodiment, the compressive imaging measurements may be high-pass filtered and then envelope detected to obtain an estimate of the background light level signal.

In yet another embodiment, the background light level signal is derived by using a light power meter that has its own light input path, i.e., separate from the input path that leads to the light modulation unit.

In yet another embodiment, the compressive imaging measurements may be high-pass filtered in order to remove (or decrease or attenuate) the effect of background light variation from the compressive imaging measurements.

Any two or more of the embodiments described herein may be used in combination. As one example, the above-described embodiment that uses two light sensing devices to measure the light reflected in both mirror orientations may be combined with the low-pass filtering embodiment, in which case low-pass filtering could be performed on the measurements from each light sensing device, thereby producing two background light signals. Those two signals may be combined (e.g., averages) to obtain a refined background light signal.

Various additional embodiments are described in U.S. Provisional Application No. 61/372,826, which is hereby incorporated by reference in its entirety as though fully and completely set forth herein.

BRIEF DESCRIPTION OF THE DRAWINGS

A better understanding of the present invention can be obtained when the following detailed description of the preferred embodiments is considered in conjunction with the following drawings.

FIG. 7A shows an embodiment of a method 700 for obtaining information regarding background light variation by inserting calibration patterns among the spatial patterns being fed to a light modulation unit.

FIG. 7B shows an embodiment of a method 750 for obtaining information regarding background light variation by inserting calibration patterns among the spatial patterns being fed to a set (e.g., array) of controllable mirrors.

FIG. 12 illustrates an embodiment of method 1200 that determines or estimates background light level by combining measurements from two light sensing devices, where a first of the two devices measures light reflected from mirrors in a first orientation state and the second of the two light sensing devices measures light reflected from mirrors in a second orientation state.

FIG. 19A illustrates an embodiment of a method 1900 that obtains an indication of background light level as a function of time by performing low-pass filtering on a sequence of compressive imaging measurements.

FIG. 19B illustrates an embodiment of a method 1950 that obtains an indication of background light level as a function of time by performing low-pass filtering on a sequence of compressive imaging measurements. This embodiment involves driving a plurality of mirrors through a series of spatial patterns.

FIG. 19C illustrates an embodiment of a method 1972 that obtains an indication of background light level as a function of time by performing high-pass filtering followed by envelope detection on a compressive imaging signal.

FIG. 19D illustrates an embodiment of a method 1980 that obtains an indication of background light level as a function of time by performing high-pass filtering followed by envelope detection on a sequence of compressive imaging measurements.

Figure 1:
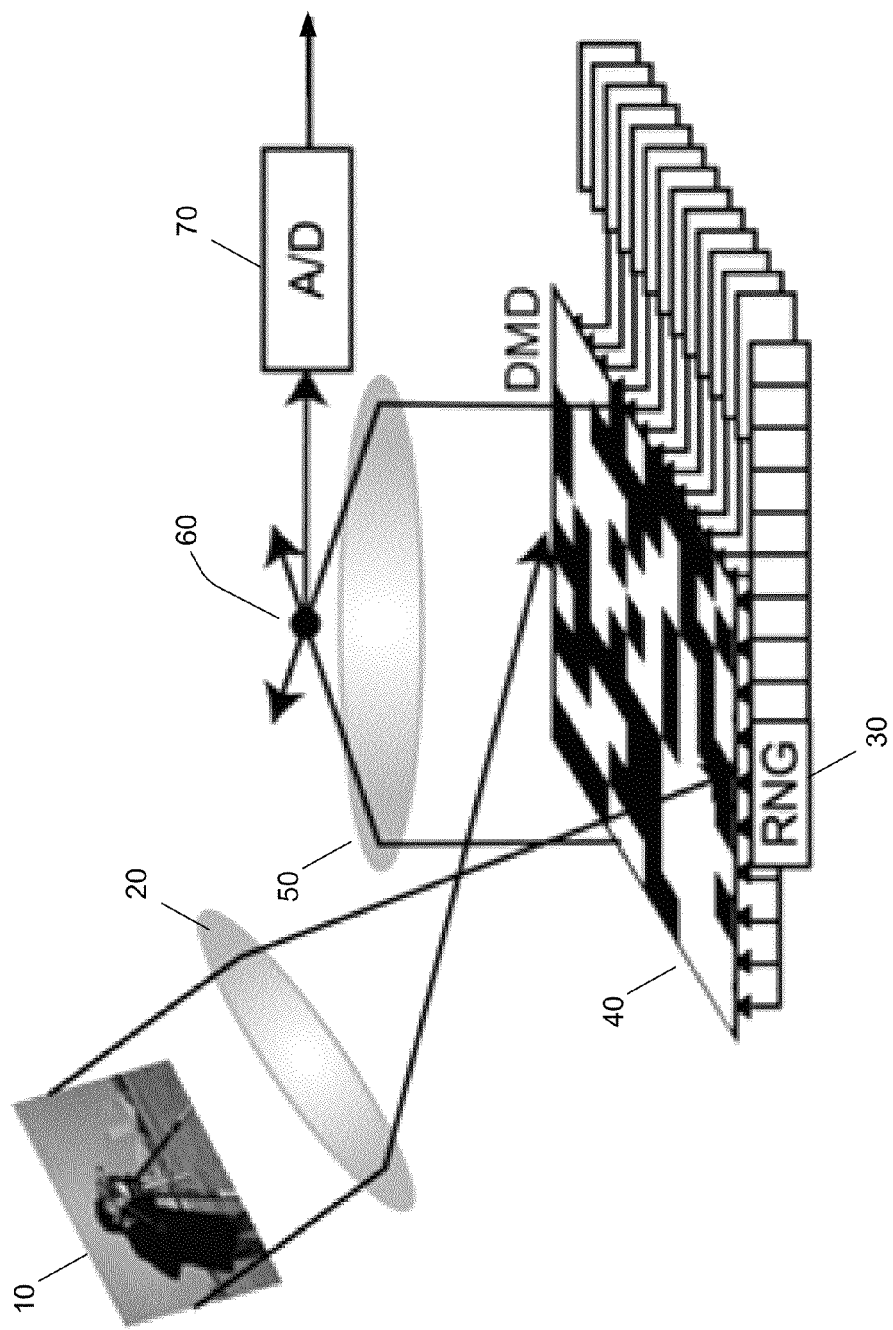
FIG. 1 illustrates a compressive sensing camera according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The following patent applications provide teachings regarding compressive sensing and compressive imaging:

U.S. Provisional Application No. 60/673,364 entitled "Method and Apparatus for Optical Image Compression," filed on Apr. 21, 2005;

U.S. Provisional Application No. 60/679,237 entitled "Method and Apparatus for Reconstructing Data from Multiple Sources," filed on May 10, 2005;

U.S. Provisional Application No. 60/729,983 entitled "Random Filters for Compressive Sampling and Reconstruction," filed on Oct. 25, 2005;

U.S. Provisional Application No. 60/732,374 entitled "Method and Apparatus for Compressive Sensing for Analog-to-Information Conversion," filed on Nov. 1, 2005;

U.S. Provisional Application No. 60/735,616 entitled "Method and Apparatus for Distributed Compressed Sensing," filed on Nov. 10, 2005;

U.S. Provisional Application No. 60/759,394 entitled "Sudocodes: Efficient Compressive Sampling Algorithms for Sparse Signals," filed on Jan. 16, 2006;

U.S. patent application Ser. No. 11/379,688 entitled "Method and Apparatus for Compressive Imaging Device", filed on Apr. 21, 2006; and U.S. patent application Ser. No. 12/791,171 entitled "Method and Apparatus for Compressive Imaging Device", filed on Jun. 1, 2010.

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

Figure 2A:
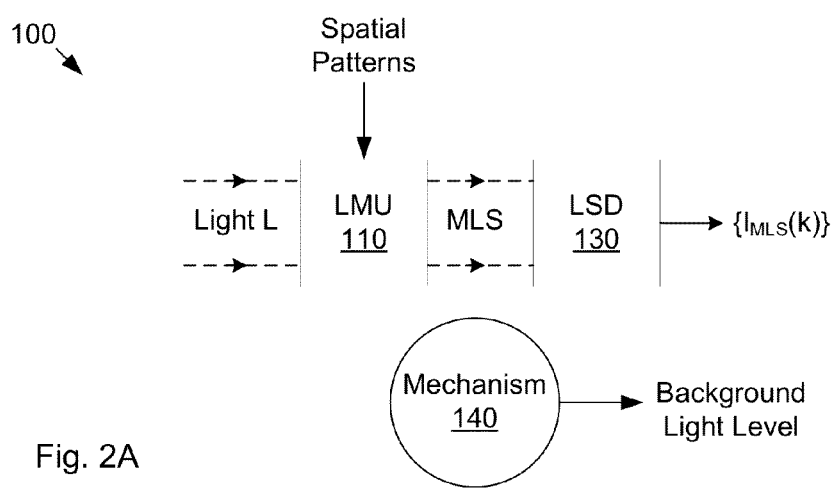
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

A system 100 for operating on light may be configured as shown in FIG. 2A.

The system 100 may include a light modulation unit 110 and a light sensing device 130. In some embodiments, the system 100 may also include a mechanism 140 for measuring background light level. The mechanism 140 is represented abstractly because it may take different forms in the different ones of the embodiments described below.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$ to obtain a time slice of the modulated light stream: $(m_{ij})*(x_{ij})=(m_{ij}*x_{ij})$. The vector $(m_{ij})$ is specified by the spatial pattern. Each light modulating element effectively scales (multiplies) the intensity of its corresponding stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

The light sensing device 130 is configured to receive the modulated light stream MLS and to generate a sequence of samples $\{I_{MLS}(k)\}$ representing intensity of the modulated light stream as a function of time. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or a video sequence) and may be used to construct the image (or video sequence). (For video sequence construction, the samples may be partitioned into contiguous subsets, and then the subsets may be processed to construct corresponding images.)

In some embodiments, the sample set $\{I_{MLS}(k)\}$ may be used for some purpose other than or in addition to image (or video) construction. For example, system 100 (or some other system) may operate on the sample set or a plurality of such sets to perform an inference task, such as detecting the presence of a signal or object, classifying a signal or an object, estimating one or more parameters relating to a signal or an object, tracking a signal or an object, etc.

The light sensing device 130 may include one or more light sensing elements and one or more A/D converters. The term "light sensing element" may be interpreted as meaning "a transducer between a light signal and an electrical signal". For example, a photodiode may be interpreted as a light sensing element. In various other embodiments, light sensing elements might include devices such as metal-semiconductor-metal (MSM) photodetectors, phototransistors, phototubes and photomultiplier tubes.

In some embodiments, the light sensing device 130 includes exactly one light sensing element. For example, the single light sensing element may be a photodiode. The light sensing element may convert light impinging on its light sensing surface into an analog electrical signal representing intensity (or power) of the impinging light as a function of time. The analog electrical signal may be digitized by an A/D converter to generate the sequence of samples $\{I_{MLS}(k)\}$. In some embodiments, the light sensing device 130 may also include an amplifier, e.g., a transimpedance amplifier (TIA), to amplify the analog electrical signal prior to A/D conversion.

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by an A/D converter to obtain the sequence of samples $\{I_{MLS}(k)\}$. In another embodiment, the analog electrical signals may be individually digitized, each with its own A/D converter, to obtain corresponding sample sequences. The sample sequences may then be added to obtain the sequence $\{I_{MLS}(k)\}$. In another embodiment, the analog electrical signals produced by the light sensing elements may be sampled by a smaller number of A/D converters than light sensing elements through the use of time multiplexing. For example, in one embodiment, light sensing device 130 may be configured to sample two or more of the analog electrical signals by switching the input of an A/D converter among the outputs of the two or more corresponding light sensing elements at a sufficiently high rate.

In some embodiments, the light sensing device 130 may include an array of light sensing elements. Arrays of any of a wide variety of sizes and configurations are contemplated. In one embodiment, the light sensing device 130 includes a focal plane array coupled to a readout integrated circuit. In one embodiment, the light sensing device 130 may include an array of cells, where each cell is configured to integrate and hold photo-induced charge created by a corresponding one of the light sensing elements, and to convert the integrated charge into a corresponding cell voltage. The light sensing device may also include circuitry configured to sample the cell voltages using one or more A/D converters.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing element 130 may include a bi-cell photodiode.) Each light sensing element generates a corresponding signal representing intensity of the corresponding spatial portion as a function of time. Each signal may be digitized (e.g., by a corresponding A/D converter) to obtain a corresponding sequence of samples. Each sequence of samples may be processed to recover a corresponding sub-image. The sub-images may be joined together to form a whole image. Any of the various embodiments described herein for estimating or determining background light level as a function of time may be implemented for each of the sample sequences. Furthermore, any of the various embodiments described herein for compensating for variation in background light level may be implemented for each of the sample sequences.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity configuring any of these embodiments may afford to spend more per light sensing element to realize features that are beyond the capabilities of modern array-based image sensors of large pixel count, e.g., features such as higher sensitivity, extended range of sensitivity, new range(s) of sensitivity, extended dynamic range, higher bandwidth/lower response time. Furthermore, because the light sensing device includes a small number of light sensing elements, an entity configuring any of these embodiments may use newer light sensing technologies (e.g., based on new materials or combinations of materials) that are not yet mature enough to be manufactured into focal plane arrays (FPA) with large pixel count. For example, new detector materials such as superlattices, quantum dots, carbon nanotubes and graphene can significantly enhance the performance of IR detectors by reducing detector noise, increasing sensitivity, and/or decreasing detector cooling requirements.

In one embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[\lambda_L, \lambda_U]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In some embodiments, a filter may be placed in front of the light sensing device 130 to restrict the modulated light stream to a specific range of wavelengths or polarization. Thus, samples captured by the light sensing device 130 may be representative of the intensity of the restricted light stream. For example, by using a filter that passes only IR light, the light sensing device may be effectively converted into an IR detector. The sample principle may be applied to effectively convert the light sensing device into a detector for red or blue or green or UV light or IR light, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the light sensing device 130 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

The mechanism 140 is responsible for generating a background light signal, e.g., a sequence of samples that represents variation in background light level (i.e., ambient illumination level). As noted above, the various ways the mechanism may be achieved will be discussed in the various embodiments below.

In some embodiments, the system 100 may include a memory (or a set of memories of one or more kinds).

Figure 2B:
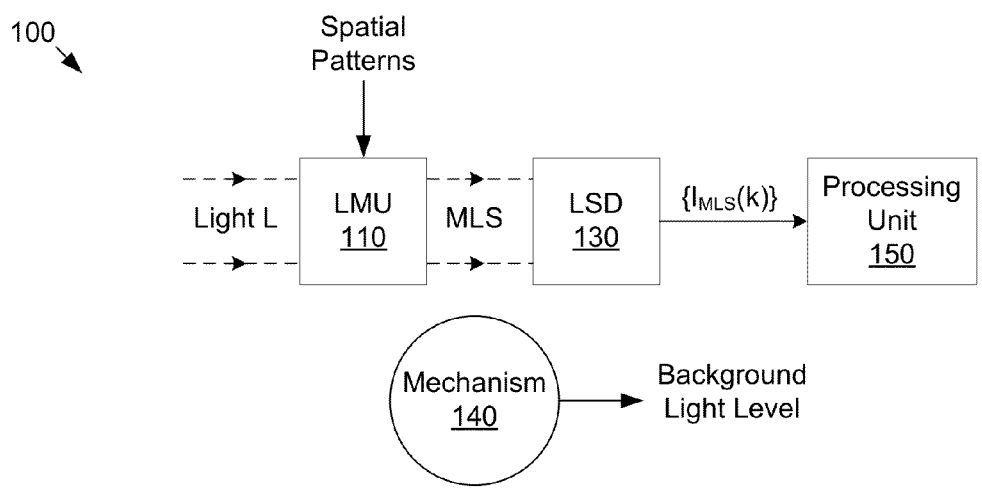
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be a microprocessor (or system of interconnected of microprocessors), a programmable hardware element such as a field-programmable gate array (FPGA), an application specific integrated circuit (ASIC), or any combination such elements. The processing unit 150 may be configured to perform one or more functions such as compensation of the captured samples $\{I_{MLS}(k)\}$, image/video construction, system control, user interface, statistical analysis, one or more inferences tasks. The processing unit is not necessarily distinct from the mechanism 140 for measuring background light level. In some embodiments, they may be identical or overlap to some extent.

The system 100 (e.g., the processing unit 150) may store the samples $\{I_{MLS}(k)\}$ and the samples of background light level in a memory, e.g., a memory resident in the system 100 or in some other system. The samples $\{I_{MLS}(k)\}$ and the samples of background light level are usable to construct an image (or video sequence).

The samples of the background light level may be used to compensate the samples $\{I_{MLS}(k)\}$ for the variation in the background light level, e.g., in order to approximate the hypothetical samples that would have been captured at the light sensing device if the background light level had remained constant, e.g., at some average level. A wide variety of computational algorithms or formulas for performing the compensation are contemplated.

In some embodiments, compensation implies increasing the value of a sample $I_{MLS}(k)$ when the corresponding sample of background light level is small, and decreasing the value of the sample $I_{MLS}(k)$ when the corresponding sample of the background light level is large.

In some embodiments, the compensation may be performed in accord with the following expression:

$$I_{CMPN}(k)=I_{MLS}(k)*A/I_{BGL}(k),$$

where $\{I_{BGL}(k)\}$ denotes the samples of the background light level, where A is a constant, where $\{I_{CMPN}(k)\}$ denotes the compensated samples. In one embodiment, the constant A may be the average of $\{I_{BGL}(k)\}$ over the image/video capture interval or some subinterval thereof.

In other embodiments, the compensation may be performed based on the expression $$I_{CMPN}(k)=I_{MLS}(k)-I_{BGL}(k),$$

or more generally, on the expression $$I_{CMPN}(k)=\alpha*I_{MLS}(k)-\beta*I_{BGL}(k),$$

where $\alpha$ and $\beta$ are scaling factors. These expressions may be useful in situations where the background light can be modeled as an additive disturbance to an information signal.

The action of compensating the samples $\{I_{MLS}(k)\}$ for the variation in background light level may be performed by system 100 (e.g., by processing unit 150). The compensated samples may be stored in a memory, e.g., a memory resident in system 100 or some other memory. The compensated samples are useable to construct an image or video sequence, e.g., based on any construction algorithm known in the field of compressive sensing. In some embodiments, the compensated samples may be used for some purpose other than or in addition to image (or video) construction. For example, system 100 (or some other system) may operate on the compensated samples to perform an inference task, such as detecting the presence of a signal or object, identifying a signal or an object, classifying a signal or an object, estimating one or more parameters relating to a signal or an object, tracking a signal or an object, etc. For example, an object under observation by system 100 may be identified or classified by virtue of its sample set $\{I_{MLS}(k)\}$ or parameters derived from that sample set being similar to one of a collection of stored sample sets (or parameter sets).

In one embodiment, processing unit 150 is configured to operate on the compensated samples to generate the image or video sequence. In this embodiment, the processing unit 150 may include a microprocessor configured to execute software (i.e., program instructions), especially software for performing an image/video construction algorithm. In one embodiment, system 100 is configured to transmit the compensated samples (and perhaps also the random seed(s) used to generate the spatial patterns) to some other system through a communication channel. That other system may operate on the compensated samples to construct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the modulated light beam.

In some embodiments, the samples $\{I_{BGL}(k)\}$ of background light level may be examined to determine any samples that depart from the mean value of background light level (over the measurement period) by more than a threshold amount, and then discard the corresponding samples from the sequence $\{I_{MLS}(k)\}$. Thus, the remaining samples of the sequence $\{I_{MLS}(k)\}$ can be counted upon to conform to a sufficiently small variation of background light level around the mean. These remaining samples may be used to construct the image or video sequence. The construction algorithm may be provided with a list of the time positions of the samples that were discarded.

In one embodiment, system 100 may be configured as a low-cost sensor system having minimal processing resources, e.g., processing resources sufficient to perform the background light level compensation but not enough to perform image (or video) construction in user-acceptable time. In this embodiment, the system 100 may store and/or transmit the compensated samples $\{I_{CMPN}(k)\}$ so that another agent, more plentifully endowed with processing resources, may perform the image/video construction based on the compensated samples.

In one embodiment, the action of compensating the samples $\{I_{MLS}(k)\}$ for the variation in background light level may be performed by some system other than system 100. In this case, system 100 may transmit the samples $\{I_{MLS}(k)\}$ and the samples of background light level to the other system through a communication channel. The other system may use the compensated samples to construct the image/video.

Figure 2C:
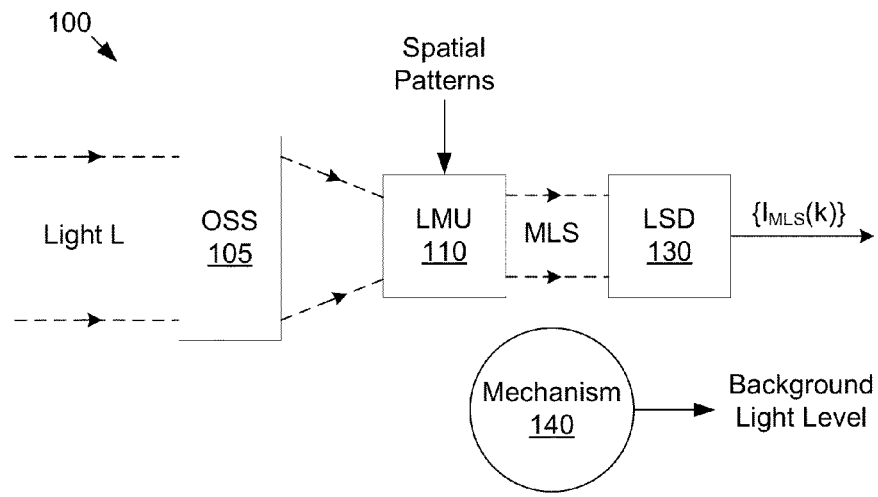
FIG. 2C illustrates an embodiment of system 100 that includes an optical subsystem 105 to focus received light L onto the light modulation unit 110.
Figure 2D:
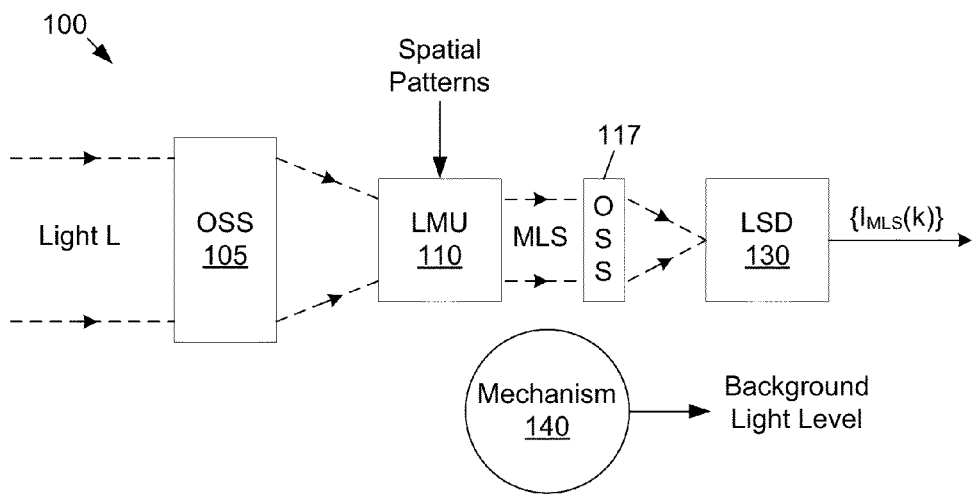
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or set of lenses). The lens (or set of lenses) may be adjustable to accommodate a range of distances to external objects being imaged/sensed/captured.

In some embodiments, system 100 may include an optical subsystem 117 to direct the modulated light stream MLS onto a light sensing surface (or surfaces) of the light sensing device 130.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot)—points close together on the object plane map respectively to points (or spots) close together on the image plane. In some embodiments of system 100 that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in some of the embodiments where the light sensing device 130 includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense at any given time the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
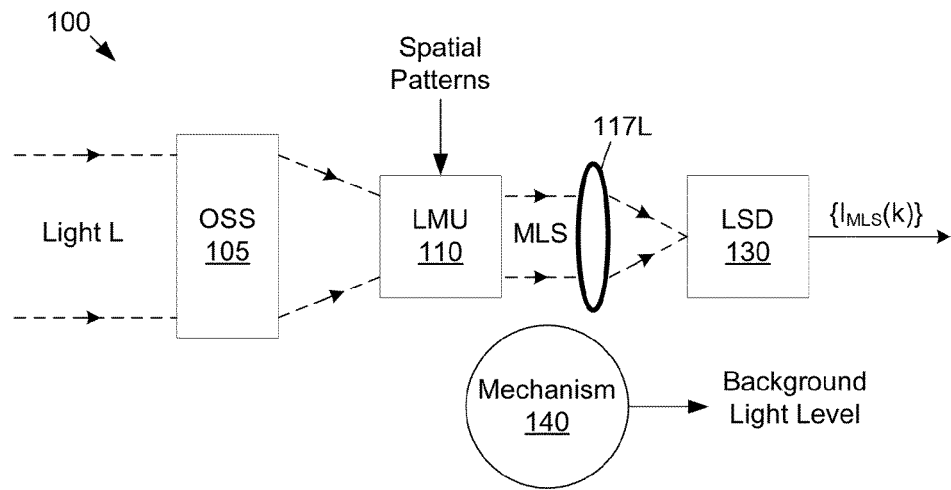
FIG. 2E illustrates an embodiment where the optical subsystem 117 is realized by a lens 117L.

In some embodiments, the optical subsystem 117 may include a lens 117L, e.g., as shown in FIG. 2E. In one embodiment, the lens 117L may be a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured by each light sensing device may be used to construct a corresponding image for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel multi-spectral imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the optical mechanism may include two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a beam splitter) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, wherein each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured by each light sensing device may be used to construct a corresponding image for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition. In another similar embodiment, five streams are generated, filtered with five respective filters, and then measured to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. The samples captured by each light sensing device may be used to construct a corresponding image for the corresponding wavelength range.

Figure 2F:
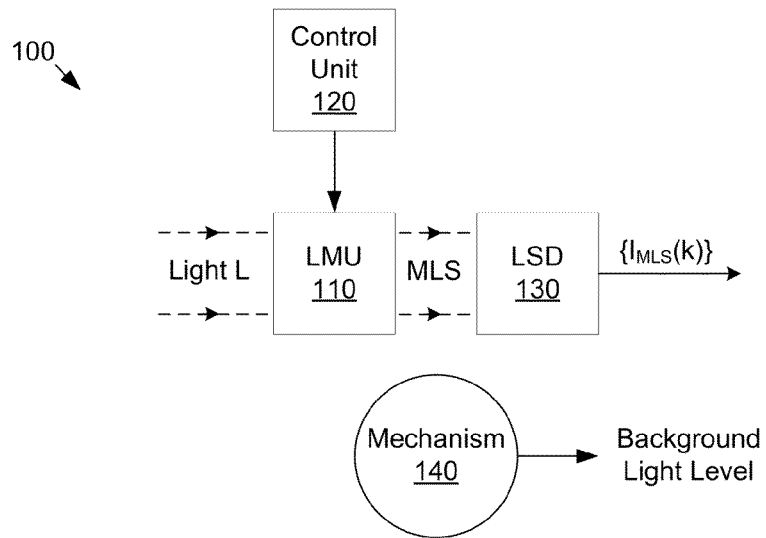
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the light sensing device 130 may be controlled by a common clock signal so that the light sensing device 130 can coordinate (synchronize) its action of capturing the samples $\{I_{MLS}(k)\}$ with the control unit's action of supplying spatial patterns to the light modulation unit 110. (System 100 may include clock generation circuitry.)

In some embodiment, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying constructed images/videos.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

The spatial patterns may belong to a set of measurement vectors that is incoherent with a set of vectors in which the image/video is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors A={$a_i$} and B={$b_i$} in the same N-dimensional space, A and B are said to be incoherent if their coherence measure $\mu(A,B)$ is sufficiently small. The coherence measure is defined as:

$$\mu(A, B) = \max_{i,j} |\langle a_i, b_j \rangle|.$$

The number of compressive sensing measurements (i.e., samples of the sequence $\{I_{MLS}(k)\}$ needed to construct an N-pixel image (or N-voxel video sequence) that accurately represents the scene being captured is a strictly increasing function of the coherence between the measurement vector set and the sparsity vector set. Thus, better compression can be achieved with smaller values of the coherence.

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a permuted basis such as a permuted DCT basis or a permuted Walsh-Hadamard basis, etc.

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1−p of giving the value zero. (For example, in one embodiment p=½.) In some embodiments, the elements of each pattern are generated by a series of draws from a Gaussian random variable.)

The system 100 may be configured to operate in a compressive fashion, where the number of the samples $\{I_{MLS}(k)\}$ captured by the system 100 is less than (e.g., much less than) the number of pixels in the image (or video) to be constructed from the samples. In many applications, this compressive realization is very desirable because it saves on power consumption, memory utilization and transmission bandwidth consumption. However, non-compressive realizations are contemplated as well.

In some embodiments, the system 100 is configured as a camera that captures information representing an image (or a series of images) of some external object or scene. The camera system may take different forms in different applications domains, e.g., domains such as visible light photography, infrared photography, ultraviolet photography, high-speed photography, low-light photography, underwater photography, multi-spectral imaging, hyper-spectral imaging, etc. In some embodiments, system 100 is configured to operate in conjunction with (or as part of) another system, e.g., in conjunction with a microscope, a telescope, a robot, a security system, a surveillance system, a node in a distributed sensor network, etc.

In some embodiments, system 100 may also be configured to operate as a projector. Thus, system 100 may include a light source, e.g., a light source located at or near a focal point of optical subsystem 117. The light modulation unit 110 may be supplied with an image (or a video sequence) so that the image (or video sequence) can be displayed on a display surface (e.g., screen).

In some embodiments, the background light signal generated by mechanism 140 may be used to control the size (e.g., diameter) of a physical aperture that is applied to the received light stream L, to control the amount of light received by system 100. Alternatively, the background light signal may be used to control the size (e.g., diameter) of an aperture implemented by the light modulation unit, by appropriate control of the spatial patterns. Prior to being applied to the light modulation unit, each of the spatial patterns may be masked with an aperture pattern that nullifies the values of the spatial pattern outside a central region (e.g., central disk).

Figure 3A:
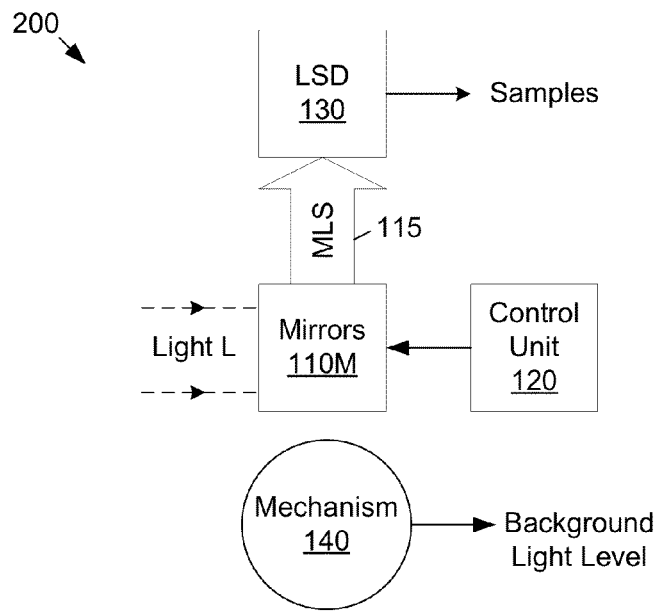
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in one embodiment, the array is a square array. In another embodiment, the array is hexagonal. In some embodiments, the mirrors are arranged in spatially random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate a sequence of samples representing a cumulative intensity of the received light portions as a function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation over the light portions arriving at the light sensing device at any given time. As will be described below, that summation may be implemented, at least in part, optically (e.g., by means of a lens and/or mirror that concentrates or focuses the light portions onto a concentrated area as described above).

Figure 3B:
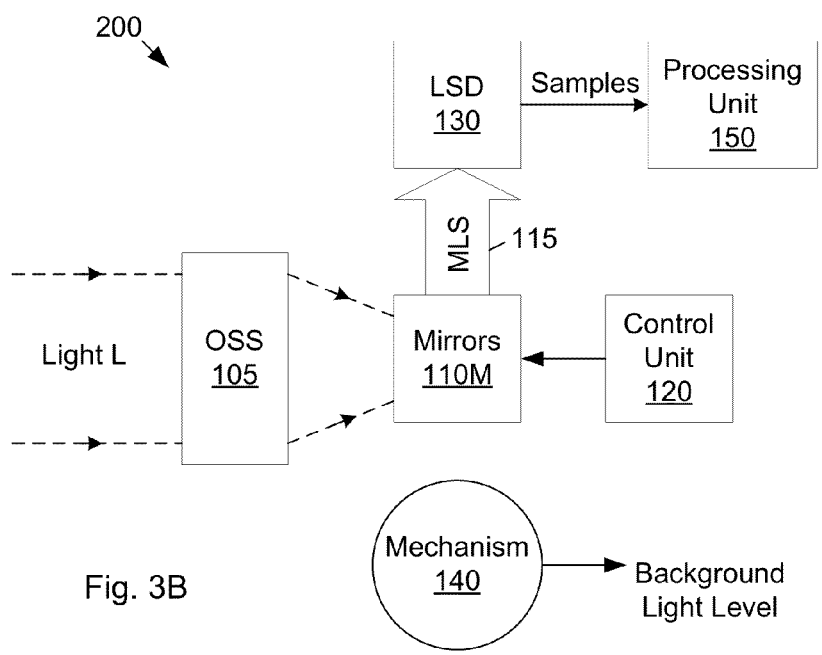
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
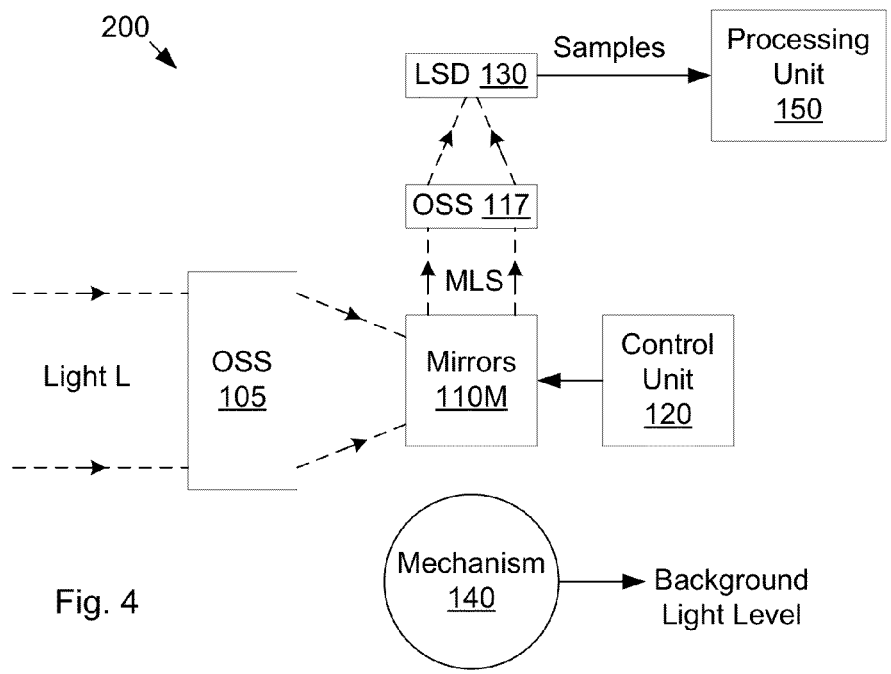
FIG. 4 shows an embodiment of system 200 that includes the optical subsystem 117 to direct or focus or concentrate the modulated light stream MLS onto the light sensing device 130.
Figure 5A:
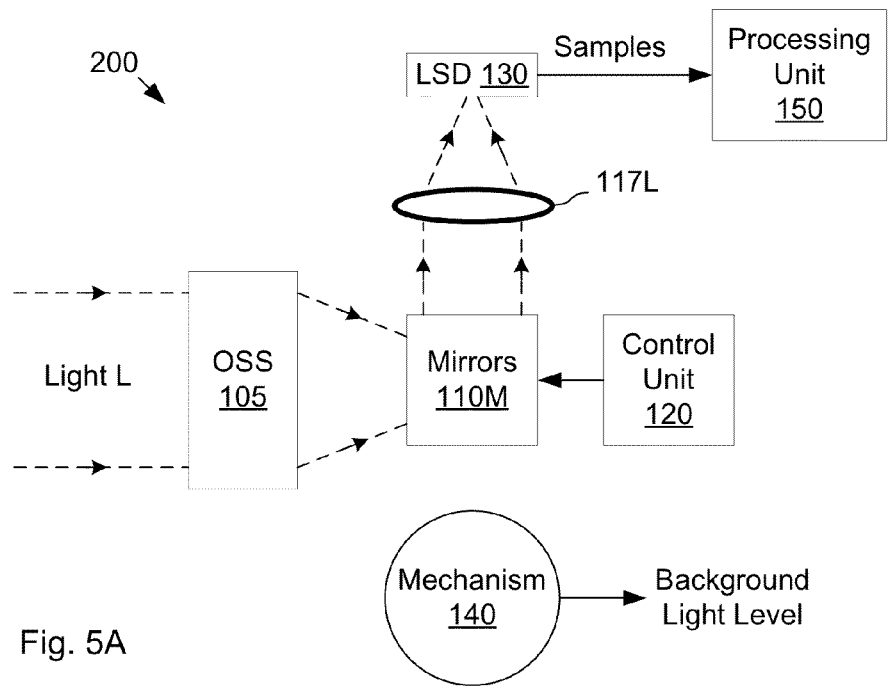
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface of the light sensing device 130. In one embodiment, the optical subsystem 117 may include a lens 117L, e.g., as shown in FIG. 5A.

Figure 5B:
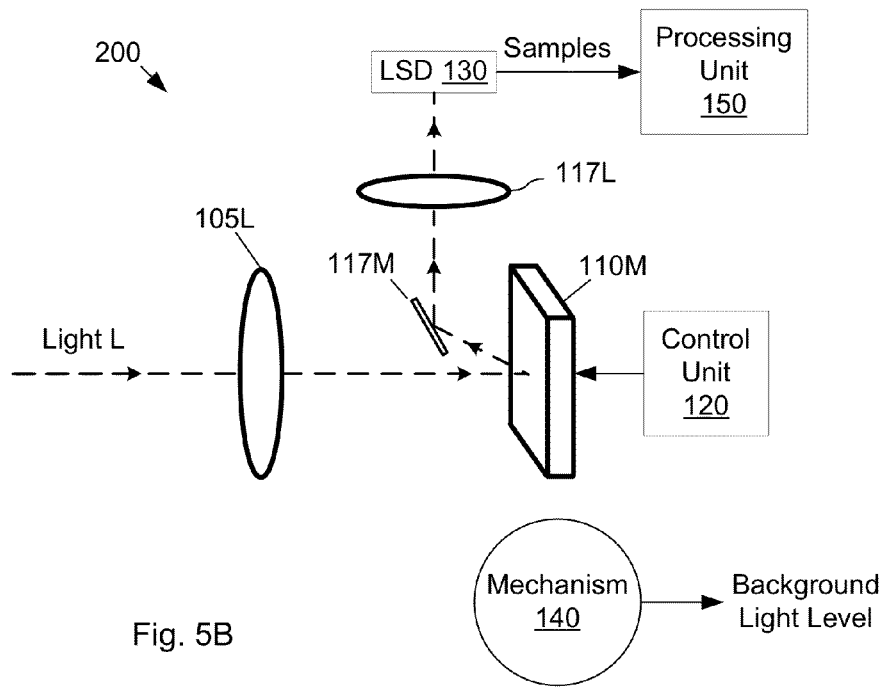
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
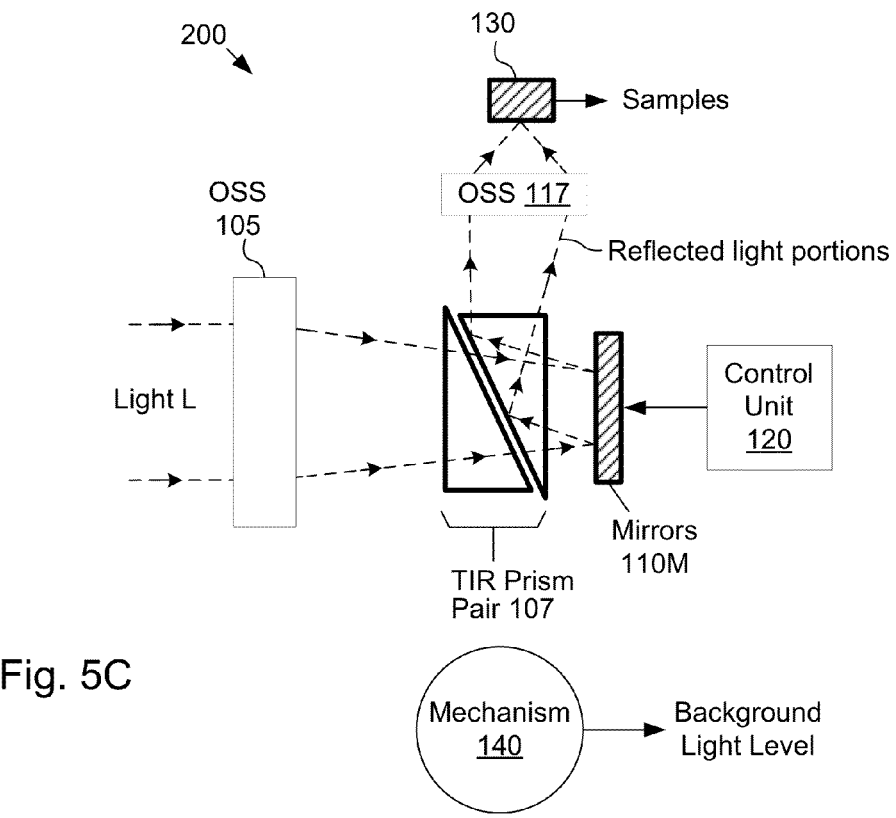
FIG. 5C shows another embodiment of system 200 that includes a TIR prism pair 107.

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".) Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

Calibration Patterns Interspersed Among Measurement Patterns

Figure 6A:
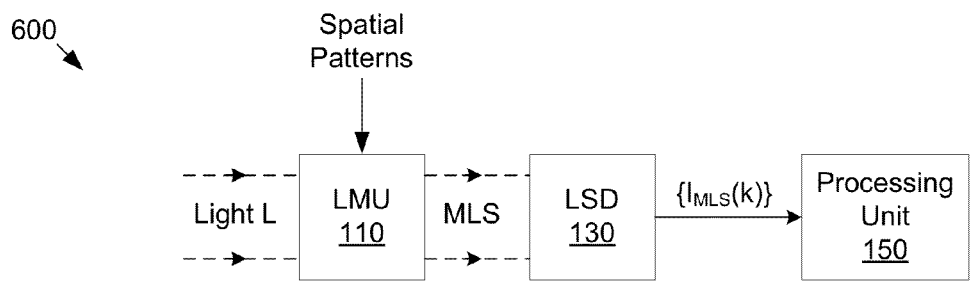
FIG. 6A shows an embodiment of a system 600 that injects calibration patterns among the spatial patterns being fed to the light modulation unit 110 so that the samples captured by the light sensing device 130 include calibration information in addition to compressive imaging measurements.

In one set of embodiments, a system 600 for operating on a stream of light from an environment may be configured as shown in FIG. 6A.

The system 600 may include the light modulation unit 110, the light sensing device 130 and the processing unit 150 as described above. (Furthermore, any subset of the features, embodiments and elements discussed above with respect to system 100 and system realization 200 may be incorporated into system 600.)

In system 600, the mechanism 140 for measuring background light level is realized by including calibration patterns as well as measurement patterns in the series of spatial patterns supplied to the light modulation unit 110. Thus, the sequence of samples $\{I_{MLS}(k)\}$ generated by the light sensing device 130 will include samples (e.g., compressive sensing measurements) corresponding to the measurement patterns and samples corresponding to the calibration patterns. The calibration patterns are designed so that the corresponding samples will represent variation in the background light level. There are a wide variety of ways to satisfy this design constraint.

In some embodiments, each of the calibration patterns specifies that all the light modulating elements (of the light modulation unit 110) should assume the maximum transfer state. The maximum transfer state of a light modulating element is the state in which the ratio of the intensity of the light portion outputted onto the light sensing path 115 to the intensity of the light portion incident upon the element is maximized, within the range of control supported by the element. (For example, for an element having controllable transmittance, such as an LCD shutter, the maximum transfer state is the state of maximum transparency. As another example, for a reflective element such as a micromirror in a DMD, the maximal transfer state is the orientation state that reflects the received light portion onto the sensing path 115.) Thus, when one of the calibration patterns is being asserted on the light modulation unit 110, the modulated light stream MLS most closely approximates the incident light stream L (among all possible spatial patterns that could be applied by the light modulation unit 110). The samples captured by the light sensing device 130 when the calibration patterns are being applied correspond to (are representative of) the intensity of the incident light stream L (or a fixed fraction of that intensity).

In some embodiments, each of the calibration patterns specifies that all the light modulating elements should assume the p transfer state, where p is a fixed fraction greater than zero and less than or equal to one. The p transfer state of a light modulating element is the state in which the ratio of the intensity of the light portion leaving the element, relative to the intensity of the light portion entering the element, is equal to p. (For example, the 0.5 transfer state might be realized by setting a controllable-transmittance element to its state of 50% transmittance, or, by controlling a digital micromirror to spend half of a sampling period is the first orientation state and the other half of the sampling period in the second orientation state.) As a result, the samples captured when the calibration patterns are being applied correspond to (are representative of) 50% of the intensity of the incident light stream L.

In another embodiment, each of the calibration patterns is identical to a given maximum-resolution checkerboard pattern, where half the light modulating elements are ON (maximal transfer) and the remaining half are OFF (minimal transfer). (A maximum-resolution checkerboard pattern is a pattern where the elements immediately north, south, east and west of any given interior element take the state that is opposite to the state of the given interior element.) Consequently, when any one of the calibration patterns is being asserted, the modulated light stream MLS represents approximately 50% of the power in the incident light stream L. The samples captured by the light sensing device 130 when the calibration patterns are being asserted will correspond to samples of approximately ½ of the intensity (or power) of the light stream L.

In another embodiment, the checkerboard pattern may be of lower-resolution, e.g., a checkerboard pattern whose fundamental units are L×L squares with L>1, e.g., 2×2 squares or 4×4 squares.

In yet another embodiment, the calibration patterns are not all identical. For example, the calibration patterns may alternate between a first checkerboard pattern and a second checkerboard pattern, where the first and second checkerboard patterns are complementary to each other: one takes the ON state where the other takes the OFF state, and vice versa.

As variously described above, the light modulation unit 110 is configured to modulate the light stream L with a series of spatial patterns in order to produce a modulated light stream MLS. (See FIG. 6A.) The light modulation unit includes a plurality of light modulating elements configured to modulate corresponding portions of the light stream. Each of the spatial patterns specifies an amount of modulation (or scalar multiplier) for each of the light modulating elements. In other words, each spatial pattern P specifies a collection of control values for the light modulating elements, one control value per element. A control value controls the amount of modulation applied by the corresponding light modulating element. The series of spatial patterns includes measurement patterns and calibration patterns, e.g., as variously described above.

The light sensing device 130 is configured to receive the modulated light stream MLS and to generate a sequence of samples $\{I_{MLS}(k)\}$ representing intensity of the modulated light stream as a function of time, e.g., as variously described above.

The processing unit 150 is configured to receive the sequence of samples generated by the light sensing device 130 and to separate the sequence into a first subsequence of samples that correspond to the measurement patterns and a second subsequence of samples that correspond to the calibration patterns. The samples of the first subsequence may be interpreted as compressive sensing (CS) measurements. The second subsequence of samples represents variation in background light level.

The processing unit 150 may be configured to store the first subsequence and second subsequence of samples in a memory. The first subsequence and second subsequence are usable to construct an image or a video sequence, and/or, to perform an inference task as variously described above.

The samples of the second subsequence may be used to compensate the samples of the first subsequence for the variation in the background light level, e.g., as variously described above. The compensated samples are usable to construct the image or video sequence, and/or, to perform an inference task as variously described above. The compensation may be performed by system 600 or by some other system.

Regarding the measurement patterns, a wide variety of realizations are possible. In some embodiments, the measurement patterns may belong to a measurement vector set that is incoherent with respect to a sparsity vector set that will be used to construct the image or video sequence.

Figure 6B:
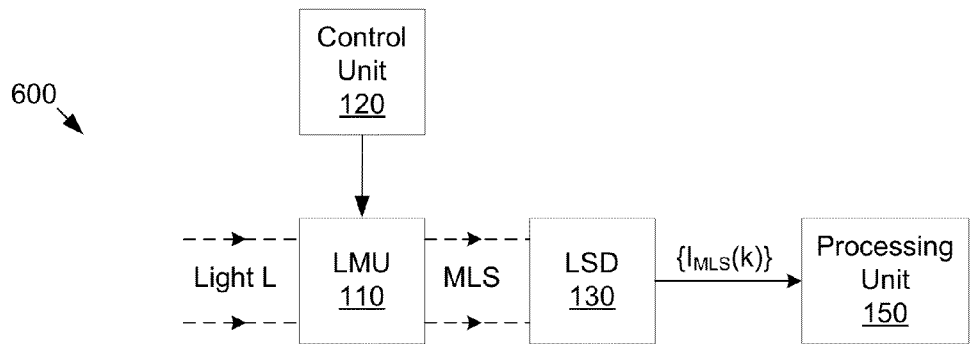
FIG. 6B shows an embodiment of system 600 that includes a control unit. The control unit supplies the spatial patterns to the light modulation unit 110.

Referring now to FIG. 6B, system 600 may also include the control unit 120 as described above. The control unit supplies the series of spatial patterns to the light modulation unit 110. The control unit may include (or insert) the calibration patterns in the series of spatial patterns according to any of a variety of methods. In one embodiment, the calibration patterns may be included in series of patterns in a periodic fashion, i.e., one out of every $N_P$ patterns in the series may be a calibration pattern and the remaining $N_P-1$ patterns may be measurement patterns. In another embodiment, the calibration patterns may be included in the series of patterns with a variable rate that depends on rate of change of the background light level or on the variance of a set of most recent samples of the background light level. For example, the processing unit 150 may analyze the samples of the background light level to determine the rate of change $r_{BGL}$ of the background light level. The rate at which the calibration patterns are included in the series of patterns may increase as $r_{BGL}$ increases.

Figure 6C:
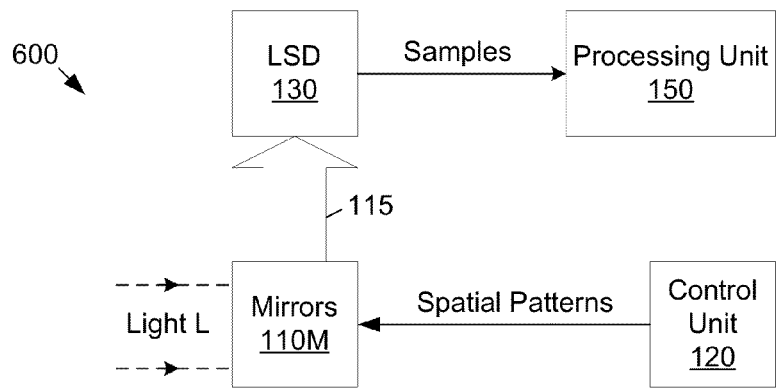
FIG. 6C shows an embodiment of system 600 where the light modulation unit 110 is realized by the mirrors 110M.

In some embodiments of system 600, the light modulation unit 110 may be realized by the mirrors 110M, as shown in FIG. 6C. In these embodiments, the control unit 120 is configured to drive the orientation states of the mirrors through the series of patterns. As described above, the series of patterns includes both measurement patterns and calibration patterns. Thus, the sequence of samples generated by the light sensing device 130 will include samples corresponding to the measurement patterns and samples corresponding to the calibration patterns. The samples corresponding to the calibration patterns (i.e., the samples of the second subsequence) represent variation of the background light level.

In one embodiment, each of the calibration patterns specifies that all the mirrors should be in the first orientation state that reflects light onto the sensing path 115.

In another embodiment, each of the calibration patterns is identical to a checkerboard pattern.

In one set of embodiments, a method 700 for operating on a stream of light may involve the actions shown in FIG. 7A. In one embodiment, the method 700 may be performed using the system 600 described above.

Action 710 includes modulating the light stream with a series of spatial patterns in order to produce a modulated light stream, e.g., as variously described above. The series of spatial patterns includes measurement patterns and calibration patterns, e.g., as variously described above.

Action 715 includes generating a sequence of samples representing intensity of the modulated light stream as a function of time, e.g., as variously described above.

Action 720 includes separating the sequence of samples into a first subsequence of samples that correspond to the measurement patterns and a second subsequence of samples that correspond to the calibration patterns. The second subsequence of samples represents variation in background light level.

In one embodiment, the method 700 may also include storing the first subsequence of samples and the second subsequence of samples in a memory. The first subsequence and the second subsequence of samples are usable to construct an image or a video sequence, and/or, to perform an inference task as variously described above.

In one embodiment, the method 700 may also include compensating the first subsequence of samples for the variation in background light level using the second subsequence of samples, e.g., as variously described above.

In one embodiment, the method 700 may also include constructing the image or the video sequence based on the compensated samples, e.g., as variously described above.

In one embodiment, the method 700 may also include transmitting the compensated samples to a receiver through a communication channel. The receiver may be configured to construct the image or the video sequence based on the compensated samples, and/or, to perform the inference task as described above.

In some embodiments, a non-transitory computer-readable memory medium may be configured so that it stores program instructions, where the program instructions, when executed by a computer system, cause the computer system to: (1) supply a series of spatial patterns to a light modulation unit, where the light modulation unit is configured to modulate a received light stream with the series of spatial patterns to obtain a modulated light stream, where the series of spatial patterns includes first patterns and calibration patterns (e.g., as variously described above); (2) receive a sequence of samples from a first light sensing device (e.g., the light sensing device as variously described above), where the sequence of samples represents intensity of the modulated light stream as a function of time; and (3) separate the sequence of samples into a first subsequence of samples corresponding to the first patterns and a second subsequence of samples corresponding to the calibration patterns, where the second subsequence of samples represents variation of background light level in the environment.

In some embodiments, a method 750 (e.g., a method for operating on light) may involve the actions shown in FIG. 7B. In one embodiment, the method may be performed using the system 600 described above.

Action 760 includes controlling a plurality of mirrors. The mirrors are configured to reflect corresponding portions of a received beam of light, where each of the mirrors is configured to controllably switch between two orientation states. The action of controlling the mirrors includes driving the mirrors through a series of spatial patterns, where each of the spatial patterns specifies an orientation state for each of the mirrors. The series of spatial patterns includes measurement patterns and calibration patterns, e.g., as variously described above.

Action 770 includes receiving a sequence of samples from a light sensing device (e.g., the light sensing device as described above). The sequence of samples represents cumulative intensity of light portions reflected by mirrors in a first of the two orientation states as a function of time.

Action 780 includes separating the sequence of samples into a first subsequence of samples corresponding to the measurement patterns and a second subsequence of samples corresponding to the calibration patterns. The second subsequence of samples represents variation of background light level in the environment.

Various additional embodiments as described in the following numbered paragraphs.

1.1 A system for operating on a stream of light, the system comprising:

a light modulation unit configured to modulate the light stream with a series of spatial patterns in order to produce a modulated light stream, wherein the light modulation unit includes a plurality of light modulating elements configured to modulate corresponding portions of the light stream, wherein each of the spatial patterns specifies an amount of modulation for each of the light modulating elements, wherein the series of spatial patterns includes first patterns and calibration patterns;

a light sensing device configured to receive the modulated light stream and to generate a sequence of samples representing intensity of the modulated light stream as a function of time; and a processing unit configured to separate the sequence of samples into a first subsequence of samples that correspond to the first patterns and a second subsequence of samples that correspond to the calibration patterns, wherein the second subsequence of samples represents variation in background light level.

1.2 The system of paragraph 1.1, further comprising a first optical subsystem configured to receive the light stream and to focus the received light stream onto the light modulation unit.

1.3 The system of paragraph 1.1, wherein the processing unit is configured to store the first subsequence and second subsequence of samples in a memory, wherein the first subsequence and second subsequence are usable to construct an image or a video sequence.

1.4 The system of paragraph 1.1, wherein the samples of the second subsequence are used to compensate the samples of the first subsequence for the variation in the background light level, wherein the compensated samples are usable to construct an image or a video sequence.

1.5 The system of paragraph 1.4, wherein the processing unit is configured to perform said compensation of the samples of the first subsequence using the samples of the second subsequence.

1.6 The system of paragraph 1.4, wherein the processing unit is configured to transmit the compensated samples to a receiver through a communication channel, wherein the receiver is configured to construct the image or the video sequence based on the compensated samples.

1.7 The system of paragraph 1.1, wherein the plurality of light modulating elements are mirrors whose orientations are independently controllable.

1.8 The system of paragraph 1.1, wherein the plurality of light modulating elements are elements whose transmittances are independently controllable.

1.9 The system of paragraph 1.1, further comprising a second optical subsystem configured to direct the modulated light stream onto a light sensing surface of the light sensing device.

1.10 The system of paragraph 1.1, wherein the modulation amounts specified by the spatial patterns are binary values.

1.11 The system of paragraph 1.1, wherein the light sensing device includes one or more photodiodes.

1.12 The system of paragraph 1.1, wherein the plurality of light modulating elements are arranged in a two-dimensional array.

1.13 The system of paragraph 1.1, wherein the first patterns are pseudo-random patterns.

1.14. The system of paragraph 1.1, wherein the calibration patterns are included in the series of patterns in a periodic fashion.

1.15 A method for operating on a stream of light, the method comprising:

modulating the light stream with a series of spatial patterns in order to produce a modulated light stream, wherein the series of spatial patterns includes first patterns and calibration patterns;

generating a sequence of samples representing intensity of the modulated light stream as a function of time; and separating the sequence of samples into a first subsequence of samples that correspond to the first patterns and a second subsequence of samples that correspond to the calibration patterns, wherein the second subsequence of samples represents variation in background light level.

1.16 The method of paragraph 1.15, further comprising storing the first subsequence of samples and the second subsequence of samples in a memory, wherein the first subsequence and the second subsequence of samples are usable to construct an image or a video sequence.

1.17 The method of paragraph 1.15, further comprising compensating the first subsequence of samples for the variation of background light level using the second subsequence of samples.

1.18. The method of paragraph 1.17, further comprising constructing an image or a video sequence based on the compensated samples.

1.19. The method of paragraph 1.17, further comprising transmitting the compensated samples to a receiver through a communication channel.

1.20. The method of paragraph 1.15, wherein the first patterns are pseudo-random patterns.

1.21 The method of paragraph 1.15, wherein each of the calibration patterns is a constant pattern specifying that all the light modulating elements assume a maximal transfer state.

1.22 A non-transitory computer-readable memory medium storing program instructions, wherein the program instructions, when executed by a computer system, cause the computer system to: supply a series of spatial patterns to a light modulation unit, wherein the light modulation unit is configured to modulate a received light stream with the series of spatial patterns to obtain a modulated light stream, wherein the series of spatial patterns includes first patterns and calibration patterns; receive a sequence of samples from a first light sensing device, wherein the sequence of samples represents intensity of the modulated light stream as a function of time; and separate the sequence of samples into a first subsequence of samples corresponding to the first patterns and a second subsequence of samples corresponding to the calibration patterns, wherein the second subsequence of samples represents variation of background light level.

1.23 A system for operating on light from an environment, the system comprising:

a plurality of mirrors, wherein each of the mirrors is configured to controllably switch between two orientation states, wherein each of the mirrors is configured to (a) reflect a corresponding portion of the light onto a sensing path when the mirror is in a first of the two orientation states and (b) reflect the corresponding portion of the light away from the sensing path when the mirror is in a second of the two orientation states;

a control unit configured to drive the orientation states of the mirrors through a series of spatial patterns, wherein each of the patterns of the series specifies an orientation state for each of the mirrors, wherein the series of patterns includes first patterns and calibration patterns;

a light sensing device configured to receive light portions reflected onto the sensing path by mirrors in the first orientation state and to generate a sequence of samples representing a cumulative intensity of the light portions reflected onto the sensing path as a function of time; and a processing unit configured to separate the sequence of samples into a first subsequence of samples that correspond to the first patterns and a second subsequence of samples that correspond to the calibration patterns, wherein the second subsequence of samples represents variation in background light level.

1.24. The system of paragraph 1.23, further comprising a first optical subsystem configured to receive the light from the environment and to focus the received light onto the plurality of mirrors.

1.25. The system of paragraph 1.24, further comprising a TIR prism pair positioned between the first optical subsystem and the plurality of mirrors.

1.26. The system of paragraph 1.23, further comprising a second optical subsystem configured to receive the light portions reflected onto the sensing path by mirrors in the first orientation state, and to direct the received light portions onto a light sensing surface of the light sensing device.

1.27 A method comprising:

controlling a plurality of mirrors, wherein the mirrors are configured to reflect corresponding portions of a received beam of light, wherein each of the mirrors is configured to controllably switch between two orientation states, wherein said controlling the mirrors includes driving the mirrors through a series of spatial patterns, wherein each of the spatial patterns specifies an orientation state for each of the mirrors, wherein the series of spatial patterns includes first patterns and calibration patterns;

receiving a sequence of samples from a first light sensing device, wherein the sequence of samples represents cumulative intensity of light portions reflected by mirrors in a first of the two orientation states as a function of time;

separating the sequence of samples into a first subsequence of samples corresponding to the first patterns and a second subsequence of samples corresponding to the calibration patterns, wherein the second subsequence of samples represents variation of background light level in the environment.

1.28 The method of paragraph 1.27, wherein each of the calibration patterns is a pattern specifying that all the mirrors be in the first orientation state.

Sensing Light Reflected by Mirrors in Both Orientation States

Figure 8:
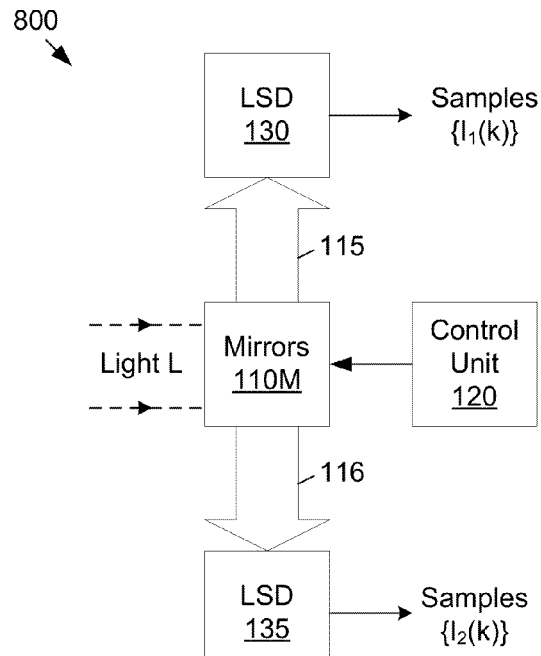
FIG. 8 shows an embodiment of a system 800 that measures the light reflected at any given time from mirrors in the first orientation state and the light reflected at any given time from mirrors in the second orientation state. The two resulting signals may be combined to infer the background light level as a function of time.

In one set of embodiments, a system 800 for operating on incident light from an environment may be configured as shown in FIG. 8. System 800 includes the mirrors 110M, the control unit 120 and the light sensing device 130 as described above in connection with system realization 200, and also includes a second light sensing device 135 to be described presently. (Any subset of the features, embodiments and elements discussed above with respect to system 100 and system realization 200 may be incorporated into system 800.) While light sensing device 130 is sensitive to the light portions reflected by mirrors in the first orientation state, light sensing device 135 is sensitive to the light portions reflected by mirrors in the second orientation state. Thus, the background light level (or the intensity of the input light L) may be inferred by appropriately combining the intensity signals (the outputs) of the two light sensing devices.

In system 800, an alternative sensing path 116 is provided, i.e., alternative to the sensing path 115. The alternative path extends from the mirrors 110M to the light sensing device 135.

The mirrors 110M are configured to receive corresponding portions of the input light L. Each of the mirrors is configured to controllably switch between two orientation states. Furthermore, each of the mirrors is configured to (a) reflect the corresponding portion of the light L onto the sensing path 115 when the mirror is in the first orientation state and (b) reflect the corresponding portion of the light L onto the alternative path 116 when the mirror is in the second orientation state.

The first light sensing device 130 is configured to receive the first subset of light portions that are reflected onto the sensing path 115 by mirrors in the first orientation state and to generate a first sequence of samples $\{I_1(k)\}$ representing a cumulative intensity of the first subset of light portions as a function of time. (The first subset continuously changes as the control unit 120 drives the mirrors 110M through the series of spatial patterns.) The samples of the first sequence $\{I_1(k)\}$ comprise an encoded (e.g., compressed) representation of an image or video sequence.

The light sensing device 135 is configured to receive the second subset of light portions that are reflected onto the alternative path 116 by mirrors in the second orientation state and to generate a second sequence of samples $\{I_2(k)\}$ representing a cumulative intensity of the second subset of light portions as a function of time. (As with the first subset, the second subset of light portions continuously changes as the control unit 120 drives the mirrors 110M through the series of spatial patterns.) The samples of the second sequence $\{I_2(k)\}$ represent an encoded (e.g., compressed) representation of the same image or video sequence. The first sequence $\{I_1(k)\}$ and second sequence $\{I_2(k)\}$ may be interpreted as complementary encodings of the same image (or video sequence) because the spatial patterns as seen by the light sensing device 130 are complementary to the spatial patterns as seen by the light sensing device 135.

In some embodiments, the light sensing devices 130 and 135 may be designed to have the same (or similar) parameters, e.g., sensitivities to incident light, areas of light receiving surface, etc. Alternatively, the light sensing devices 130 and 135 may be different by design.

The first sequence $\{I_1(k)\}$ and the second sequence $\{I_2(k)\}$ may be combined to obtain a third sequence $\{I_{BGL}(k)\}$ that represents variation in the background light level. In some embodiments, the samples of the third sequence $\{I_{BGL}(k)\}$ may be used to compensate the samples of the first sequence $\{I_1(k)\}$ for the variation in background light level, e.g., as variously described above. The compensated samples may be used to construct an image or a video sequence, e.g., using any of the various construction methods known in the field of compressive sensing. As noted above, the compensated samples may be used to perform a task other than or in addition to image construction, e.g., to perform detection, classification, tracking, etc.

There are various ways of combining the first sequence $\{I_1(k)\}$ and the second sequence $\{I_2(k)\}$ to obtain the third sequence $\{I_{BGL}(k)\}$, e.g., depending on the nature of physical quantity measured by the light sensing devices 130 and 135. In one embodiment, the third sequence $\{I_{BGL}(k)\}$ may be determined based on the expression:

$$I_{BGL}(k)=I_1(k)+I_2(k),$$

or more generally, $$I_{BGL}(k)=\alpha I_1(k)+\beta I_2(k),$$

where $\alpha$ and $\beta$ are positive real constants. (The constants $\alpha$ and $\beta$ may be used to compensate for any imbalance in the delivery of light power between the sensing path and the alternative path and/or any imbalance in the sensitivities of the light sensing devices 130 and 135.) In some embodiments, $I_{BGL}(k)$ may be determined based on a combination of $g(I_1(k))$ and $g(I_2(k))$, where $g(*)$ is a strictly increasing function (such as a logarithm function or the square-root function). Yet more generally, $I_{BGL}(k)$ may be determined based on a functional combination of $I_1(k)$ and $I_2(k)$:

$$I_{BGL}(k)=f(I_1(k),I_2(k)),$$

where $f(*,*)$ is a function of two real variables. The function f may be increasing in each variable.

In one embodiment, the analog signals $I_1(t)$ and $I_2(t)$ generated by the light sensing devices may be combined (e.g., added) in the analog domain to obtain an analog signal $I_{BGL}(t)$ that represents variation in the background light level. The analog signal $I_{BGL}(t)$ may then be digitized to obtain the samples $\{I_{BGL}(k)\}$.

Figure 9:
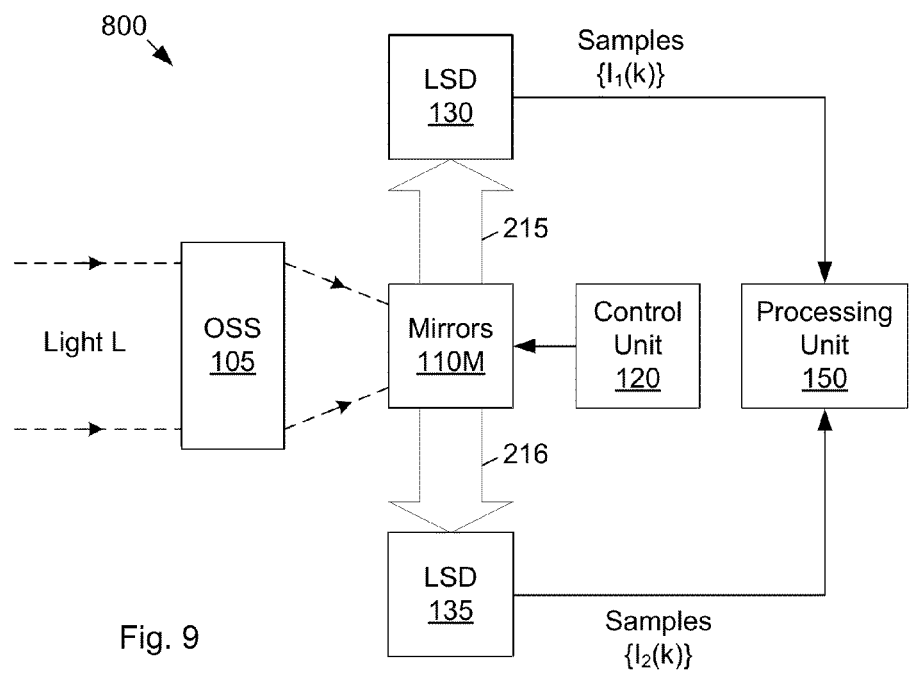
FIG. 9 illustrates an embodiment of system 800 that includes a processing unit and an optical subsystem 105 to focus incoming light onto the mirrors 110M.

As shown in FIG. 9, system 800 may include the processing unit 150 described above in connection with system 100 and system realization 200. The processing unit 150 may be configured to perform the action of combining the first sequence $\{I_1(k)\}$ and the second sequence $\{I_2(k)\}$ of samples to obtain the third sequence $\{I_{BGL}(k)\}$ of samples. Furthermore, the processing unit 150 may be configured to compensate the samples of the first sequence $\{I_1(k)\}$ for the variation in background light level using the samples of the third sequence $\{I_{BGL}(k)\}$, e.g., as variously described above. In some embodiments, the action of compensating the samples $\{I_1(k)\}$ may be performed by some other agent (e.g., digital logic) that resides in system 800 or outside of system 800.

The first sequence $\{I_1(k)\}$ and the third sequence $\{I_{BGL}(k)\}$ may be stored in a memory that resides in system 800 or in some other system. The first sequence and third sequence may be used to construct an image or a video sequence using any of the various construction methods known to compressive sensing theory.

In some embodiments, the first sequence $\{I_1(k)\}$ and the second sequence $\{I_2(k)\}$ may be stored in a memory.

Referring again to FIG. 9, system 800 may also include the optical subsystem 105 as variously described above in connection with system 100 and system realization 200.

Figure 10:
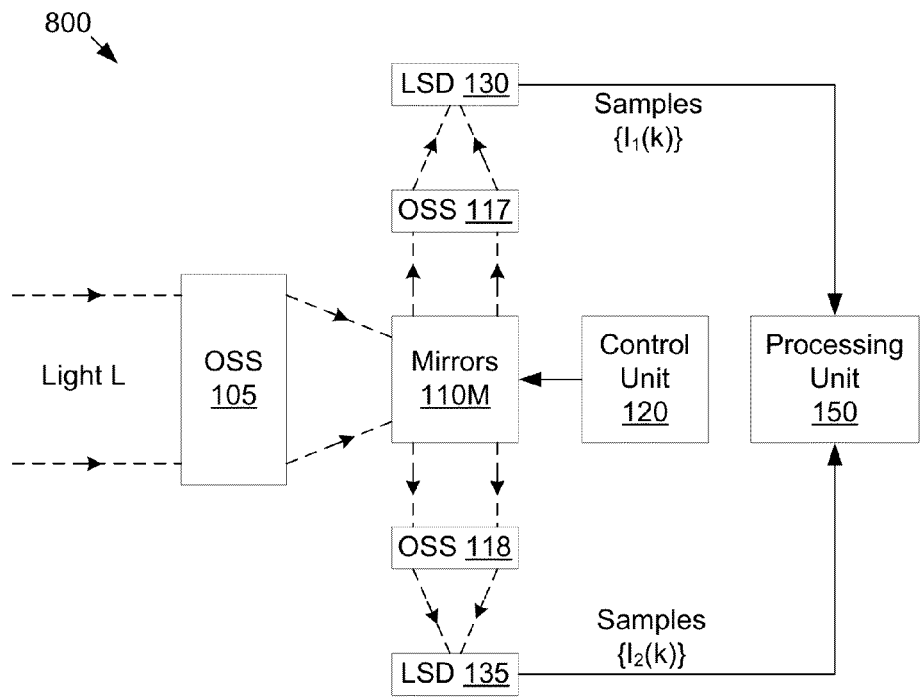
FIG. 10 illustrates an embodiment of system 800 that includes: an optical subsystem 117 to direct or focus or concentrate light portions reflected by the mirrors in the first orientation state onto a light sensing surface of the light sensing device 130, and an optical subsystem 118 to direct or focus or concentrate light portions reflected by the mirrors in the second orientation state onto a light sensing surface of the light sensing device 135.

As shown in FIG. 10, system 800 may include the optical subsystem 117 as variously described above in connection with system 100 and system realization 200. The optical subsystem 117 is configured to receive the first subset of light portions that are reflected onto the sensing path 115 by mirrors in the first orientation state, and to direct (e.g., focus or concentrate) the first subset of light portions onto a light sensing surface of the light sensing device 130. Furthermore, system 800 may include an optical subsystem 118. The optical subsystem 118 is configured to receive the second subset of light portions that are reflected onto the alternative path 116 by mirrors in the second orientation state, and to direct (e.g., focus or concentrate) the second subset of light portions onto a light sensing surface of the light sensing device 135.

In some embodiments, the optical subsystems 117 and 118 may be designed to have the same (or similar) power attenuation.

In some embodiments, optical subsystems 117 and 118 are identical (or nearly identical) in construction. For example, the two subsystem may have matching sets of components that are spatially arranged in an identical (or similar) fashion, e.g., according to a mirror-image spatial symmetry.

Figure 11:
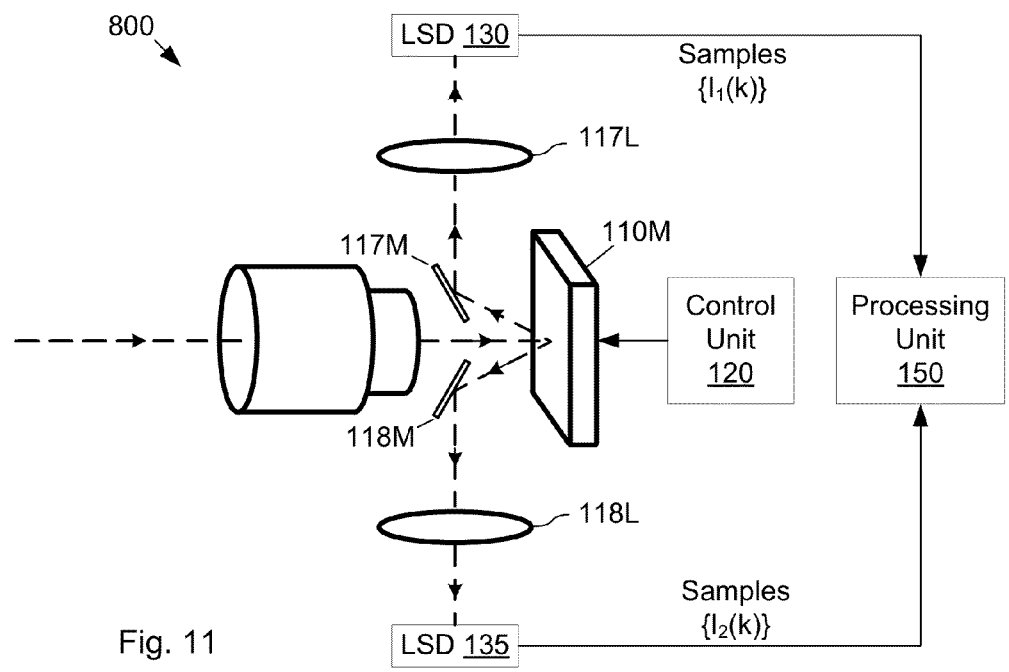
FIG. 11 illustrates one particular embodiment of optical subsystems 117 and 118 using mirrors and lenses.

Optical subsystems 117 and 118 may include components such as one or more lenses and/or one or more mirrors. FIG. 11 shows optical subsystem 117 as having a mirror 117M and a lens 117L, and optical subsystem 118 as having a mirror 118M and a lens 118L.

In some embodiments, light sensing device 130 may include a plurality of light sensing elements (e.g., photodiodes) arranged in an array (or otherwise distributed). The signals (e.g., photocurrents) from the light sensing elements may be sampled by any of various means. The samples from each light sensing element may be processed to construct a corresponding sub-image. Each sub-image corresponds to a respective sub-region of the array of mirrors 110M. Furthermore, the signals (e.g., photocurrents) from all, from a subset or from a number of subsets of the light sensing elements may be summed. The summed signal may be sampled to obtain the signal $I_1(k)$. The signal $I_1(k)$ may be combined with the signal $I_2(k)$ to infer the background light level as a function of time (or the total amount of light in the scene being imaged as a function of time) during the data acquisition process. In some embodiments, light sensing device 135 may also include a plurality of light sensing elements (e.g., photodiodes) arranged in an array (or otherwise distributed). The signal $I_2(k)$ may be similarly generated based on a sum of signals from all, from a subset or from a number of subsets of those light sensing elements.

In some embodiments, the light sensing device 135 includes (or is) a single photodetector such as a photodiode.

In some embodiments, the light sensing device 135 is a spectrometer.

In some embodiments, the light sensing device 135 is configured to sense a different wavelength band than the light sensing device 130. For example, light sensing device 135 may include a photodiode covering a different wavelength band than the wavelength band covered by light sensing device 130.

It is noted that the presence of more than one light sensing device in system 800 allows system 800 to continue functioning as a compressive imaging system if one of the light sensing devices should fail (or otherwise become unreliable). Thus, system 800 (e.g., processing unit 150) may be configured to monitor the signals (e.g., sample sequences $I_1(k)$ and $I_2(k)$ described above) generated by the light sensing devices, and detect any irregular pattern of behavior. If one of the light sensing devices is exhibiting irregular behavior, the system 800 may ignore the signal generated by that light sensing device and use only the signal generated by the remaining (properly functioning) light sensing device to acquire the compressive imaging measurements.

In some embodiments, a method 1200 for operating on light may include the actions shown in FIG. 12. In one embodiment, method 1200 may be performed using system 800.

Action 1210 includes controlling a plurality of mirrors (e.g., the mirrors 110M as described above). The mirrors are configured to reflect corresponding portions of a received beam of light. Each of the mirrors is configured to controllably switch between two orientation states. The operation of controlling the mirrors includes driving the mirrors through a series of spatial patterns, where each of the spatial patterns specifies an orientation state for each of the mirrors. The spatial patterns of the series may be as variously described above. For example, in one embodiment, the spatial patterns may be random patterns or pseudo-random patterns.

Action 1220 includes receiving a first sequence $\{I_1(k)\}$ of samples from a first light sensing device. The first sequence of samples represents cumulative intensity of light portions reflected by mirrors in a first of the two orientation states as a function of time.

Action 1230 includes receiving a second sequence $\{I_2(k)\}$ of samples from a second light sensing device. The second sequence of samples represents cumulative intensity of light portions reflected by mirrors in a second of the two orientation states as a function of time.

Action 1240 includes combining the first sequence and the second sequence of samples to obtain a third sequence $\{I_{BGL}(k)\}$ of samples, e.g., as variously described above. The third sequence of samples represents variation of the background light level.

In one embodiment, method 1200 also includes storing the first sequence $\{I_1(k)\}$ and the third sequence $\{I_{BGL}(k)\}$ of samples in a memory. The first sequence and the third sequence of samples may be used to construct an image or video sequence.

In one embodiment, the method 1200 also includes compensating the first sequence $\{I_1(k)\}$ of samples for the variation of background light level using the third sequence $\{I_{BGL}(k)\}$ of samples, e.g., as variously described above. In one embodiment, the method 1200 may also include constructing an image or video sequence based on the compensated samples.

The method 1200 may also include transmitting the compensated samples to a receiver through a communication channel. The receiver may be configured to construct the image or the video sequence based on the compensated samples.

In some embodiments, a non-transitory computer-readable memory medium may be configured so that it stores program instructions, wherein the program instructions, when executed by a computer system, cause the computer system to: (a) control a plurality of mirrors, wherein the mirrors are configured to reflect corresponding portions of a received beam of light, wherein each of the mirrors is configured to controllably switch between two orientation states, wherein said controlling the mirrors includes driving the mirrors through a series of spatial patterns, wherein each of the spatial patterns specifies an orientation state for each of the mirrors; (b) receive a first sequence of samples from a first light sensing device, wherein the first sequence of samples represents cumulative intensity of light portions reflected by mirrors in a first of the two orientation states as a function of time; (c) receive a second sequence of samples from a second light sensing device, wherein the second sequence of samples represents cumulative intensity of light portions reflected by mirrors in a second of the two orientation states as a function of time; and (d) combine the first sequence and the second sequence of samples to obtain a third sequence of samples that represents variation of background light level.

Note that the technical principle of inferring background light level by combining orientation-specific intensity signals applies more generally to systems where the mirrors 110M have two or more orientation states per mirror. For a system of mirrors where each mirror has n orientation states, n≥2, the system may include n corresponding light sensing devices, each light sensing device configured to capture light from mirrors in a corresponding one of the n orientation states.

Various additional embodiments are described in the following numbered paragraphs.

2.1. A system for operating on light, the system comprising:

a plurality of mirrors configured to receive corresponding portions of the light, wherein each of the mirrors is configured to controllably switch between two orientation states, wherein each of the mirrors is configured to (a) reflect the corresponding portion of the light onto a sensing path when the mirror is in a first of the two orientation states and (b) reflect the corresponding portion of the light onto an alternative path when the mirror is in a second of the two orientation states;

a control unit configured to drive the orientation states of the mirrors through a series of patterns, wherein each of the patterns of the series specifies an orientation state for each of the mirrors;

a first light sensing device configured to receive first light portions reflected onto the sensing path by mirrors in the first orientation state and to generate a first sequence of samples representing a cumulative intensity of the first light portions as a function of time;

a second light sensing device configured to receive second light portions reflected onto the alternative path by mirrors in the second orientation state and to generate a second sequence of samples representing a cumulative intensity of the second light portions as a function of time.

2.2. The system of paragraph 2.1, further comprising a memory that stores the first sequence of samples and a third sequence of samples, wherein the third sequence of samples is a combination of the first sequence and the second sequence of samples and represents variation in background light level.

2.3. The system of paragraph 2.2, wherein the samples of the third sequence are used to compensate the samples of the first sequence for the variation in background light level, wherein the compensated samples are usable to construct an image or a video sequence.

2.4. The system of paragraph 2.1, further comprising a processing unit configured to combine the first sequence and the second sequence of samples to obtain a third sequence of samples that represents variation in background light level, wherein the samples of the third sequence are used to compensate the samples of the first sequence for the variation in background light level, wherein the compensated samples are usable to construct an image or a video sequence.

2.5. The system of paragraph 2.4, wherein the processing unit is configured to perform said compensation of the samples of the first sequence using the samples of the third sequence.

2.6. The system of paragraph 2.1, further comprising an optical input path configured to receive the light and to focus the received light onto the plurality of mirrors.

2.7. The system of paragraph 2.1, further comprising a first optical subsystem configured to receive the first light portions reflected onto the sensing path and to direct the first light portions onto a light sensing surface of the first light sensing device.

2.8. The system of paragraph 2.7, wherein the first optical system includes a lens.

2.9. The system of paragraph 2.1, further comprising a second optical subsystem configured to receive the second light portions reflected onto the alternative path and to direct the second light portions onto a light sensing surface of the second light sensing device.

2.10. The system of paragraph 2.9, wherein the second optical system includes a lens.

2.11. The system of paragraph 2.1, wherein the first light sensing device includes one or more light sensing elements.

2.12. The system of paragraph 2.1, wherein the second light sensing device includes one or more light sensing elements.

2.13. The system of paragraph 2.1, wherein the plurality of mirrors are arranged in an array.

2.14. The system of paragraph 2.1, wherein the patterns are pseudo-random patterns.

Measure Light that is Separated from the Optical Train Prior to the Light Modulation Unit.

Figure 13A:
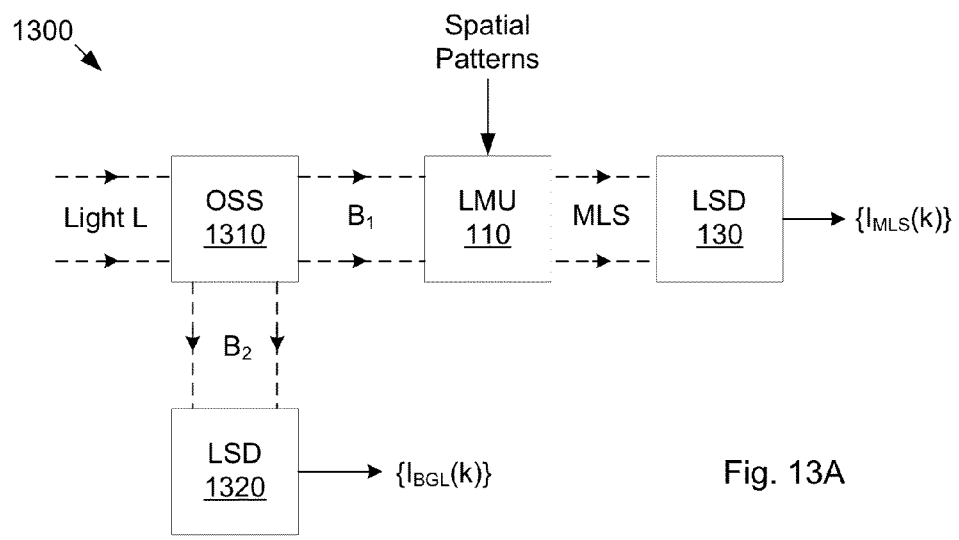
FIG. 13A illustrates an embodiment of system 1300 that separates the incoming light into a first stream and a second stream. The first stream proceeds to the light modulation unit 110. The intensity of the second stream is measured and serves as an indicator of the background light level.

In one set of embodiments, a system 1300 for operating on light may be configured as shown in FIG. 13A. System 1300 includes the light modulation unit 110 and the light sensing device 130 as described above in connection with system 100, and also includes an optical subsystem 1310 and a light sensing device 1320. (Furthermore, any subset of the features, embodiments and elements discussed above with respect to system 100 and system realization 200 may be incorporated into system 1300.)

The optical subsystem 1310 may be configured to receive the light stream L and to separate the light stream L into a first light stream $B_1$ and a second light stream $B_2$. The first light stream $B_1$ is supplied to the light modulation unit 110. The second light stream $B_2$ is supplied to the light sensing device 1320. The output of the light sensing device 1320 represents (or may be used to infer) variation in background light level.

The light modulation unit 110 is configured to modulate (as described variously above) the first light stream $B_1$ with a series of spatial patterns in order to produce a modulated light stream MLS. The light sensing device 130 is configured to receive the modulated light stream MLS and to generate a sequence of samples $\{I_{MLS}(k)\}$ representing intensity of the modulated light stream as a function of time. Index k is a time index. The samples of the sequence $\{I_{MLS}(k)\}$ comprise an encoded (e.g., compressed) representation of an image or video sequence.

The light sensing device 1320 is configured to generate a sequence $\{I_{BGL}(k)\}$ of samples of intensity of the second light stream $B_2$ as a function of time. As noted above, the samples $\{I_{BGL}(k)\}$ correspond to (or may be used to infer) variation in background light level, i.e., background light level as a function of time. The light sensing device 1320 may include one or more light sensing elements (e.g., photodiodes).

In one embodiment, the light sensing device 1320 may be fabricated using a different photodiode material technology than is used in light sensing device 130.

The sequence $\{I_{MLS}(k)\}$ and the sequence $\{I_{BGL}(k)\}$ may be stored in a memory, e.g., a memory resident in system 1300 or elsewhere. The sequence $\{I_{MLS}(k)\}$ and the sequence $\{I_{BGL}(k)\}$ may be used to construct an image or a video sequence. In particular, the sequence $\{I_{BGL}(k)\}$ may be used to compensate the sequence $\{I_{MLS}(k)\}$ for the variation in the background light level, e.g., as described above in connection with system 100. The compensated samples $\{I_{CMPN}(k)\}$ may then be used to construct the image or the video sequence, and/or, to perform an inference task (e.g., identification, classification, tracking, etc.) as variously described above.

Figure 13B:
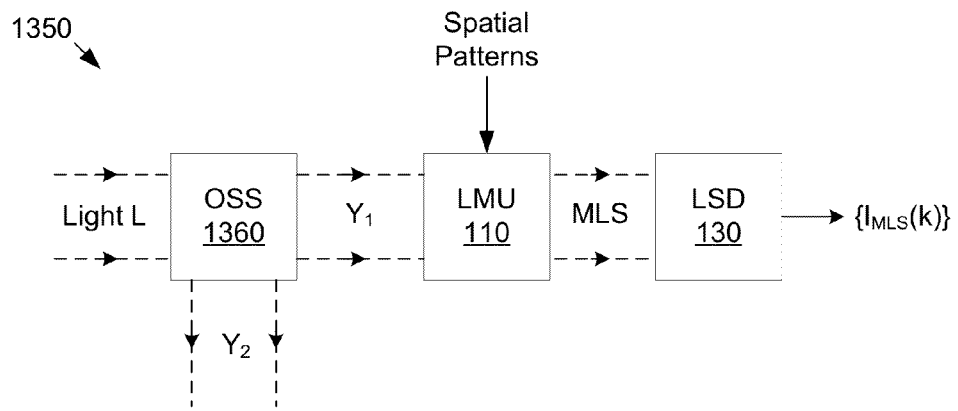
FIG. 13B illustrates an embodiment of a system 1350 that includes an optical subsystem 1360 that has the effect of separating the incident light into a first stream and a second stream, but the second stream is not used.
Figure 13C:
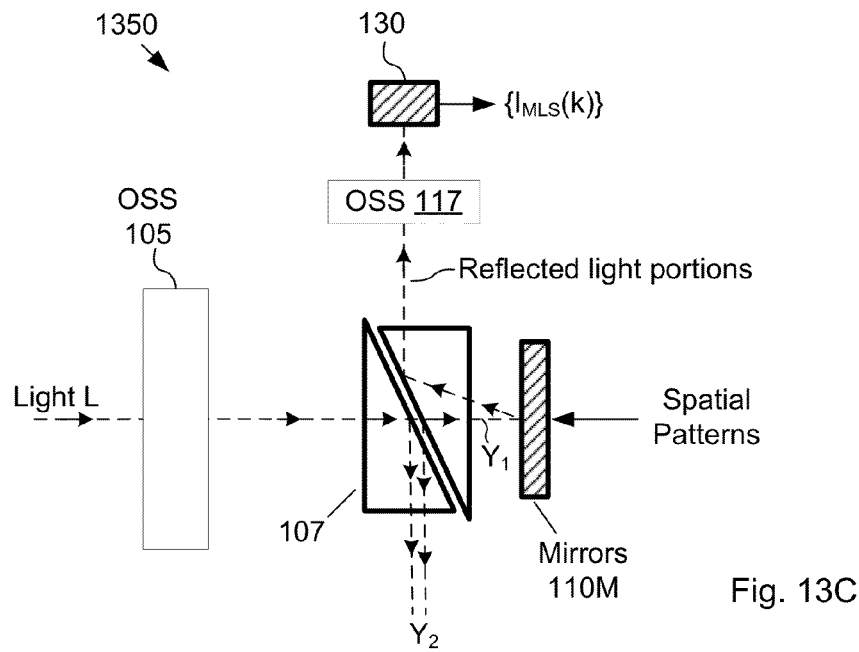
FIG. 13C illustrates an embodiment of system 1350 where optical subsystem 1360 is realized by a TIR prism pair 107.

System 1300 may be contrasted with the system 1350 of FIG. 13B. System 1350 includes an optical subsystem 1360 that separates the incident light stream L into a first light stream $Y_1$ and a second light stream $Y_2$, but does not include a device to measure/sense the second light stream $Y_2$. In some embodiments, the optical subsystem 1360 may be selected based on design constraints that do not include its ability to generate the second light stream $Y_2$. The generation of the second light stream $Y_2$ may be a by-product of the selected design. For example, in FIG. 13C, the TIR prism pair 107 may be selected for its ability to reflect the light that leaves the mirrors 110M in the first orientation state onto the path leading to the subsystem 117. However, the TIR prism pair 107 also generates the reflection $Y_2$. In some embodiments, system 1300 may be a modification of system 1350, where a light sensing device is added to sense the intensity of the light stream $Y_2$, and thereby produce an indication of the background light level as function of time. That modification may be interpreted as an improvement over system 1350 because it uses the light stream $Y_2$ that would have been wasted in system 1350. However, it is noted that other embodiments are contemplated where system 1300 is not simply a modification of a system such as system 1350. For example, in some embodiments, the optical subsystem 1310 of system 1300 may be selected based on design constraints that include the ability to generate a second light stream $B_2$ of a certain kind or character or intensity.

Figure 14:
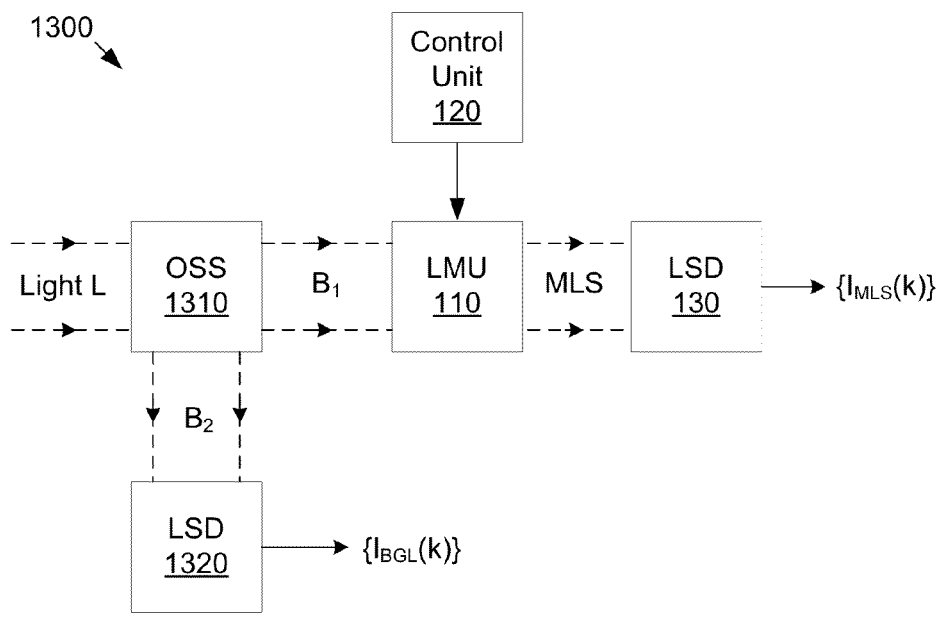
FIG. 14 illustrates an embodiment of system 1300 that includes the control unit 120.

As shown in FIG. 14, system 1300 may include the control unit 120 as described above in connection with system 100. The control unit 120 supplies the spatial patterns to the light modulation unit 110.

Figure 15:
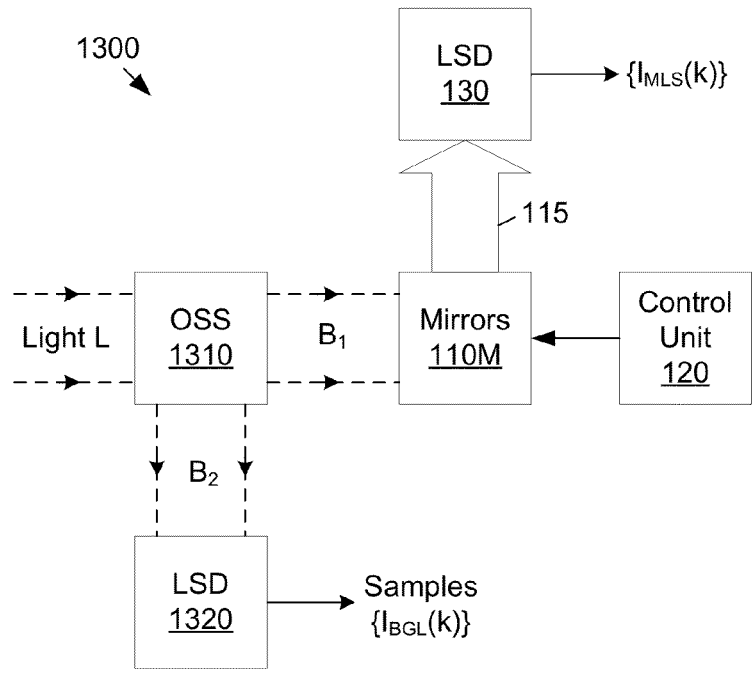
FIG. 15 illustrates an embodiment of system 1300 where the light modulation unit 110 is realized by the mirrors 110M.

In some embodiments of system 1300, the light modulation unit 110 may be realized by the above-described mirrors 110M, e.g., as shown in FIG. 15. Each of the mirrors 110M is configured to receive a corresponding portion of the first light stream $B_1$, and is configured to controllably switch between two orientation states. Furthermore, each of the mirrors is configured to: (a) reflect the corresponding portion of the first light stream onto the sensing path 115 when the mirror is in a first of the two orientation states and (b) reflect the corresponding portion of the first light stream away from the sensing path when the mirror is in a second of the two orientation states. The control unit 120 is configured to drive the orientation states of the mirrors through a series of spatial patterns, where each of the patterns of the series specifies an orientation state for each of the mirrors. The light sensing device 130 is configured to receive the light portions reflected onto the sensing path 115 by mirrors in the first orientation state and to generate a sequence $\{I_{MLS}(k)\}$ of samples representing a cumulative intensity of the light portions reflected onto the sensing path as a function of time. Index k is a time index. The samples of the sequence $\{I_{MLS}(k)\}$ may be interpreted as compressive sensing measurements.

Figure 16A:
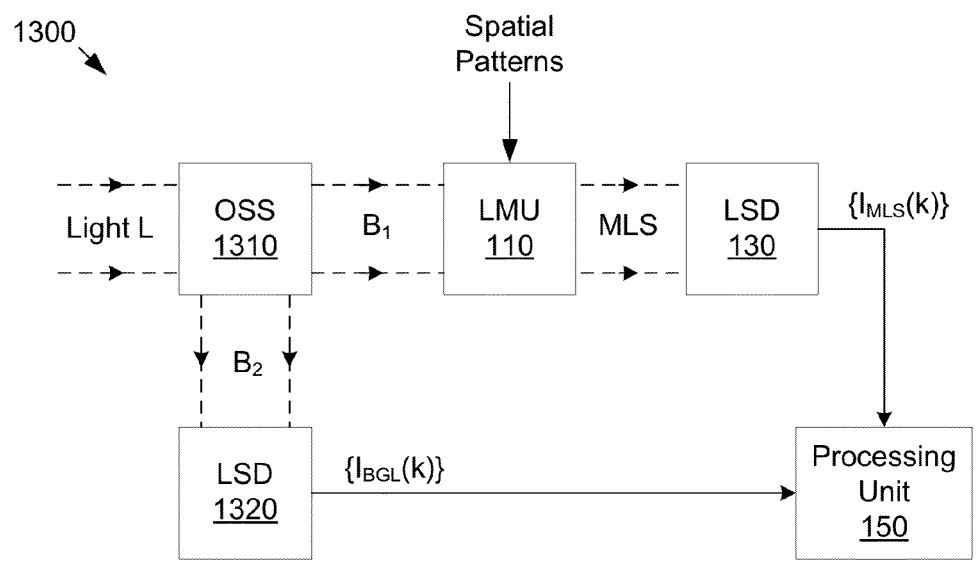
FIG. 16A illustrates an embodiment of system 1300 that includes the processing unit 150.

Referring now to FIG. 16A, system 1300 may include the processing unit 150 as described above in connection with system 100. The processing unit may be configured to compensate the samples of the sequence $\{I_{MLS}(k)\}$ for the variation in the background light level using the samples of the sequence $\{I_{BGL}(k)\}$. In one embodiment, the processing unit 150 may also be configured to generate an image or video sequence using the compensated samples, e.g., using any of the methods known in compressive sensing theory.

As described above, optical subsystem 1310 separates the light stream L into a first light stream $B_1$ that is supplied to the light modulation unit 110 and a second light stream $B_2$ that is supplied to the light sensing device 1320. After leaving the optical subsystem 1310, the first light stream and the second light stream may be optically isolated so that light from the first light stream has minimal ability to arrive at light sensing device 1320, and light from the second light stream has minimal ability to interact with the light modulation unit 110.

In some embodiments, the first light stream $B_1$ may be a stream that is transmitted through the optical subsystem 1310, and the second light stream $B_2$ may be a stream that is reflected from the first optical subsystem 1310.

In some embodiments, the optical subsystem 1310 is configured so that the first light stream $B_1$ is significantly more powerful that the second light stream $B_2$. In other words, most of the power of the light stream L passes into the first light stream. In some embodiments, the power of the second light stream is a small fraction of the power in the light stream L, e.g., less than 20%, or less than 15% or less than 5% or less than 1% of the power in the light stream L.

There are a wide variety of ways the optical subsystem 1310 may be realized in hardware. For example, the optical subsystem 1310 may include one or more following: a TIR prism pair, a spectral filter (such as a grating, a thin film stack, a hologram or some other type of other spectral filter), a beam splitter (e.g., in the form of a cube, plate, or pellicle), a thin film, a partially-mirrored surface, a polarizing beam splitter, a fiber optic device, a waveguide.

Figure 16B:
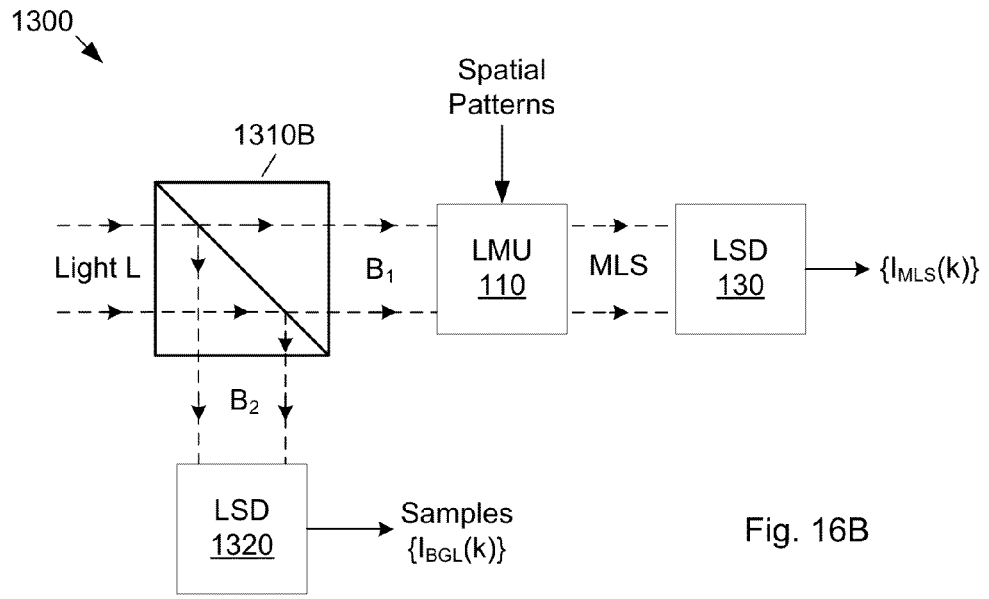
FIG. 16B illustrates an embodiment of system 1300 that includes a beam splitter that separates the incoming light into a transmitted beam and a reflected beam.
Figure 16C:
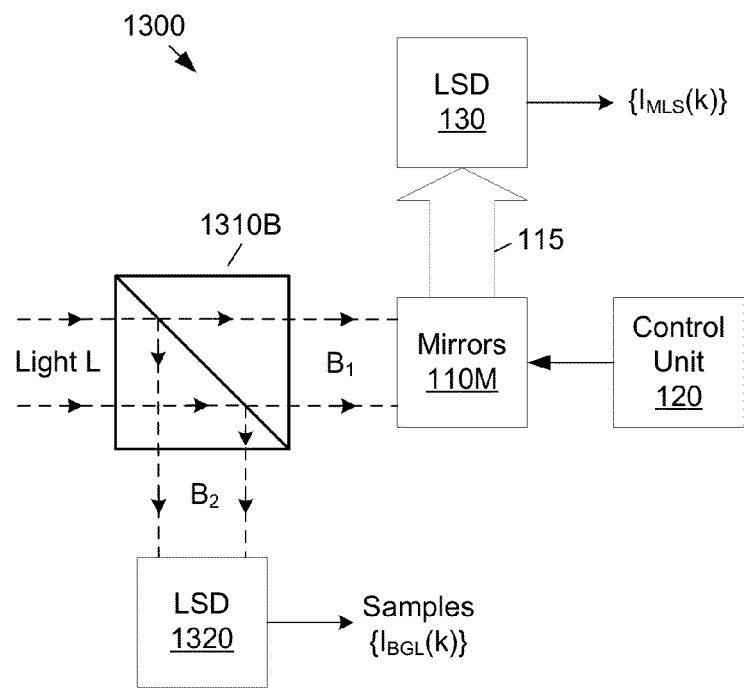
FIG. 16C shows a special case of the system of FIG. 16B, where the light modulation unit 110 is realized by the mirrors 110M.

FIGS. 16B and 16C show embodiments of system 1300 where the optical subsystem 1310 is embodied as a beam splitter cube 1310B. In FIG. 16B the light modulation unit 110 is realized by the mirrors 110M as variously described above.

Figure 16D:
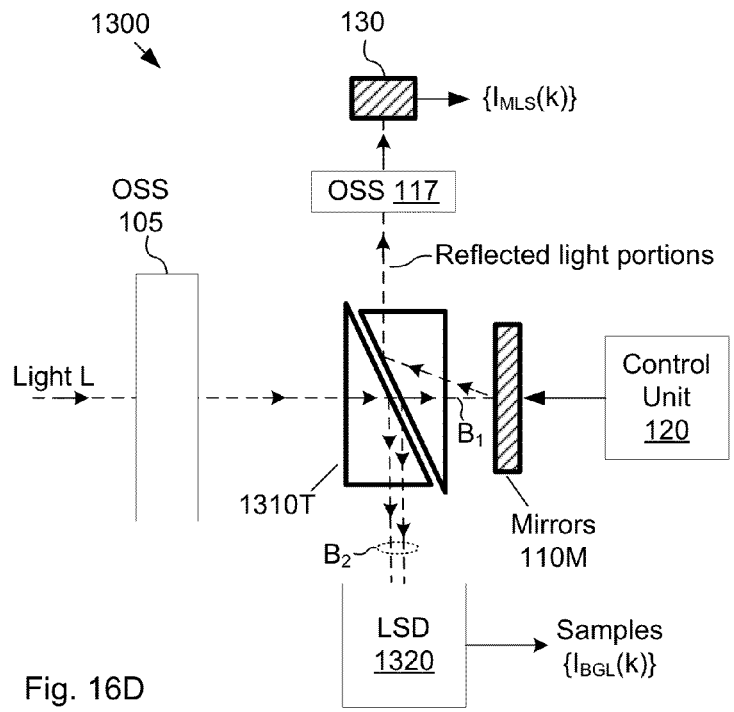
FIG. 16D shows an embodiment of system 1300 that includes a TIR prism pair 1310T that separates the incoming light into a transmitted beam and a reflected beam.

FIG. 16D shows an embodiment of system 1300 where the optical subsystem 1310 is realized by a TIR prism pair 1310T.

In some embodiments, the optical subsystem 1310 may be configured so that the second light stream $B_2$ is spectrally similar to the first light stream $B_1$ (or to the received light stream L). In one embodiment, this feature may be achieved by virtue of the optical subsystem 1310 having a partially-reflective surface whose reflectance function and transmittance function are flat over a broad range of wavelengths. The background light measurements $\{I_{BGL}(k)\}$ captured by the light sensing device 1320 may be scaled using knowledge of the relative magnitudes of the reflectance and transmittance functions in order to obtain background light values that are more appropriate to the first light stream $B_1$, and thus, more appropriate for compensating the samples $\{I_{MLS}(k)\}$ from the light sensing device 130.

In some embodiments, the optical subsystem 1310 may include a partially reflective surface (or some other mechanism for separating light) whose reflectance function and transmittance function are arbitrary functions, subject to fundamental physical constraints such as conservation of energy. Thus, the first light stream and the second light stream may not necessarily be spectrally similar. However, the reflectance function and the transmittance function may be known by calibration, and may be accounted for when estimating the background light level. For example, in one embodiment, the light sensing device 130 and the light sensing device 1320 may be multi-spectral or hyper-spectral sensors. Thus, the light sensing device 1310 may capture at each sampling time a set of intensities $\{B_2(f_i)\}$ for respective frequencies $\{f_i\}$ Similarly, the light sensing device 130 may capture at each sampling time a set of intensities $\{I_{MLS}(f_i)\}$ for the respective frequencies $\{f_i\}$. The set of intensities $\{B_2(f_i)\}$ may be adjusted based on knowledge of the reflectance function R(f) and the transmittance function T(f), to obtain a background light value for each frequency $f_i$. For example, the set $\{B_2(f_i)\}$ may be adjusted according to the relation $$I_{BGL}(f_i) = T(f_i)/R(f_i) * B_2(f_i).$$

The background light value $I_{BGL}(f_i)$ may be used to compensate the intensity sample $I_{MLS}(f_i)$ captured by light sensing device 130 at the same frequency More generally, regardless of the exact physical mechanism used to separate the light stream L into first and second streams, the spectral transfer function $T_1(f)$ between the light stream L and the first light stream $B_1$, and the spectral transfer function $T_2(f)$ between the light stream L and the second light stream $B_2$, may be determined by calibration, and may be used to adjust the background light measurements captured by the light sensing device 1320 in order to obtain background light values more appropriate for the first light stream $B_1$, and thus, more appropriate for compensating the measurements $\{I_{MLS}(k)\}$ from the light sensing device 130.

In some embodiments, the optical subsystem 1310 may be configured so that the second light stream $B_2$ is confined to a subset (or subrange) of the wavelengths present (or nominally present) in the received light stream L. In some embodiment, this feature may be achieved by virtue of the optical subsystem 1310 having a partially-reflective surface whose reflectance function is supported only on the desired subset of wavelengths. In one embodiment, this feature may be achieved by virtue of the optical subsystem 1310 including a grating or a spectral filter.

In some embodiments, the optical system 1310 is configured to separate the received light stream based on polarization (e.g., using a polarizing beamsplitter cube) so that the first light stream $B_1$ and the second light stream $B_2$ have opposite polarization states. Even though the first and second streams have opposite polarization states, they can still be representative of the total light level (or the background light level) as a function of time. For example, the second light stream, although having a polarization opposite to that of the first light stream, can still be representative of the total light level in the first light stream or in the incident light stream L.

In some embodiments, the optical system 1310 is configured so that the second light stream $B_2$ has the same polarization state as the first light stream $B_1$.

In some embodiments, the second light stream may be a representative portion (e.g., spatial portion) of the received light stream L taken from inside or near the field of view used by the set of mirrors 110M.

Figure 16E:
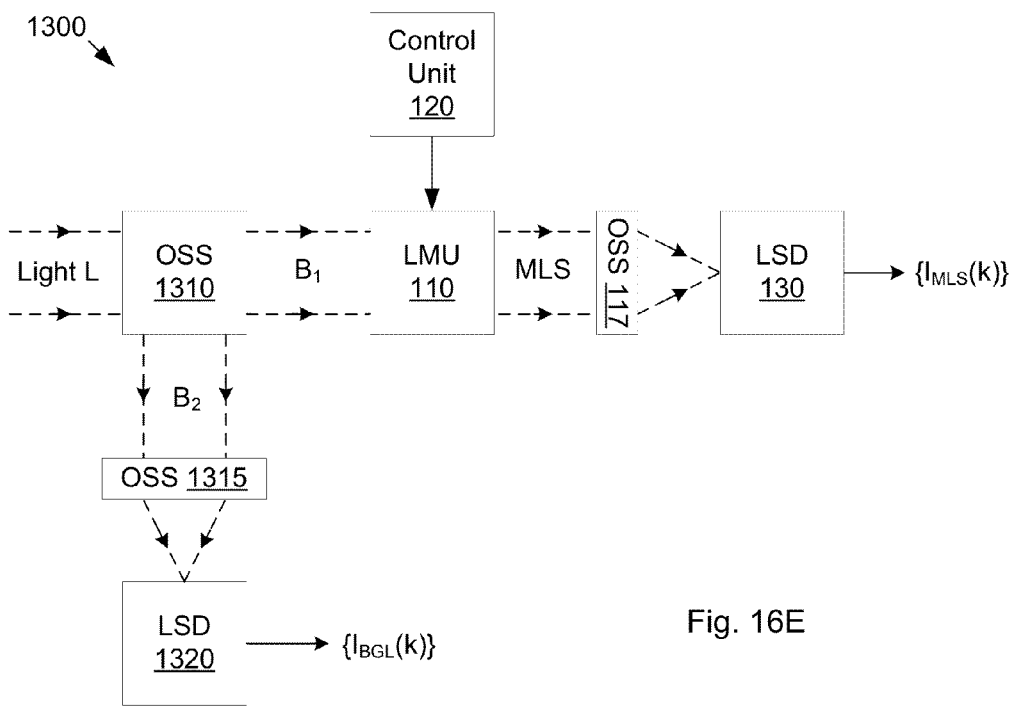
FIG. 16E shows an embodiment of system 1300 that includes an optical subsystem 117 to direct or focus or concentrate light onto the light sensing device 130 and an optical subsystem 1315 to direct or focus or concentrate light onto the light sensing device 1320.

As shown in FIG. 16E, system 1300 may also include an optical subsystem 1315 configured to receive the second light stream $B_2$, and to direct (e.g., focus or concentrate) the second light stream into an area (e.g., a small area) on a light sensing surface of the light sensing device 1320 (e.g., similar to the directing action of optical subsystem 117 described above). The optical subsystem 1315 may include any set of one or more optical components to achieve the directing function. For example, in one embodiment, optical subsystem 1315 may include one or more lenses and/or one or more mirrors.

FIG. 16E also shows optical subsystem 117, which is configured to receive the modulated light stream and to direct (e.g., focus or concentrate) the modulated light stream onto a light sensing surface of the light sensing device 130, e.g., as variously described above. In some embodiments, optical subsystems 117 and 1320 may be configured similarly or identically. However, in other embodiments, they are configured differently, or even radically differently.

Figure 16F:
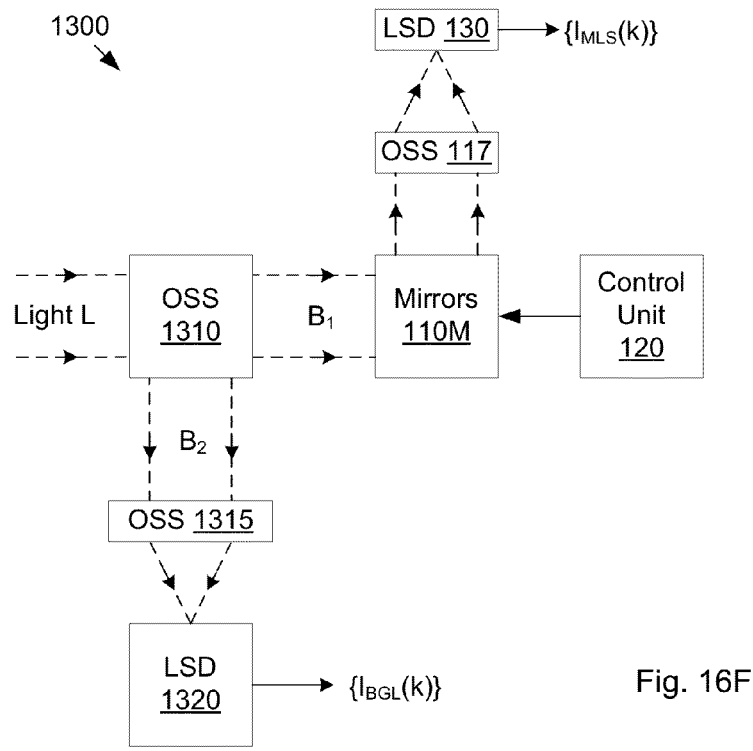
FIG. 16F shows a special case of the system of FIG. 16E, where the light modulation unit 110 is realized by the mirrors 110M.

FIG. 16F shows one embodiment of the system shown in FIG. 16E, where the light modulation unit 110 is realized by the mirrors 110M, e.g., as variously described above.

Figure 17A:
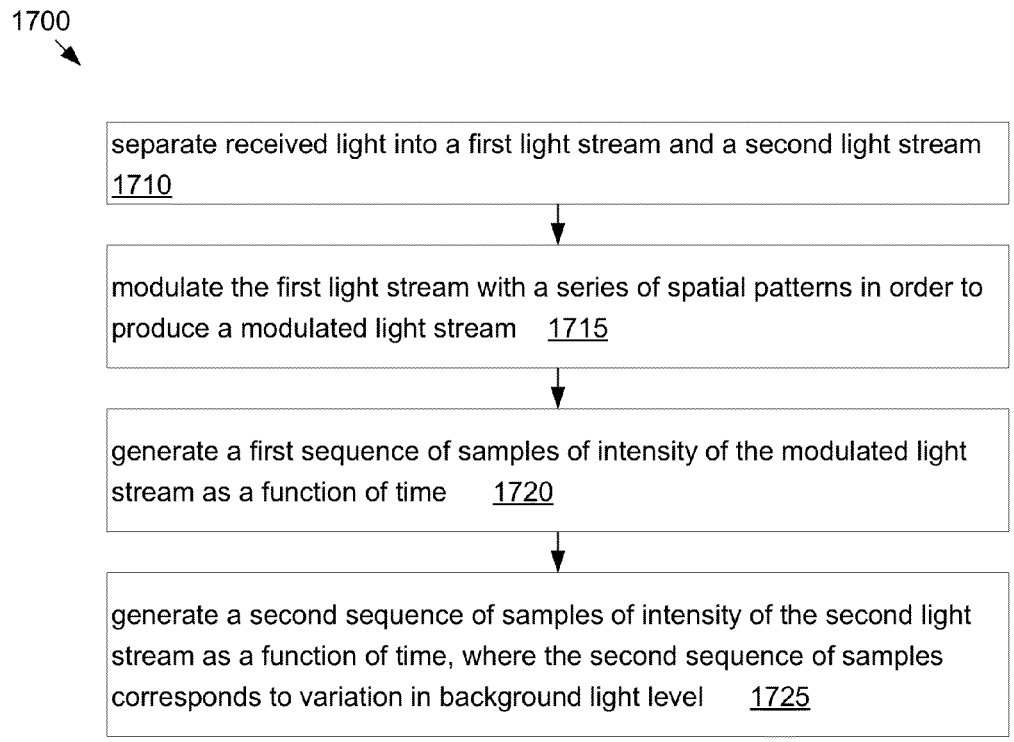
FIG. 17A illustrates an embodiment of a method 1700 that involves separating a received stream of light into a first stream and a second stream. The first stream is used to obtain imaging measurements. The second stream is measured in order to provide an indication of the background light level.

In one set of embodiments, a method 1700 for operating on light (e.g., light received from an environment) may involve the actions shown in FIG. 17A.

Action 1710 includes separating the light into a first light stream and a second light stream, e.g., as variously described above.

Action 1715 includes modulating the first light stream with a series of spatial patterns in order to produce a modulated light stream, e.g., as variously described above.

Action 1720 includes generating a first sequence of samples of intensity of the modulated light stream as a function of time, e.g., as variously described above.

Action 1725 includes generating a second sequence of samples of intensity of the second light stream as a function of time, where the second sequence of samples corresponds to (or represents or indicates) variation in background light level (e.g., the background light level in the environment).

In some embodiments, the method 1700 may also include storing the first sequence and the second sequence of samples in a memory. The first sequence and the second sequence of samples are usable to construct an image or a video sequence, and/or, to perform an inference task as variously described above.

In some embodiments, the method 1700 may also include compensating the first sequence of samples for the variation of the background light level using the second sequence of samples, e.g., as variously described above.

In some embodiments, the method 1700 may also include constructing an image or video sequence based on the compensated samples, and/or, performing an inference task, e.g., as variously described above.

In some embodiments, the method 1700 may also include transmitting the compensated samples to a receiver through a communication channel, e.g., as variously described above. (The receiver may be configured to construct the image or video sequence based on the compensated samples, and/or, to perform the inference task as variously described above.)

In one set of embodiments, a non-transitory computer-readable memory medium may be configured so that it stores program instructions, where the program instructions, when executed by a computer system, cause the computer system to: (1) supply a series of spatial patterns to a light modulation unit (e.g., a light modulation unit as variously described above), where the light modulation unit is configured to modulate a first light stream with the series of spatial patterns to obtain a modulated light stream, where the first light stream is produced by an optical subsystem (or device) that separates an input light stream into the first light stream and a second light stream (e.g., as variously described above); (2) receive a first sequence of samples from a first light sensing device (e.g., from the light sensing device 130 as variously described above), where the first sequence of samples represents intensity of the modulated light stream as a function of time; (3) receive a second sequence of samples from a second light sensing device (e.g., from the light sensing device 1320 as variously described above), where the samples of the second sequence are samples of intensity of the second light stream as a function of time, where the second sequence of samples represents variation of background light level; and (4) compensate the first sequence of samples for the variation of the background light level using the second sequence of samples in order to obtain a compensated sequence of samples (e.g., as variously described above), where the compensated samples are usable to construct an image or a video sequence, and/or, to perform an inference task as variously described above.

Figure 17B:
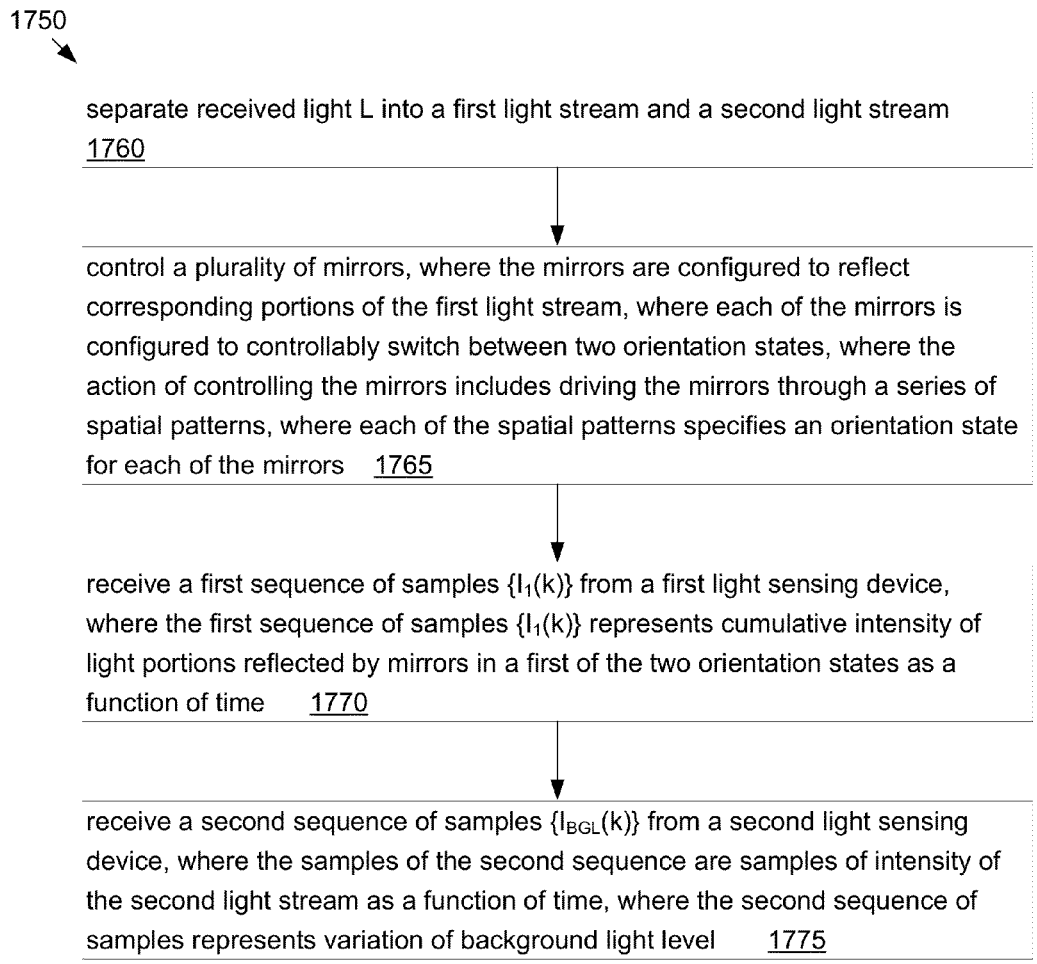
FIG. 17B illustrates an embodiment of a method 1750 that involves separating a received stream of light into a first stream and a second stream. The first stream is used to obtain imaging measurements. The second stream is measured in order to provide an indication of the background light level. This embodiment involves driving a plurality of mirrors through a series of spatial patterns.

In one set of embodiments, a method 1750 for operating on light may involve the actions shown in FIG. 17B.

Action 1760 includes separating input light L (received light) into a first beam and a second beam, e.g., as variously described above.

Action 1765 includes controlling a plurality of mirrors, e.g., as variously described above. The mirrors are configured to reflect corresponding portions of the first beam. Each of the mirrors is configured to controllably switch between two orientation states. The action of controlling the mirrors includes driving the mirrors through a series of spatial patterns, where each of the spatial patterns specifies an orientation state for each of the mirrors.

Action 1770 includes receiving a first sequence of samples $\{I_1(k)\}$ from a first light sensing device, where the first sequence of samples $\{I_1(k)\}$ represents cumulative intensity of light portions reflected by mirrors in a first of the two orientation states as a function of time. The sample $I_1(k)$ represents the cumulative intensity at a particular time (or time interval) corresponding to time index value k.

Action 1775 includes receiving a second sequence of samples $\{I_{BGL}(k)\}$ from a second light sensing device, where the samples of the second sequence are samples of intensity of the second beam as a function of time. The second sequence of samples represents variation of background light level.

In some embodiments, a non-transitory computer-readable memory medium is configured so that it stores program instructions, where the program instructions, when executed by a computer system, cause the computer system to: (1) control a plurality of mirrors, where the mirrors are configured to reflect corresponding portions of a first beam, where the first beam is produced by an optical subsystem that separates an input light beam into the first beam and a second beam, where each of the mirrors is configured to controllably switch between two orientation states, where the action of controlling the mirrors includes driving the mirrors through a series of spatial patterns, where each of the spatial patterns specifies an orientation state for each of the mirrors; (2) receive a first sequence of samples from a first light sensing device, where the first sequence of samples represents cumulative intensity of light portions reflected by mirrors in a first of the two orientation states as a function of time; and (3) receive a second sequence of samples from a second light sensing device, where the samples of the second sequence are samples of intensity of the second beam as a function of time, where the second sequence of samples represents variation of background light level.

Various additional embodiments are described in the following numbered paragraphs.

3.1 A system for operating on light, the system comprising:

a first optical subsystem configured to receive the light and to separate the received light into a first light stream and a second light stream;

a light modulation unit configured to modulate the first light stream with a series of spatial patterns in order to produce a modulated light stream, wherein the light modulation unit includes a plurality of light modulating elements configured to modulate corresponding portions of the first light stream, wherein each of the spatial patterns specifies an amount of modulation for each of the light modulating elements;

a first light sensing device configured to receive the modulated light stream and to generate a first sequence of samples of intensity of the modulated light stream as a function of time;

a second light sensing device configured to generate a second sequence of samples of intensity of the second light stream as a function of time, wherein the second sequence of samples corresponds to variation in background light level.

3.2. The system of paragraph 3.1, further comprising a memory that stores the first sequence and the second sequence of samples, wherein the first sequence and second sequence of samples are usable to construct an image or a video sequence.

3.3. The system of paragraph 3.1, wherein the samples of the second sequence are used to compensate the samples of the first sequence for the variation in the background light level, wherein the compensated samples are usable to construct the image or a video sequence.

3.4 The system of paragraph 3.1, further comprising a processing unit configured to compensate the samples of the first sequence for the variation in the background light level using the samples of the second sequence.

3.5. The system of paragraph 3.4, wherein the processing unit is further configured to generate an image or a video sequence using the compensated samples.

3.6 The system of paragraph 3.4, wherein the processing unit is configured to transmit the compensated samples to a receiver through a communication channel, wherein the receiver is configured to construct an image or a video sequence based on the compensated samples.

3.7 The system of paragraph 3.1, wherein the plurality of light modulating elements are mirrors whose orientations are independently controllable.

3.8 The system of paragraph 3.1, wherein the plurality of light modulating elements are elements whose transmittances are independently controllable.

3.9 The system of paragraph 3.1, further comprising a second optical subsystem configured to direct the modulated light stream onto a light sensing surface of the first light sensing device.

3.10 The system of paragraph 3.1, further comprising a third optical subsystem configured to receive the second light stream, and to direct the second light stream onto a light sensing surface of the second light sensing device.

3.11 The system of paragraph 3.1, wherein the plurality of mirrors are arranged in an two-dimensional array.

3.12 The system of paragraph 3.1, wherein the spatial patterns of the series are pseudo-random patterns.

3.13 The system of paragraph 3.1, wherein the first light sensing device includes one or more light sensing elements.

3.14 The system of paragraph 3.1, wherein the second light sensing device includes one or more light sensing elements.

3.15 A non-transitory computer-readable memory medium storing program instructions, wherein the program instructions, when executed by a computer system, cause the computer system to: supply a series of spatial patterns to a light modulation unit, wherein the light modulation unit is configured to modulate a first light stream with the series of spatial patterns to obtain a modulated light stream, wherein the first light stream is produced by an optical subsystem that separates an input light stream into the first light stream and a second light stream; receive a first sequence of samples from a first light sensing device, wherein the first sequence of samples represents intensity of the modulated light stream as a function of time; receive a second sequence of samples from a second light sensing device, wherein the samples of the second sequence are samples of intensity of the second light stream as a function of time, wherein the second sequence of samples represents variation of background light level; and compensate the first sequence of samples for the variation of the background light level using the second sequence of samples in order to obtain a compensated sequence of samples, wherein the compensated samples are usable to construct an image or a video sequence.

3.16 A system for operating on light, the system comprising:

a first optical subsystem configured to receive the light and to separate the received light into a first beam and a second beam;

a plurality of mirrors configured to receive corresponding portions of the first beam, wherein each of the mirrors is configured to controllably switch between two orientation states, wherein each of the mirrors is configured to: (a) reflect the corresponding portion of the first beam onto a sensing path when the mirror is in a first of the two orientation states and (b) reflect the corresponding portion of the first beam away from the sensing path when the mirror is in a second of the two orientation states;

a control unit configured to drive the orientation states of the mirrors through a series of patterns, wherein each of the patterns of the series specifies an orientation state for each of the mirrors;

a first light sensing device configured to receive light portions reflected onto the sensing path by mirrors in the first orientation state and to generate a first sequence of samples representing a cumulative intensity of the light portions reflected onto the sensing path as a function of time;

a second light sensing device configured to generate a second sequence of samples of intensity of the second beam as a function of time, wherein the second sequence of samples corresponds to variation in background light level.

3.17. The system of paragraph 3.16, further comprising a second optical subsystem configured to receive the light portions reflected onto the sensing path and to direct the received light portions onto a light sensing surface of the first light sensing device.

3.18. The system of paragraph 3.16, further comprising a third optical subsystem configured to receive the second beam, and to direct the second beam onto a light sensing surface of the second light sensing device.

Low-Pass Filtering the Compressive Sensing Measurements

Figure 18A:
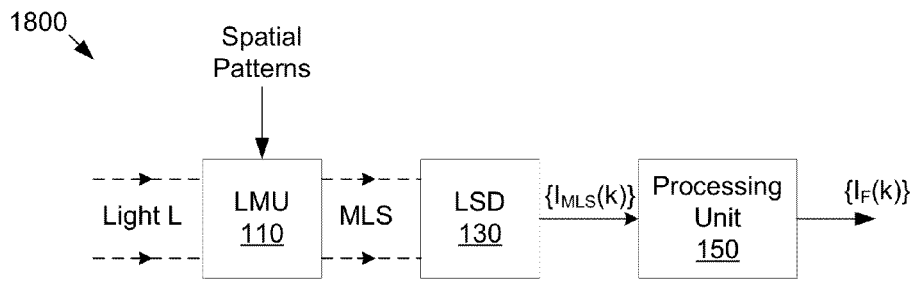
FIG. 18A illustrates an embodiment of system 1800 configured to derive an indication of background light level as a function of time by performing low-pass filtering on the sequence of measurements captured by the light sensing device 130.

In one set of embodiments, a system 1800 for operating on incident light L from an environment may be configured as shown in FIG. 18A.

System 1800 includes the light modulation unit 110, the light sensing device 130 and the processing unit 150 as described above in connection with system 100. (Any subset of the features, embodiments and elements discussed above with respect to system 100 and system realization 200 may be incorporated into system 1800.)

As variously described above, the light modulation unit 110 is configured to modulate the light stream L with a series of spatial patterns in order to produce a modulated light stream MLS. The spatial patterns may be as variously described above. The light sensing device 130 is configured to receive the modulated light stream and to generate a sequence of samples $\{I_{MLS}(k)\}$ representing intensity of the modulated light stream as a function of time.

In system 1800, the processing unit 150 is configured to low-pass filter the sequence of samples $\{I_{MLS}(k)\}$ to obtain a filtered sequence of samples $\{I_F(k)\}$. The filtered sequence of samples $\{I_F(k)\}$ represents variation in background light level (or background light level as a function of time). The filtering may be designed to remove (or decrease or attenuate) high-frequency fluctuations that are present in the sequence $\{I_{MLS}(k)\}$, e.g., high-frequency fluctuations due to the modulation of the light stream L by the series of spatial patterns. (Even when the incident light stream is constant over space and time, there will be high-frequency fluctuations in the sample sequence $\{I_{MLS}(k)\}$ due to the modulation by the spatial patterns.)

The processing unit 150 may perform the low-pass filtering in any of a wide variety of ways that are known in the art of signal processing, e.g., using any of a wide variety of FIR filters or IIR filters or non-linear filters. The low-pass filtering may be performed in software (on a microprocessor) or in custom-designed analog or digital circuitry or in a programmable hardware element such as an FPGA.

In some embodiments, the processing unit 150 may periodically (or intermittently or continuously) perform spectrum analysis on the samples $\{I_{MLS}(k)\}$ and dynamically determine a filter (or parameters of a filter) to be applied to the samples $\{I_{MLS}(k)\}$.

In one alternative embodiment, the low-pass filtering is performed in the analog domain on the analog signal $I_{MLS}(t)$ generated by the light sensing device 130 (before the signal is digitized by the A/D converter), in order to obtain a filtered analog signal which can then be digitized to create the filtered sample sequence $\{I_F(k)\}$.

The sequence $\{I_{MLS}(k)\}$ and the filtered sequence $\{I_F(k)\}$ may be stored in a memory, e.g., a memory resident in the system 1800 or elsewhere. The sequence $\{I_{MLS}(k)\}$ and the filtered sequence $\{I_F(k)\}$ are usable to construct an image or a video sequence. In particular, the filtered sequence $\{I_F(k)\}$ may be used to compensate the sequence $\{I_{MLS}(k)\}$ for the variation in background light level, e.g., as variously described above. The compensated samples $\{I_{CMPN}(k)\}$ may then be used to construct the image or the video sequence, e.g., based on any of the methods known in the field of compressive sensing.

In some embodiments, processing unit 150 may be configured to perform the action of compensating the samples $\{I_{MLS}(k)\}$ for the variation in the background light level using the samples of the filtered sequence $\{I_F(k)\}$. The compensated samples $\{I_{CMPN}(k)\}$ may be stored in a memory, e.g., a memory resident in system 1800 or elsewhere.

In some embodiments, any variations in the background light level may be inferred by computing local mean values of the samples $\{I_{MLS}(k)\}$ (e.g., via a sliding window or other approach). Then samples $\{I_{MLS}(k)\}$ may be correcting for variations in the local mean value in comparison to a global mean of the samples $\{I_{MLS}(k)\}$. The processing unit 150 may correct for the light level variations by re-centering all of the measurements to the same global mean value. The local means may be implemented by low-pass filtering so that variations on the order of the pattern-application frequency are filtered out, leaving only slower variations that correspond to variations in the local mean value.

In some embodiments, the compensated samples $\{I_{CMPN}(k)\}$ are transmitted through a communication channel to receiver. (The receiver may be configured to construct an image or a video sequence based on the compensated samples.) In one embodiment, the processing unit 150 is also configured to construct the image or the video sequence based on the compensated samples, i.e., in addition to being configured to transmit the compensated samples.

In some embodiments, system 1800 (e.g., processing unit 150) may be configured to transmit the sequence of samples $\{I_{MLS}(k)\}$ to a receiver through a communication channel. The receiver may be configured to perform the action of low-pass filtering the samples $\{I_{MLS}(k)\}$ to obtain the filtered sequence $\{I_F(k)\}$ that represents variation of background light level.

Figure 18B:
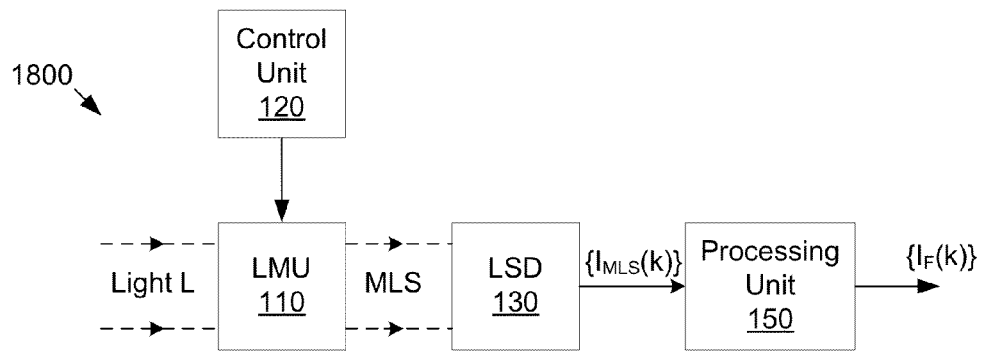
FIG. 18B illustrates an embodiment of system 1800 that includes the control unit 120.

As shown in FIG. 18B, system 1800 may include the control unit 120 as described above in connection with system 100. The control unit is configured to supply the series of spatial patterns to the light modulation unit 110.

Figure 18C:
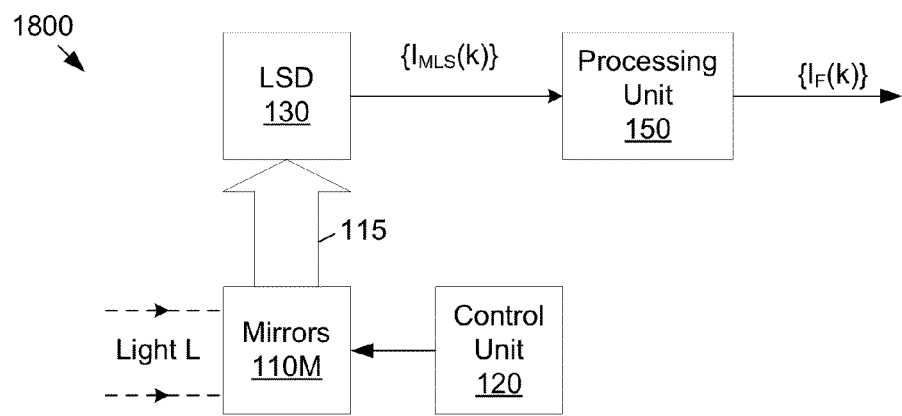
FIG. 18C illustrates an embodiment of system 1800 that includes the control unit 120 and the processing unit 150.

FIG. 18C shows one embodiment of system 1800, where the light modulation unit 110 is realized by the mirrors 110M as variously described above. Each of the mirrors 110M is configured to controllably switch between two orientation states, and to (a) reflect a corresponding portion of the light L onto the sensing path 115 when the mirror is in a first of the two orientation states and (b) reflect the corresponding portion of the light away from the sensing path when the mirror is in a second of the two orientation states. Control unit 120 is configured to drive the orientation states of the mirrors through a series of patterns, where each of the patterns of the series specifies an orientation state for each of the mirrors.

In one set of embodiments, a method 1900 for operating on a stream of light may include the actions shown in FIG. 19A.

Action 1910 includes modulating a received light stream with a series of spatial patterns in order to produce a modulated light stream, e.g., as variously described above.

Action 1915 includes generating a first sequence of samples $\{I_{MLS}(k)\}$ representing intensity of the modulated light stream as a function of time, e.g., as variously described above.

Action 1920 includes applying a low-pass filter to the first sequence of samples to obtain a filtered sequence of samples $\{I_F(k)\}$, e.g., as variously described above. The filtered sequence of samples represents variation in background light level. In various embodiments, the low-pass filter may be an FIR filter, an IIR filter, or a non-linear filter.

In some embodiments, method 1900 also includes storing the sequence $\{I_{MLS}(k)\}$ and the filtered sequence $\{I_F(k)\}$ in a memory. The sequence $\{I_{MLS}(k)\}$ and the filtered sequence $\{I_F(k)\}$ are usable to construct an image or a video sequence.

In some embodiments, method 1900 also includes compensating the sequence of samples $\{I_{MLS}(k)\}$ for the variation of the background light level using the filtered sequence of samples $\{I_F(k)\}$.

In some embodiments, method 1900 also includes constructing the image or the video sequence based on the compensated samples.

In some embodiments, method 1900 also includes transmitting the compensated samples to a receiver through a communication channel. (The receiver may be configured to construct the image or the video sequence based on the compensated samples, and/or, to perform an inference task as variously described above.)

In some embodiments, a non-transitory computer-readable memory medium may be configured so that it stores program instructions, where the program instructions, when executed by a computer system, cause the computer system to: (1) supply a series of spatial patterns to a light modulation unit (e.g., the light modulation unit 110 as variously described above), where the light modulation unit is configured to modulate a received light stream with the series of spatial patterns to obtain a modulated light stream; (2) receive a first sequence of samples from a light sensing device (e.g., the light sensing device 130 as variously described above), where the first sequence of samples represents intensity of the modulated light stream as a function of time; and (3) apply a low-pass filter to the first sequence of samples to obtain a filtered sequence of samples, where the filtered sequence of samples represents variation in background light level.

In one set of embodiments, a method 1960 (e.g., a method for operating on light) may include the actions shown in FIG. 19B.

Action 1960 includes controlling a plurality of mirrors, where the mirrors are configured to reflect corresponding portions of a received beam of light, where each of the mirrors is configured to controllably switch between two orientation states, e.g., as variously described above. The action of controlling the mirrors includes driving the mirrors through a series of spatial patterns, where each of the spatial patterns specifies an orientation state for each of the mirrors.

Action 1965 includes receiving a sequence of samples $\{I_{MLS}(k)\}$ from a light sensing device, e.g., as variously described above. The sequence of samples $\{I_{MLS}(k)\}$ represents cumulative intensity of light portions reflected by mirrors in a first of the two orientation states as a function of time.

Action 1970 includes filtering the sequence of samples $\{I_{MLS}(k)\}$ with a low-pass filter to obtain a filtered sequence of samples $\{I_F(k)\}$, e.g., as described above. The filtered sequence of samples represents variation in background light level.

Various additional embodiments are described in the following numbered paragraphs.

4.1 A system for operating on a stream of light, the system comprising:

a light modulation unit configured to modulate the light stream with a series of spatial patterns in order to produce a modulated light stream, wherein the light modulation unit includes a plurality of light modulating elements configured to modulate corresponding portions of the light stream, wherein each of the spatial patterns specifies an amount of modulation for each of the light modulating elements;

a light sensing device configured to receive the modulated light stream and to generate a first sequence of samples representing intensity of the modulated light stream as a function of time; and a processing unit configured to low-pass filter the first sequence of samples to obtain a filtered sequence of samples, wherein the filtered sequence of samples represents variation in background light level.

4.2. The system of paragraph 4.1, further comprising a memory that stores the first sequence of samples and the filtered sequence of samples, wherein the first sequence and the filter sequence of samples are usable to construct an image or a video sequence.

4.3. The system of paragraph 4.2, wherein the samples of the filtered sequence are used to compensate the samples of the first sequence for the variation in background light level, wherein the compensated samples are useable to construct the image or the video sequence.

4.4. The system of paragraph 4.1, wherein the processing unit is configured to compensate the samples of the first sequence for the variation in the background light level using the samples of the filtered sequence.

4.5. The system of paragraph 4.4, wherein the processing unit is configured to construct an image or a video sequence based on the compensated samples.

4.6 The system of paragraph 4.4, wherein the processing unit is configured to transmit the compensated samples to a receiver through a communication channel, wherein the receiver is configured to construct an image or a video sequence based on the compensated samples.

4.7 The system of paragraph 4.1, wherein the plurality of light modulating elements are mirrors whose orientations are independently controllable.

4.8 The system of paragraph 4.1, wherein the plurality of light modulating elements are elements whose transmittances are independently controllable.

4.9 The system of paragraph 4.1, further comprising an optical subsystem configured to direct the modulated light stream onto a light sensing surface of the light sensing device.

4.10 The system of paragraph 4.1, wherein the spatial patterns of the series are pseudo-random patterns.

4.11 The system of paragraph 4.1, wherein the plurality of light modulating elements are arranged in a two-dimensional array.

4.12 The system of paragraph 4.1, wherein the light sensing device includes one or more light sensing elements.

4.13 A non-transitory computer-readable memory medium storing program instructions, wherein the program instructions, when executed by a computer system, cause the computer system to: supply a series of spatial patterns to a light modulation unit, wherein the light modulation unit is configured to modulate a received light stream with the series of spatial patterns to obtain a modulated light stream; receive a first sequence of samples from a light sensing device, wherein the first sequence of samples represents intensity of the modulated light stream as a function of time; and apply a low-pass filter to the first sequence of samples to obtain a filtered sequence of samples, wherein the filtered sequence of samples represents variation in background light level.

4.14 A system for operating on light, the system comprising:

a plurality of mirrors, wherein each of the mirrors is configured to controllably switch between two orientation states, wherein each of the mirrors is configured to (a) reflect a corresponding portion of the light onto a sensing path when the mirror is in a first of the two orientation states and (b)

reflect the corresponding portion of the light away from the sensing path when the mirror is in a second of the two orientation states;

a control unit configured to drive the orientation states of the mirrors through a series of patterns, wherein each of the patterns of the series specifies an orientation state for each of the mirrors;

a light sensing device configured to receive light portions reflected onto the sensing path by mirrors in the first orientation state and to generate a first sequence of samples representing a cumulative intensity of the light portions reflected onto the sensing path as a function of time;

a processing unit configured to low-pass filter the first sequence of samples to obtain a filtered sequence of samples, wherein the filtered sequence of samples represents variation in background light level.

4.15 The system of paragraph 4.14, further comprising an optical subsystem configured to receive the light portions reflected onto the sensing path, and to direct the received light portions onto a light sensing surface of the light sensing device.

High-Pass Filtering with Envelope Detection to Estimate Background Light Signal

In some situations, the sequence of samples $\{I_{MLS}(k)\}$ captured by the light sensing device 130 may be modeled as the product of a background light signal B(k) and an information-bearing signal V(k):

$$I_{MLS}(k)=B(k)*V(k).$$

The information-bearing signal V(k) may include a DC component $V_{DC}$ and an dynamic component $V_{AC}(k)$:

$$V(k)=V_{DC}+V_{AC}(k),$$

which implies that $$I_{MLS}(k)=B(k)*(V_{DC}+V_{AC}(k)).$$

Furthermore, the energy of the background light signal B(k) may be concentrated mostly over low frequencies, and the energy of the dynamic component $V_{AC}(k)$ may be concentrated mostly over relatively higher frequencies. Thus, the application of a high-pass filter to the sequence $I_{MLS}(k)$ yields as estimate of the product $B(k)*V_{AC}(k)$:

$$HP(k)=\text{HighPassFilter}\{I_{MLS}(k)\}B(k)*V_{AC}(k),$$

provided the cutoff frequency of the high-pass filter is appropriately chosen, i.e., chosen to be above the frequency band where most of the spectral mass of B(k) is concentrated and below the frequency band where most of the spectral mass of the $V_{AC}(k)$ is concentrated.

The background light signal B(k) may then be estimated by performing envelope detection on the highpass filtered signal HP(k):

$$B_{est}(k)=\text{EnvelopeDetect}\{HP(k)\}\approx B(k).$$

In some embodiments, system 1800 (e.g., processing unit 150) may be configured to perform the high-pass filtering and envelope detection in order to obtain the estimated background light signal $B_{est}(k)$, e.g., as an alternative to the low-pass filtering described above in connection with FIG. 18A. These embodiments may incorporate any subset of the features, embodiments and elements described above with respect to system 100 and system realization 200.

The estimated background light signal $B_{est}(k)$ may be used to compensate the samples of the sequence $\{I_{MLS}(k)\}$ for variation in the background light level, e.g., as variously described above. (Processing unit 150 may be configured to perform that compensation operation.) The compensated samples $\{I_{CMPN}(k)\}$ may be used to construct an image or video sequence, and/or, used to perform an inference task as variously described above. The image/video construction operation and/or the inference task(s) may be performed by system 1800 (e.g., by processing unit 150) and/or by a remote system. System 1800 may include a transmitter to transmit the compensated samples to the remote system through a communication channel.

In some embodiments, the high-pass filtering is performed in the analog domain, i.e., on the analog signal $I_{MLS}(t)$ produced by the light sensing device 130 prior to digitization. Furthermore, in some embodiments, the envelope detection is also performed in the analog domain, i.e., on the output of the analog high-pass filter.

In some embodiments, the high-pass filtering operation may be programmable, so that different high-pass filters may be employed in different contexts, e.g., for different rates of pattern modulation (i.e., different rates of applying the spatial patterns to the light modulation unit), or for different A/D sampling rates, or for different noise environments, or for different sets of spatial patterns, or for different spectral bands. In some embodiments, the envelope detection may also be programmable.

The high-pass filter may have any of various forms known in the art of signal processing.

The envelope detection may be performed by any of various methods known in the art of signal processing.

In some embodiments, a method 1972 for operating on a stream of light may involve the actions shown in FIG. 19C.

Action 1974 may include modulating the light stream with a series of spatial patterns in order to produce a modulated light stream, e.g., as variously described above.

Action 1975 may include generating a first signal representing intensity of the modulated light stream as a function of time, e.g., as variously described above.

Action 1976 may include applying a high-pass filter to the first signal to obtain a filtered signal, e.g., as variously described above.

Action 1977 may include performing envelope detection on the filtered signal to obtain a detected signal, e.g., as variously described above. The detected signal represents variation in background light level. (In different embodiments, the first signal, the filtered signal and the detected signal may be analog signals, discrete-time signals or a combination of analog signals and discrete-time signals.) The detected signal may be used to compensate the first signal for the variation in background light level, e.g., as variously described above, resulting in a compensated signal. Samples of the compensated signal comprise an encoded (e.g., compressed) representation of an image or video sequence. The samples of the compensated signal are usable to construct the image or the video sequence, and/or, to perform one or more inference tasks as variously described above.

In one embodiment of method 1972, the high-pass filter is an FIR filter (or alternatively, an IIR filter).

In one embodiment, method 1972 may also include storing samples of the first signal and samples of the detected signal in a memory.

In one embodiment, method 1972 includes compensating samples of the first signal for the variation in the background light level using the samples of the detected signal, e.g., as variously described above.

In one embodiment, method 1972 also includes constructing an image or a video sequence based on the compensated samples, e.g., as variously described above.

In one embodiment, method 1972 also includes transmitting the compensated samples to a receiver through a communication channel, e.g., as variously described above.

In some embodiments, a method 1980 for operating on a stream of light may involve the actions shown in FIG. 19D.

Action 1982 may include modulating the light stream with a series of spatial patterns in order to produce a modulated light stream, e.g., as variously described above.

Action 1983 may include generating a first sequence of samples representing intensity of the modulated light stream as a function of time, e.g., as variously described above.

Action 1984 may include applying a high-pass filter to the first sequence of samples to obtain a filtered sequence of samples, e.g., as variously described above.

Action 1985 may include performing envelope detection on the filtered sequence of samples to obtain a detected sequence of samples. The detected sequence of samples represents variation in background light level. The detected sequence of samples may be used to compensate the first sequence of samples for the variation in background light level (e.g., as variously described above), resulting in a compensated sequence of samples. The compensated sequence of samples comprises an encoded (e.g., compressed) representation of an image or video sequence. The compensated sequence is usable to construct the image or the video sequence, and/or, to perform one or more inference tasks as variously described above.

Various additional embodiments are described in the following numbered paragraphs.

4B.1 A system for operating on a stream of light, the system comprising:

a light modulation unit configured to modulate the light stream with a series of spatial patterns in order to produce a modulated light stream, wherein the light modulation unit includes a plurality of light modulating elements configured to modulate corresponding portions of the light stream, wherein each of the spatial patterns specifies an amount of modulation for each of the light modulating elements;

a light sensing device configured to receive the modulated light stream and to generate a first signal representing intensity of the modulated light stream as a function of time; and a processing unit configured to high-pass filter the first signal to obtain a filtered signal, wherein the processing unit is also configured to perform envelope detection on the filtered signal to obtain a detected signal, wherein the detected signal represents variation in background light level.

4B.2. The system of paragraph 4B.1, further comprising a memory that stores samples of the first signal and samples of the detected signal, wherein the samples of the first signal and the samples of the detected signal are usable to construct an image or a video sequence.

4B.3. The system of paragraph 4B.2, wherein the samples of the detected signal are used to compensate the samples of the first signal for the variation in background light level, wherein the compensated samples are useable to construct the image or the video sequence.

4B.4. The system of paragraph 4B.1, wherein the processing unit is configured to compensate samples of the first signal for the variation in the background light level using samples of the detected signal.

4B.5. The system of paragraph 4B.4, wherein the processing unit is configured to construct an image or a video sequence based on the compensated samples.

4B.6 The system of paragraph 4B.4, wherein the processing unit is configured to transmit the compensated samples to a receiver through a communication channel, wherein the receiver is configured to construct an image or a video sequence based on the compensated samples.

4B.7 The system of paragraph 4B.1, further comprising an optical subsystem configured to direct the modulated light stream onto a light sensing surface of the light sensing device.

4B.8 The system of paragraph 4B.1, wherein the plurality of light modulating elements are arranged in a two-dimensional array.

4B.9 The system of paragraph 4B.1, wherein the light sensing device includes one or more light sensing elements.

4B.10 A non-transitory computer-readable memory medium storing program instructions, wherein the program instructions, when executed by a computer system, cause the computer system to: supply a series of spatial patterns to a light modulation unit, wherein the light modulation unit is configured to modulate a received light stream with the series of spatial patterns to obtain a modulated light stream; receive a first signal from a light sensing device, wherein the first signal represents intensity of the modulated light stream as a function of time; apply a high-pass filter to the first signal to obtain a filtered signal; and perform envelope detection on the filtered signal to obtain a detected signal, wherein the filtered signal represents variation in background light level.

High-Pass Filtering to Estimate Compressive Sensing Information and Attenuate Contribution Due to Background Light Variation In some situations, the sequence of samples $\{I_{MLS}(k)\}$ captured by the light sensing device 130 may be modeled as the sum of an information-bearing signal r(k) and a disturbance signal b(k). The disturbance signal may be due at least in part to variation in the background light level (ambient illumination) in the scene being acquired. The disturbance signal may also be due in part to low-frequency electrical noise, e.g., AC power noise. The energy of the disturbance signal may be concentrated mostly over low frequencies, and the energy of the information-bearing signal may be concentrated mostly over relatively higher frequencies. Consequently, the information-bearing signal r(k) may be estimated by applying a high-pass filter to the sample sequence $I_{MLS}(k)$. The cutoff frequency of the high-pass filter is selected so that the high-pass filter substantially eliminates the disturbance signal and substantially passes the information-bearing signal r(k). (For example, the cutoff frequency of the high-pass filter may be chosen to be above the frequency band where most of the spectral mass of b(k) is concentrated and below the frequency band where most of the spectral mass of the r(k) is concentrated.)

Figure 19E:
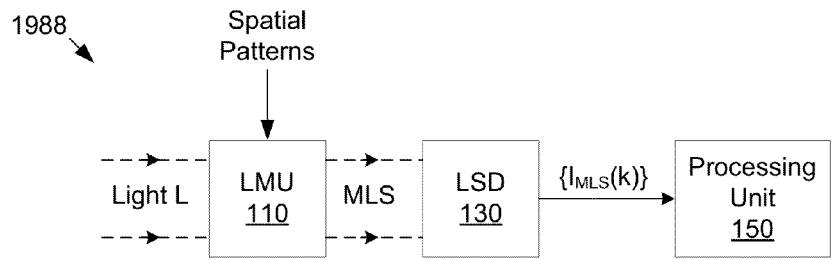
FIG. 19E illustrates an embodiment of a system 1988 that extracts information and removes (or decreases or attenuates) the effect of background light variation from a compressive imaging signal.

In some embodiments, a system 1988 may be configured to include the light modulation unit 110, the light sensing device 130 and the processing unit 150, as shown in FIG. 19E. The system 1988 (e.g., the processing unit 150) may be configured to perform the above-described high-pass filtering in order to estimate the information-bearing signal r(k). (System 1988 may incorporate any subset of the features, embodiments and elements described above with respect to system 100 and system realization 200.) The samples of the filtered signal (i.e., the output of the high-pass filter) may be processed to construct an image (or a video sequence), and/or, to perform one or more inference tasks as variously described above. The image/video construction operation and/or the inference task(s) may be performed by the system 1988 (e.g., by processing unit 150) and/or by a remote system. The system 1988 may include a transmitter to transmit the samples of the filtered signal to the remote system through a communication channel.

In some embodiments, the high-pass filtering operation is performed in the analog domain, i.e., on the analog signal $I_{MLS}(t)$ produced by the light sensing device 130 prior to digitization.

In some embodiments, the high-pass filtering operation may be programmable, so that different high-pass filters may be employed in different contexts, e.g., for different rates of pattern modulation (i.e., different rates of applying the spatial patterns to the light modulation unit), or for different A/D sampling rates, or for different noise environments, or for different sets of spatial patterns, or for different spectral bands.

The high-pass filter may have any of various forms known in the art of signal processing. For example, in various embodiments, the high-pass filter may be an FIR filter, an IIR filter, or some sort of non-linear filter.

In some embodiments, the processing unit 150 may periodically (or intermittently or continuously) perform spectrum analysis on the samples $\{I_{MLS}(k)\}$ and dynamically determine a high-pass filter (or parameters of a high-pass filter) to be applied to the samples $\{I_{MLS}(k)\}$.

The system 1988 may include memory for storing the samples of the filtered signal.

In one alternative embodiment, system 1988 (e.g., processing unit 150) may be configured to estimate the disturbance signal b(k) by low-pass filtering the sequence of samples $I_{MLS}(k)$. The estimated disturbance signal $b_{est}(k)$ (i.e., the output of the low-pass filtering operation) may then be subtracted from the sequence of samples $I_{MLS}(k)$ to obtain an estimate $r_{est}(k)$ for the information-bearing signal r(k), e.g., according to the relation:

$$r_{est}(k)=I_{MLS}(k)-b_{est}(k).$$

Figure 19F:
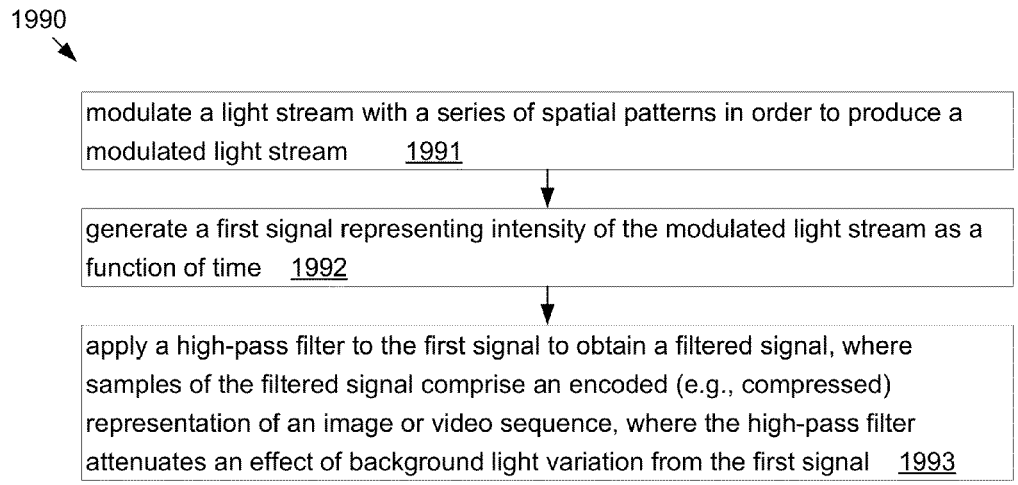
FIG. 19F illustrates an embodiment of a method 1990 for extracting information and removing (or decreasing or attenuating) the effect of background light variation from a compressive imaging signal.

In some embodiments, a method 1990 for operating on a stream of light may involve the actions shown in FIG. 19F. Method 1990 may performed, e.g., using system 1988.

Action 1991 may include modulating the light stream with a series of spatial patterns in order to produce a modulated light stream, e.g., as variously described above.

Action 1992 may include generating a first signal representing intensity of the modulated light stream as a function of time, e.g., as variously described above.

Action 1993 may include applying a high-pass filter to the first signal to obtain a filtered signal, where the action of applying the high-pass filter attenuates (or decreases or removes) an effect of background light variation from the first signal. The samples of the filtered signal comprise an encoded (e.g., compressed) representation of an image or video sequence. The samples of the filtered signal are usable to construct the image or the video sequence, and/or, to perform one or more inference tasks, as variously described above. The signals may be discrete-time signals, or analog signals, or a combination of analog signals and discrete-time signals.

In one embodiment, the method 1990 may also include storing the samples of the filtered signal in a memory.

In one embodiment, the method 1990 may also include constructing the image or the video sequence based on the samples of the filtered signal.

In one embodiment, the method 1990 may also include transmitting the samples of the filtered signal to a receiver through a communication channel.

In some embodiments, a method for operating on a stream of light may involve: (a) modulating the light stream with a series of spatial patterns in order to produce a modulated light stream; (b) generating a first sequence of samples representing intensity of the modulated light stream as a function of time; and (c) applying a high-pass filter to the first sequence of samples to obtain a filtered sequence of samples. The filtered sequence of samples is usable to construct an image or a video sequence, and/or, to perform one or more inference tasks, as variously described above.

Various additional embodiments are described in the following numbered paragraphs.

5.1 A system for operating on a stream of light, the system comprising:

a light modulation unit configured to modulate the light stream with a series of spatial patterns in order to produce a modulated light stream, wherein the light modulation unit includes a plurality of light modulating elements configured to modulate corresponding portions of the light stream, wherein each of the spatial patterns specifies an amount of modulation for each of the light modulating elements;

a light sensing device configured to receive the modulated light stream and to generate a first signal representing intensity of the modulated light stream as a function of time; and a processing unit configured to high-pass filter the first signal to obtain a filtered signal, wherein the high-pass filtering attenuates an effect of background light variation from the first signal, wherein samples of the filtered signal comprise an encoded representation of an image or video sequence.

5.2. The system of paragraph 5.1, further comprising a memory that stores the samples of the filtered signal, wherein the samples of the filter signal are usable to construct the image or the video sequence.

5.3. The system of paragraph 5.1, wherein the processing unit is configured to construct the image or the video sequence based on the samples of the filtered signal.

5.4 The system of paragraph 5.1, wherein the processing unit is configured to transmit the samples of the filtered signal to a receiver through a communication channel.

5.5 The system of paragraph 5.1, further comprising an optical subsystem configured to direct the modulated light stream onto a light sensing surface of the light sensing device.

5.6 The system of paragraph 5.1, wherein the light sensing device includes one or more light sensing elements.

5.7 A non-transitory computer-readable memory medium storing program instructions, wherein the program instructions, when executed by a computer system, cause the computer system to: supply a series of spatial patterns to a light modulation unit, wherein the light modulation unit is configured to modulate a received light stream with the series of spatial patterns to obtain a modulated light stream; receive a first signal from a light sensing device, wherein the first signal represents intensity of the modulated light stream as a function of time; and apply a high-pass filter to the first signal to obtain a filtered signal, wherein samples of the filtered signal comprise an encoded representation of an image or video sequence.

Light Power Meter to Measure Background Light Level Variation

Figure 20A:
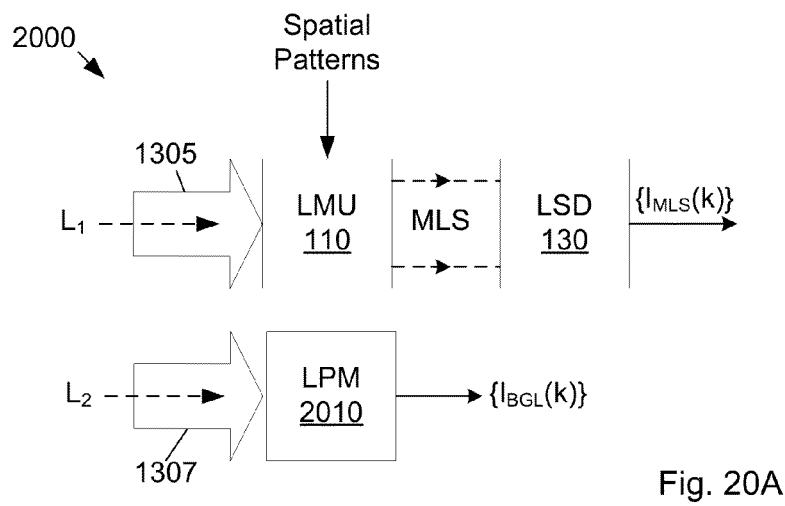
FIG. 20A illustrates an embodiment of a system 2000 that includes two separate input paths for light. The system captures compressive imaging measurements from light entering through the first path, and captures measurements of power of the light entering through the second path. The latter measurements indicate background light level as function of time.

In one set of embodiments, a system 2000 may be configured as shown in FIG. 20A. System 2000 includes the light modulation unit 110 and the light sensing device 130 as described above in connection with system 100, and also includes a light power meter 2010. (Any subset of the features, embodiments and elements discussed above with respect to system 100 and system realization 200 may be incorporated into system 2000.)

The light modulation unit 110 is configured to receive a first light stream $L_1$ from the environment through a first optical input path 1305 and to modulate the first light stream with a series of spatial patterns in order to produce a modulated light stream MLS, e.g., as variously described above. The light sensing device 130 is configured to receive the modulated light stream and to generate a first sequence of samples $\{I_{MLS}(k)\}$ representing intensity of the modulated light stream as a function of time.

The light power meter 2010 is configured to receive a second light stream $L_2$ from the environment via a second optical input path 1307 that is separate from the first optical input path 1305, and to capture a sequence of measurements $\{I_{BGL}(k)\}$ of power (or intensity) of the second light stream over time. The sequence of power measurements $\{I_{BGL}(k)\}$ represents variation of background light level in the environment.

The optical input path 1305 and the optical input path 1307 may be isolated from each other optically so that photons that have entered the optical input path 1305 from the environment will have limited ability to be detected at light power meter 2010, and so that photons that have entered the optical input path 1307 from the environment will have limited ability to be detected at the light sensing device 130.

In some embodiments, the optical input path 1305 and the optical input path 1307 may be configured so that the first light stream $L_1$ and the second light stream $L_2$ are received from same general direction. In other words, the optical input path 1307 may have a field of view into the environment that points in the same general direction as the field of view of the optical input path 1305. Thus, the sequence of power measurements $\{I_{BGL}(k)\}$ may be representative of background light level variation for approximately the same portion of the environment that is being acquired by the optical input path 1305.

The light power meter 2010 may be implemented in various ways. In some embodiments, the light power meter may be configured the same as or similar to light sensing device 130. For example, the light power meter may include the same (or similar) light sensing hardware as light sensing device 130. In another embodiment, the light power meter 2010 includes a light sensing device that is configured differently from light sensing device 130. For example, light power meter 2010 may use light-sensing hardware that is of a lower-cost and/or lower performance and/or lower-complexity than light sensing device 130.

The light power meter 2010 is preferably calibrated so that its readings are meaningfully related to light levels in the first beam.

In one embodiment, the optical input path 1307 by which light $L_2$ enters the system may be of the same design as the optical input path 1305 that allows light $L_1$ to enter the system. In another embodiment, the optical input path 1307 may be of lower cost and/or lower performance than the optical path 1305.

The sequence $\{I_{MLS}(k)\}$ and the sequence of the power measurements $\{I_{BGL}(k)\}$ may be stored in a memory, e.g., a memory resident in the system 2000 or elsewhere. The sequence $\{I_{MLS}(k)\}$ and the sequence of power measurements $\{I_{BGL}(k)\}$ are usable to construct an image or a video sequence, and/or, to perform an inference task, as variously described above. In particular, the sequence of power measurements $\{I_{BGL}(k)\}$ may be used to compensate the sequence $\{I_{MLS}(k)\}$ for the variation in background light level, e.g., as variously described above. The compensated samples $\{I_{CMPN}(k)\}$ may then be used to construct the image or the video sequence (e.g., based on any of the methods known in the field of compressive sensing), and/or, to perform the inference task.

Figure 20B:
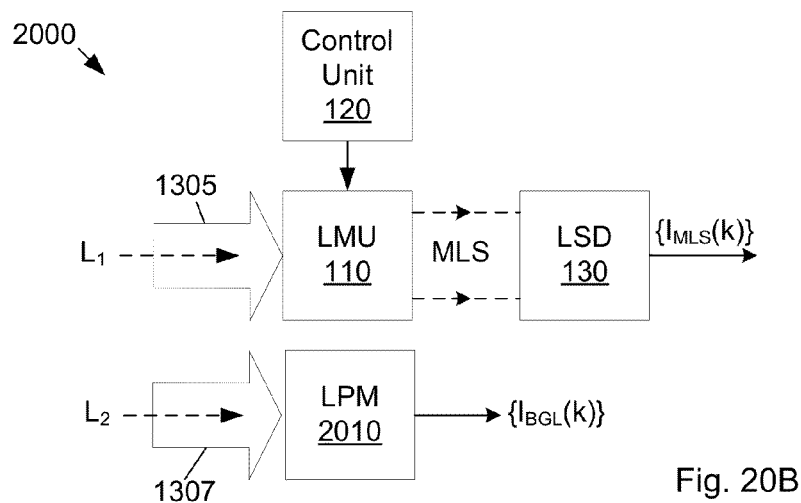
FIG. 20B illustrates an embodiment of system 2000 that includes the control unit 120.

As shown in FIG. 20B, system 2000 may also include the control unit 120 described above in connection with system 100. The control unit is configured to supply the series of spatial patterns to the light modulation unit 110.

Figure 20C:
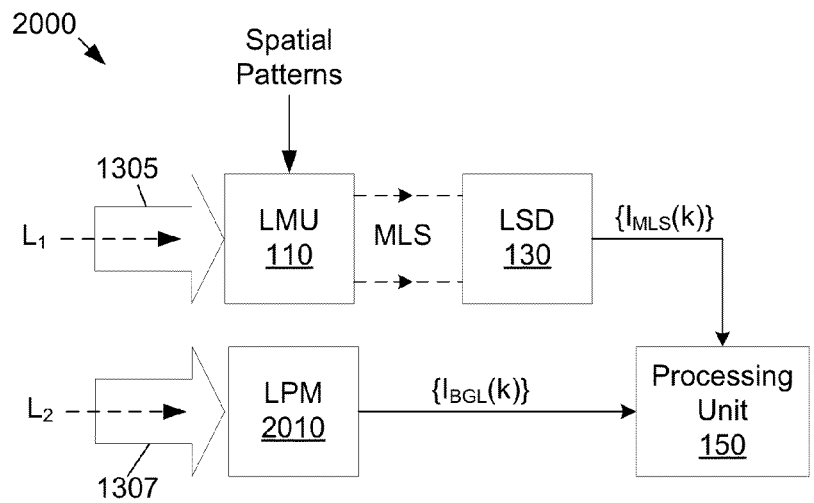
FIG. 20C illustrates an embodiment of system 2000 that includes the processing unit 150.

As shown in FIG. 20C, the system 2000 may also include the processing unit 150 discussed above in connection with system 100. The processing unit 150 may be configured to compensate the samples of the sequence $\{I_{MLS}(k)\}$ for the variation in background light level using sequence of power measurements $\{I_{BGL}(k)\}$. The compensated samples $\{I_{CMPN}(k)\}$ are usable to construct an image or a video sequence, e.g., as variously described above. In some embodiments, the processing unit 150 may also be configured to perform the action of constructing the image or the video sequence based on the compensated samples, and/or, the action of performing an inference task as variously described above.

Figure 21:
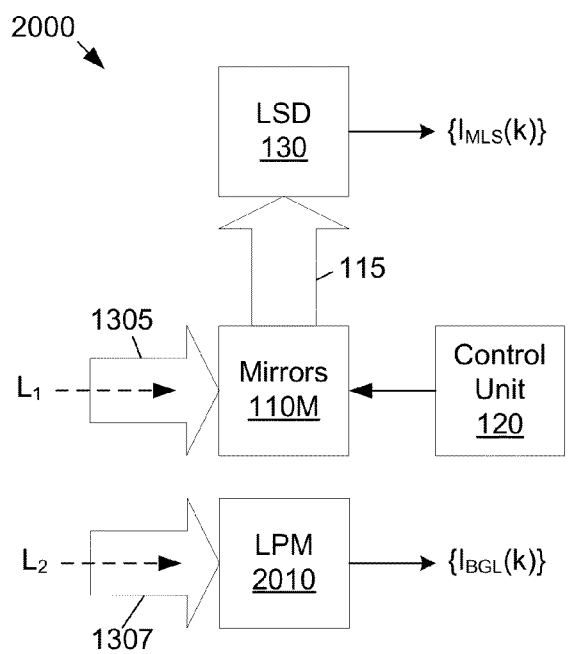
FIG. 21 illustrates an embodiment of system 2000, where the light modulation unit 110 is realized by the mirrors 110M.

FIG. 21 shows one embodiment of system 2000, where the light modulation unit 110 is realized by the set of mirrors 110M as described above in connection with system 100. The set of mirrors 110M is configured to receive the light stream $L_1$ from the environment via an optical input path 1305. Each of the mirrors is configured to controllably switch between two orientation states, and configured to (a) reflect a corresponding portion of the light stream $L_1$ onto the sensing path 115 when the mirror is in a first of the two orientation states and (b) reflect the corresponding portion of the light stream $L_1$ away from the sensing path when the mirror is in a second of the two orientation states. The control unit 120 is configured to drive the orientation states of the mirrors through the series of spatial patterns, where each of the patterns of the series specifies an orientation state for each of the mirrors. The light sensing device 130 is configured to receive light portions reflected at any given time onto the sensing path 115 by mirrors in the first orientation state and to generate a sequence of samples $\{I_{MLS}(k)\}$ representing a cumulative intensity of the light portions reflected onto the sensing path as a function of time. The samples $\{I_{MLS}(k)\}$ may be interpreted as compressive sensing measurements.

Figure 22:
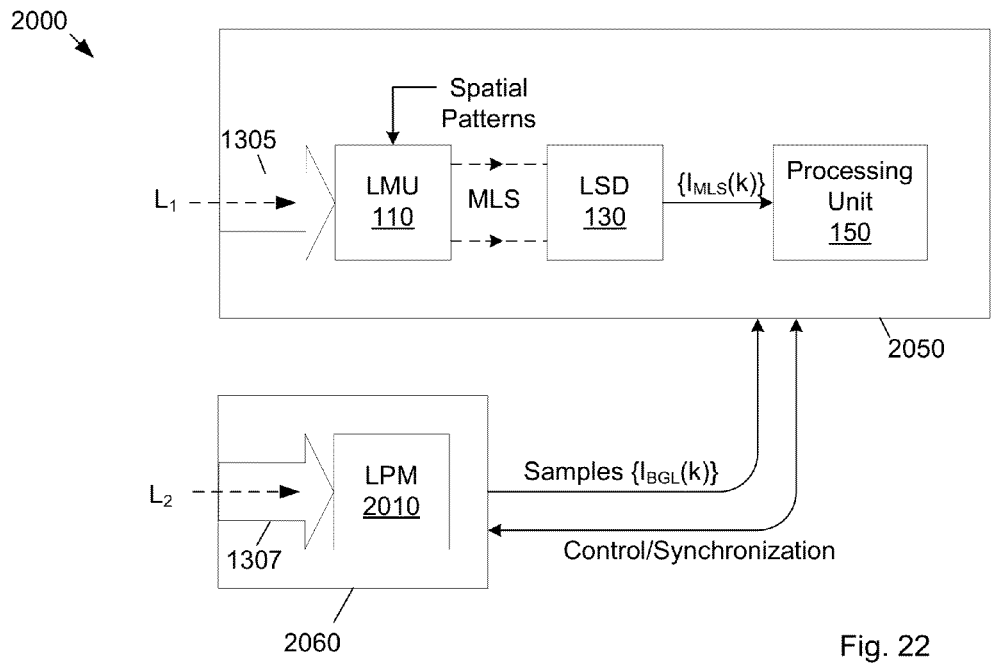
FIG. 22 illustrates an embodiment of system 2000 that includes two separately-housed units, one of the units including the light modulation unit 110 and the light sensing device 130, and the other unit including the light power meter 2010.

In one alternative embodiment, system 2000 includes two separately-packaged units as shown in FIG. 22. The first unit 2050 includes the light modulation unit 110, the light sensing device 130 and processing unit 150. The second unit 2060 includes the light power meter 2010. The second unit may be configured to couple with the first unit via a wired or wireless connection. The second unit is configured to capture the sequence of power measurements $\{I_{BGL}(k)\}$ (e.g., as variously described above) and to send the power measurements to the first unit or to some other processing agent. The second unit may be configured as a small light-weight package that is easy for a user to hold and point. The second unit may be battery powered.

Figure 23A:
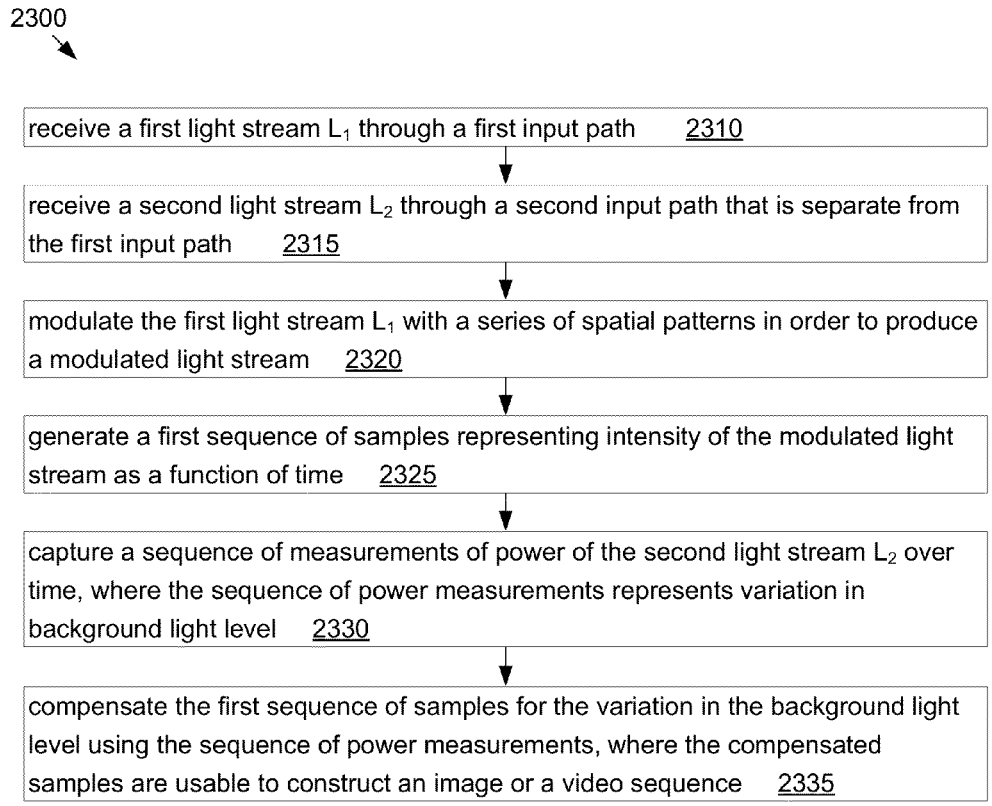
FIG. 23A illustrates an embodiment of a method 2300 for compensating a sequence of compressive imaging measurements based on power measurement supplied by a light power meter.

In one set of embodiments, a method 2300 (e.g., a method for obtaining compressed measurements of a received light stream) may include the actions shown in FIG. 23A.

Action 2310 includes receiving a first light stream $L_1$ through a first input path, e.g., as variously described above.

Action 2315 includes receiving a second light stream $L_2$ through a second input path that is separate from the first optical input path, e.g., as variously described above.

Action 2320 includes modulating the first light stream $L_1$ with a series of spatial patterns in order to produce a modulated light stream, e.g., as variously described above.

Action 2325 includes generating (or capturing) a first sequence of samples $\{I_{MLS}(k)\}$ representing intensity of the modulated light stream as a function of time, e.g., as variously described above.

Action 2330 includes generating (or capturing) a sequence of measurements $\{I_{BGL}(k)\}$ of power (or intensity) of the second light stream $L_2$ over time, e.g., as variously described above. The sequence of power measurements $\{I_{BGL}(k)\}$ represents variation in background light level.

The samples $\{I_{MLS}(k)\}$ and the measurements $\{I_{BGL}(k)\}$ may be captured in parallel. In other words, the light power meter may capture the measurements $\{I_{BGL}(k)\}$ while the light sensing device captures the samples $\{I_{MLS}(k)\}$.

In some embodiments, the samples $\{I_{MLS}(k)\}$ and the measurements $\{I_{BGL}(k)\}$ are captured at the same rate, e.g., in response to same sample clock. In other embodiments, the samples $\{I_{MLS}(k)\}$ and the measurements $\{I_{BGL}(k)\}$ are captured at different rates. In one embodiment, the samples $\{I_{MLS}(k)\}$ may be captured at a rate that is an integer multiple of the rate at which the measurements $\{I_{BGL}(k)\}$ are captured.

Action 2335 includes compensating the first sequence of samples $\{I_{MLS}(k)\}$ for the variation in the background light level using the sequence of power measurements, e.g., as variously described above. The compensated samples are usable to construct an image or a video sequence, and/or, to perform an inference task as variously described above.

In some embodiments, method 2300 may also include storing the compensated samples in a memory.

In some embodiments, method 2300 may also include constructing an image or a video sequence using the compensated samples, e.g., as variously described above.

In some embodiments, method 2300 may also include transmitting the compensated samples to a receiver through a communication channel. (The receiver may be configured to construct the image based on the compensated samples.)

In some embodiments, a non-transitory computer-readable memory medium may be configured so that it stores program instructions, where the program instructions, when executed by a computer system, cause the computer system to: (1) supply a series of spatial patterns to a light modulation unit, where the light modulation unit is configured to modulate a first stream of light with the series of spatial patterns to obtain a modulated light stream, where the first stream of light is received through a first optical input path; (2) receive a first sequence of samples from a light sensing device, where the first sequence of samples represents intensity of the modulated light stream as a function of time; (3) receive a sequence of power measurements from a light power meter, where the sequence of power measurements are measurements of power of a second stream of light over time, where the second light stream is received through a second optical input path that is separate from the first optical input path, where the sequence of power measurements represents variation in background light level; and (4) compensate the first sequence of samples for the variation in the background light level using the sequence of power measurements, where the compensated samples are usable to construct an image or a video sequence, and/or, to perform an inference task, e.g., as variously described above.

In one embodiment, the program instructions, when executed by a computer system, also cause the computer system to generate the series of spatial patterns by executing a random number generator algorithm using one or more seeds.

Figure 23B:
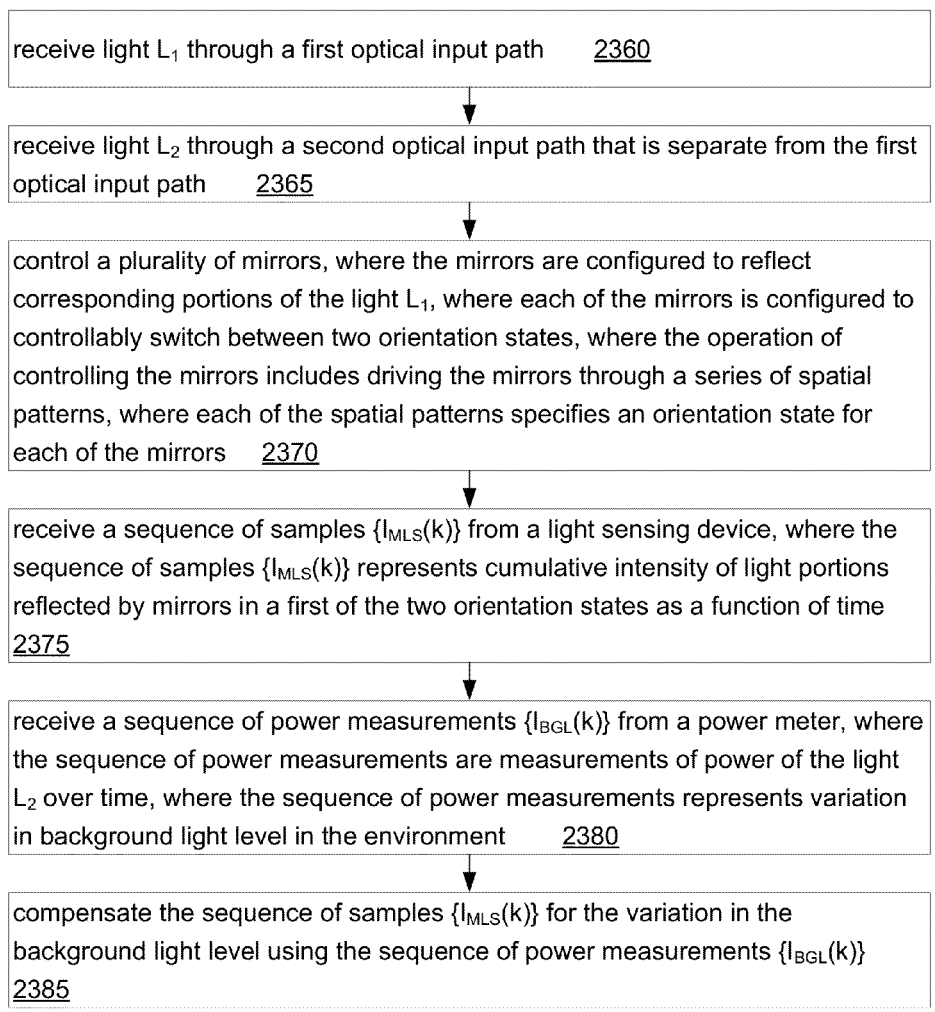
FIG. 23B illustrates an embodiment of a method 2350 for compensating a sequence of compressive imaging measurements based on power measurements supplied by a light power meter. This embodiment involves driving a plurality of mirrors through a series of spatial patterns.

In one set of embodiments, a method 2350, e.g., a method for obtaining compressed measurements of a received light stream, may include the actions shown in FIG. 23B.

Action 2360 includes receiving light $L_1$ through a first optical input path, e.g., as described above.

Action 2365 includes receiving light $L_2$ through a second optical input path that is separate from the first optical input path, e.g., as described above.

Action 2370 includes controlling a plurality of mirrors, where the mirrors are configured to reflect corresponding portions of the light $L_1$, where each of the mirrors is configured to controllably switch between two orientation states, where the operation of controlling the mirrors includes driving the mirrors through a series of spatial patterns, e.g., as variously described above. Each of the spatial patterns specifies an orientation state for each of the mirrors.

Action 2375 includes receiving a sequence of samples $\{I_{MLS}(k)\}$ from a light sensing device, e.g., as variously described above. The sequence of samples $\{I_{MLS}(k)\}$ represents cumulative intensity of light portions reflected by mirrors in a first of the two orientation states as a function of time.

Action 2380 includes receiving a sequence of measurements $\{I_{BGL}(k)\}$ of power (or intensity) from a light power meter, e.g., as variously described above. The sequence of power measurements are measurements of power of the light $L_2$ over time. The sequence of power measurements represents variation in background light level (e.g., in the environment or that portion of the environment that is being acquired.)

Action 2385 includes compensating the sequence of samples $\{I_{MLS}(k)\}$ for the variation in the background light level using the sequence of power measurements $\{I_{BGL}(k)\}$. The resulting compensated samples $\{I_{CMPN}(k)\}$ are usable to construct an image or video sequence, and/or, to perform an inference task, e.g., as variously described above.

In one set of embodiments, a non-transitory computer-readable memory medium may be configured so that it stores program instructions, where the program instructions, when executed by a computer system, cause the computer system to: (1) control a plurality of mirrors, where the mirrors are configured to reflect corresponding portions of light $L_1$, where the light $L_1$ is received through a first optical input path, where each of the mirrors is configured to controllably switch between two orientation states, where the action of controlling the mirrors includes driving the mirrors through a series of spatial patterns, where each of the spatial patterns specifies an orientation state for each of the mirrors; (2) receive a sequence of samples $\{I_{MLS}(k)\}$ from a light sensing device, where the first sequence of samples represents cumulative intensity of light portions reflected by mirrors in a first of the two orientation states as a function of time; (3) receive a sequence of power measurements $\{I_{BGL}(k)\}$ from a light power meter, where the sequence of power measurements are measurements of power of light $L_2$ over time, where the second light is received through a second optical input path that is separate from the first optical input path, where the sequence of power measurements represents variation in background light level; and (4) compensate the sequence of samples $\{I_{MLS}(k)\}$ for the variation of the background light level using the sequence of power measurements $\{I_{BGL}(k)\}$, where the compensated samples are usable to construct an image or video sequence, and/or, to perform an inference task, e.g., as variously described above.

Various additional embodiments are described in the following numbered paragraphs.

6.1 A system comprising:

a light modulation unit configured to receive a first stream of light from an environment through a first optical input path and to modulate the first light stream with a series of spatial patterns in order to produce a modulated light stream, wherein the light modulation unit includes a plurality of light modulating elements configured to modulate corresponding portions of the first light stream, wherein each of the spatial patterns specifies an amount of modulation for each of the light modulating elements;

a light sensing device configured to receive the modulated light stream and to generate a first sequence of samples representing intensity of the modulated light stream as a function of time; and a light power meter configured to receive a second stream of light from the environment via a second optical input path that is separate from the first optical input path, and to capture a sequence of measurements of power of the second light stream over time.

6.2. The system of paragraph 6.1, further comprising a memory that stores the first sequence of samples and the sequence of power measurements, wherein the first sequence of samples and the sequence of power measurements are usable to construct an image or a video sequence.

6.3. The system of paragraph 6.1, wherein power measurements are used to compensate the samples of the first sequence for variation in background light level, wherein the compensated samples are usable to construct an image or a video sequence.

6.4. The system of paragraph 6.1, further comprising a processing unit configured to compensate the samples of the first sequence for variation in background light level using power measurements, wherein the compensated samples are usable to construct an image or a video sequence.

6.5. The system of paragraph 6.4, wherein the processing unit is configured to construct the image or the video sequence based on the compensated samples.

6.6 The system of paragraph 6.4, wherein the processing unit is configured to transmit the compensated samples to a receiver through a communication channel, wherein the receiver is configured to construct the image or the video sequence based on the compensated samples.

6.7 The system of paragraph 6.1, further comprising an optical subsystem configured to receive the modulated light stream and to direct the modulated light stream onto a light sensing surface of the light sensing device.

6.8. The system of paragraph 6.1, wherein the plurality of light modulating elements are arranged in a two-dimensional array.

6.9 The system of paragraph 6.1, wherein the spatial patterns of the series are pseudo-random patterns.

6.10. The system of paragraph 6.1, wherein the light sensing device includes one or more photodiodes.

6.11 A system comprising:
a plurality of mirrors configured to receive first light from an environment via a first optical input path, wherein each of the mirrors is configured to controllably switch between two orientation states, wherein each of the mirrors is configured to (a) reflect a corresponding portion of the first light onto a sensing path when the mirror is in a first of the two orientation states and (b) reflect the corresponding portion of the first light away from the sensing path when the mirror is in a second of the two orientation states;
a control unit configured to drive the orientation states of the mirrors through a series of spatial patterns, wherein each of the spatial patterns of the series specifies an orientation state for each of the mirrors;
a light sensing device configured to receive light portions reflected onto the sensing path by mirrors in the first orientation state and to generate a first sequence of samples representing a cumulative intensity of the light portions reflected onto the sensing path as a function of time;
a light power meter configured to receive second light from the environment via a second optical input path that is separate from the first optical input path, and to capture a sequence of measurements of power of the second light over time.

6.12 The system of paragraph 6.11, further comprising a processing unit configured to compensate the first sequence of samples for variation in background light level using the sequence of power measurements, wherein the compensated samples are usable to construct an image or a video sequence.

6.13 The system of paragraph 6.11, further comprising an optical subsystem configured to receive the light portions reflected onto the sensing path, and to direct the received light portions onto a light sensing surface of the light sensing device.

Any of the various embodiments described herein may be combined to form composite embodiments. For example, any two or more of the various mechanisms for generating a signal representing the background light level may be combined. Such a composite embodiment would consequently produce two or more signals representing the background light level (i.e., one signal per mechanism), and perhaps operate on those signals to generate a more robust and/or accurate estimate of the background light level. This disclosure discusses, among other things, at least six mechanisms for generating the background light level signal: (1) inclusion of calibration patterns in the series of spatial patterns; (2) sensing light reflected in both (or each of the) orientation states of a system of controllable mirrors; (3) separating a portion of the incoming light before it arrives at the light modulation unit; (4) low-pass filtering the sample sequence $\{I_{MLS}(k)\}$; (5) high-pass filtering and then envelope detecting the sample sequence $\{I_{MLS}(k)\}$; and (6) using a light power meter having a separate input path.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A system for operating on light, the system comprising:
a plurality of mirrors configured to receive corresponding portions of the light, wherein each of the mirrors is configured to controllably switch between two orientation states, wherein each of the mirrors is configured to (a) reflect the corresponding portion of the light onto a sensing path when the mirror is in a first of the two orientation states and (b) reflect the corresponding portion of the light onto an alternative path when the mirror is in a second of the two orientation states;
a control unit configured to drive the orientation states of the mirrors through a series of patterns, wherein each of the patterns of the series specifies an orientation state for each of the mirrors;
a first light sensing device configured to receive first light portions reflected onto the sensing path by mirrors in the first orientation state and to generate a first sequence of samples representing a cumulative intensity of the first light portions as a function of time;
a second light sensing device configured to receive second light portions reflected onto the alternative path by mirrors in the second orientation state and to generate a second sequence of samples representing a cumulative intensity of the second light portions as a function of time;
a processing unit configured to combine the first sequence and the second sequence of samples to obtain a third sequence of samples that represents variation in background light level, wherein the samples of the third sequence are used to compensate the samples of the first sequence for the variation in background light level, wherein the compensated samples are usable to construct an image or a video sequence.

2. The system of claim 1, wherein the processing unit is configured to perform said compensation of the samples of the first sequence using the samples of the third sequence.

3. The system of claim 1, further comprising an optical input path configured to receive the light and to focus the received light onto the plurality of mirrors.

4. The system of claim 1, further comprising a first optical subsystem configured to receive the first light portions reflected onto the sensing path and to direct the first light portions onto a light sensing surface of the first light sensing device.

5. The system of claim 4, wherein the first optical subsystem includes a lens.

6. The system of claim 1, further comprising a second optical subsystem configured to receive the second light portions reflected onto the alternative path and to direct the second light portions onto a light sensing surface of the second light sensing device.

7. The system of claim 6, wherein the second optical subsystem includes a lens.

8. The system of claim 1, wherein the first light sensing device includes one or more light sensing elements.

9. The system of claim 1, wherein the second light sensing device includes one or more light sensing elements.

10. The system of claim 1, wherein the plurality of mirrors are arranged in an array.

11. The system of claim 1, wherein the patterns are pseudo-random patterns.

12. A method for operating on light, the method comprising:
receiving portions of the light, respectively, at a plurality of mirrors, wherein each of the mirrors controllably switches between two orientation states, wherein each of the mirrors is configured to (a) reflect the corresponding portion of the light onto a sensing path when the mirror is in a first of the two orientation states and (b) reflect the corresponding portion of the light onto an alternative path when the mirror is in a second of the two orientation states;
driving the orientation states of the mirrors through a series of patterns, wherein said driving is performed by a control unit, wherein each of the patterns of the series specifies an orientation state for each of the mirrors;
receiving, at a first light sensing device, first light portions reflected onto the sensing path by mirrors in the first orientation state;
generating a first sequence of samples representing a cumulative intensity of the first light portions as a function of time, wherein said generating the first sequence is performed by the first light sensing device;
receiving, at a second light sensing device, second light portions reflected onto the alternative path by mirrors in the second orientation state; and
generating a second sequence of samples representing a cumulative intensity of the second light portions as a function of time, wherein said generating the second sequence of samples is performed by the second light sensing device;
combining the first sequence and the second sequence of samples to obtain a third sequence of samples that represents variation in background light level, wherein the samples of the third sequence are used to compensate the samples of the first sequence for the variation in background light level, wherein the compensated samples are usable to construct an image or a video sequence.

13. The method of claim 12, wherein the plurality of mirrors are arranged in an array.

14. The method of claim 12, wherein the patterns are pseudo-random patterns.

15. A system for operating on light, the system comprising:
a plurality of mirrors configured to receive corresponding portions of the light, wherein each of the mirrors is configured to controllably switch between two orientation states, wherein each of the mirrors is configured to (a) reflect the corresponding portion of the light onto a sensing path when the mirror is in a first of the two orientation states and (b) reflect the corresponding portion of the light onto an alternative path when the mirror is in a second of the two orientation states;
a control unit configured to drive the orientation states of the mirrors through a series of patterns, wherein each of the patterns of the series specifies an orientation state for each of the mirrors;
a first light sensing device configured to receive first light portions reflected onto the sensing path by mirrors in the first orientation state and to generate a first sequence of samples representing a cumulative intensity of the first light portions as a function of time;
a second light sensing device configured to receive second light portions reflected onto the alternative path by mirrors in the second orientation state and to generate a second sequence of samples representing a cumulative intensity of the second light portions as a function of time;
a memory that stores the first sequence of samples and a third sequence of samples, wherein the third sequence of samples is a combination of the first sequence and the second sequence of samples and represents variation in background light level.

16. The system of claim 15, wherein the samples of the third sequence are used to compensate the samples of the first sequence for the variation in background light level, wherein the compensated samples are usable to construct an image or a video sequence.

17. A method for operating on light, the method comprising:
receiving portions of the light, respectively, at a plurality of mirrors, wherein each of the mirrors controllably switches between two orientation states, wherein each of the mirrors is configured to (a) reflect the corresponding portion of the light onto a sensing path when the mirror is in a first of the two orientation states and (b) reflect the corresponding portion of the light onto an alternative path when the mirror is in a second of the two orientation states;
driving the orientation states of the mirrors through a series of patterns, wherein said driving is performed by a control unit, wherein each of the patterns of the series specifies an orientation state for each of the mirrors;
receiving, at a first light sensing device, first light portions reflected onto the sensing path by mirrors in the first orientation state;
generating a first sequence of samples representing a cumulative intensity of the first light portions as a function of time, wherein said generating the first sequence is performed by the first light sensing device;
receiving, at a second light sensing device, second light portions reflected onto the alternative path by mirrors in the second orientation state; and
generating a second sequence of samples representing a cumulative intensity of the second light portions as a function of time, wherein said generating the second sequence of samples is performed by the second light sensing device;
storing the first sequence of samples and a third sequence of samples in a memory, wherein the third sequence of samples is a combination of the first sequence and the second sequence of samples and represents variation in background light level.

18. The method of claim 17, wherein the samples of the third sequence are used to compensate the samples of the first sequence for the variation in background light level, wherein the compensated samples are usable to construct an image or a video sequence.

* * * * *